US012604128B2

(12) United States Patent
Zhang et al.

(10) Patent No.: US 12,604,128 B2
(45) Date of Patent: *Apr. 14, 2026

(54) OPEN EARPHONES WITH TWO PRESSURE RELIEF HOLES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 198 days.

This patent is subject to a terminal disclaimer.

(21) Appl. No.: 18/360,779

(22) Filed: Jul. 27, 2023

(65) Prior Publication Data

US 2024/0147110 A1 May 2, 2024

Related U.S. Application Data

(63) Continuation of application No. PCT/CN2023/079404, filed on Mar. 2, 2023.

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.
*H04R 1/10* (2006.01)

(52) U.S. Cl.
CPC ........... *H04R 1/1008* (2013.01); *H04R 1/105* (2013.01); *H04R 1/1066* (2013.01); *H04R 2460/09* (2013.01); *H04R 2460/11* (2013.01)

(58) Field of Classification Search
CPC .... H04R 1/1008; H04R 1/105; H04R 1/1066; H04R 2460/09; H04R 2460/11
(Continued)

(56) References Cited

U.S. PATENT DOCUMENTS 12,052,537 B2 * 7/2024 Zhang .................. H04R 1/1008
12,063,472 B2 * 8/2024 Zhang ...................... H04R 1/10
(Continued)

FOREIGN PATENT DOCUMENTS

CN 212909881 U 4/2021
CN 113573215 A 10/2021
(Continued)

OTHER PUBLICATIONS

Notice of Preliminary Rejection in Korean Application No. 10-2024-7026792 mailed on Aug. 7, 2025, 10 pages.
(Continued)

*Primary Examiner* — Katherine A Faley
(74) *Attorney, Agent, or Firm* — METIS IP LLC

(57) ABSTRACT

The present disclosure provides an open earphone comprising a sound production component and an ear hook. In a wearing state, a first portion of the ear hook is hung between user's auricle and head, and a second portion of the ear hook extends towards a side of the auricle away from the head and connects to the sound production component to place the sound production component in a position near an ear canal but not blocking the ear canal. An inner side surface of the housing facing the auricle is provided with a sound outlet, one or more other side walls of the housing are provided with at least two pressure relief holes including a first
(Continued)

pressure relief hole and a second pressure relief hole. A distance between centers of the first pressure relief hole and the second pressure relief hole is between 13.0 mm and 15.2 mm.

17 Claims, 18 Drawing Sheets

(58) Field of Classification Search
USPC .......................................................... 381/381
See application file for complete search history.

(56) References Cited

U.S. PATENT DOCUMENTS

| | | | | |
|---|---|---|---|---|
| 2007/0009133 | A1 | 1/2007 | Gerkinsmeyer | |
| 2018/0033419 | A1* | 2/2018 | Shetye | H04R 1/1008 |
| 2018/0288518 | A1* | 10/2018 | Schmidt | H04R 3/14 |
| 2020/0196062 | A1 | 6/2020 | Zhang | |
| 2021/0067857 | A1 | 3/2021 | Struzik | |
| 2022/0095029 | A1 | 3/2022 | Zheng et al. | |
| 2022/0124428 | A1 | 4/2022 | Zheng et al. | |
| 2022/0312108 | A1 | 9/2022 | Zhang et al. | |
| 2023/0082738 | A1 | 3/2023 | Zheng et al. | |
| 2023/0130211 | A1 | 4/2023 | Li et al. | |
| 2024/0107219 | A1 | 3/2024 | He | |

FOREIGN PATENT DOCUMENTS

| | | | |
|---|---|---|---|
| CN | 113905304 | A | 1/2022 |
| CN | 114286228 | A | 4/2022 |
| CN | 115175069 | A | 10/2022 |

OTHER PUBLICATIONS

Notice of Rejection in Japanese Application No. 2024-553887 mailed on Aug. 26, 2025, 6 pages.
The Extended European Search Report in European Application No. 23881043.6 mailed on Jul. 8, 2025, 7 pages.
Decision to Grant a Patent in Japanese Application No. 2024553887 mailed on Feb. 3, 2026, 5 pages.

* cited by examiner

OPEN EARPHONES WITH TWO PRESSURE RELIEF HOLES

CROSS-REFERENCE TO RELATED APPLICATIONS

This application is a continuation of International Patent Application No. PCT/CN2023/079404, filed on Mar. 2, 2023, which claims priority of Chinese Patent Application No. 202211336918.4, filed on Oct. 28, 2022, Chinese Patent Application No. 202223239628.6, filed on Dec. 1, 2022, and International Application No. PCT/CN2022/144339, filed on Dec. 30, 2022, the entire contents of each of which are hereby incorporated by reference.

TECHNICAL FIELD

The present disclosure relates to the field of acoustic technology, and in particular to an open earphone.

BACKGROUND

With the development of acoustic output technology, acoustic devices (e.g., headphones) have been widely used in people's daily lives, and can be used in conjunction with electronic devices such as cell phones and computers to provide users with an auditory feast. Open earphones are portable audio output devices that enable sound conduction within a specific range. Compared with traditional in-ear and over-ear earphones, open earphones have features of not blocking or covering ear canals, allowing users to listen to music while accessing to sound information from the outside environment, thereby improving safety and comfort. The output performance of open earphones has a great impact on the users' comfort of use.

Therefore, it is necessary to provide an open earphone to improve the output performance of the open earphone.

SUMMARY

One of the embodiments of the present disclosure provide an open earphone, comprising: a sound production component including a transducer and a housing accommodating the transducer, the transducer including a diaphragm; an ear hook, wherein in a wearing state, a first portion of the ear hook is hung between an auricle and a head of a user, and a second portion of the ear hook extends towards a side of the auricle away from the head and connects to the sound production component to place the sound production component in a position near an ear canal but not blocking the ear canal, wherein the housing is provided with a sound outlet on an inner side surface towards the auricle for guiding a sound generated by a front side of the diaphragm out of the housing and to the ear canal, one or more other side walls of the housing are provided with at least two pressure relief holes including a first pressure relief hole and a second pressure relief hole, and a distance from a center of the first pressure relief hole to a center of the second pressure relief hole is in a range of 13.0 mm to 15.2 mm.

In some embodiments, a distance from a center of the sound outlet to a mid-perpendicular plane of a connection line between the center of the first pressure relief hole and the center of the second pressure relief hole is in a range of 0 mm to 2 mm.

In some embodiments, the first pressure relief hole is set on an upper side surface of the housing, and the second pressure relief hole is set on a lower side surface of the housing.

In some embodiments, in the wearing state, the housing is at least partially inserted into an inferior concha. A distance from the center of the second pressure relief hole to a rear side surface of the housing is greater than a distance from the center of the first pressure relief hole to the rear side surface of the housing.

In some embodiments, a distance from the center of the first pressure relief hole to the inner side surface of the housing towards the auricle is in a range of 4.24 mm to 6.38 mm.

In some embodiments, a distance from the center of the first pressure relief hole to the rear side surface of the housing is in a range of 10.44 mm to 15.68 mm.

In some embodiments, the transducer includes a magnetic circuit assembly, the magnetic circuit assembly is used to provide a magnetic field, and a distance from a center of the first pressure relief hole to a bottom surface of the magnetic circuit assembly is in a range of 1.31 mm to 1.98 mm.

In some embodiments, the transducer includes a magnetic circuit assembly, the magnetic circuit assembly is used to provide a magnetic field, and a distance from the center of the first pressure relief hole to a long-axis center plane of the magnetic circuit assembly is in a range of 5.45 mm to 8.19 mm.

In some embodiments, a distance from the center of the second pressure relief hole to the inner side surface of the housing towards the auricle may be that in some embodiments, a distance from the center of the second pressure relief hole to the rear side surface of the housing is in a range of 13.51 mm to 20.27 mm.

In some embodiments, the transducer includes a magnetic circuit assembly, the magnetic circuit assembly is used to provide a magnetic field, and a distance from the center of the second pressure relief hole to a bottom surface of the magnetic circuit assembly is in a range of 1.31 mm to 1.98 mm.

In some embodiments, the transducer includes a magnetic circuit assembly, the magnetic circuit assembly is used to provide a magnetic field, and a distance from the center of the second pressure relief hole to a long-axis center plane of the magnetic circuit assembly is in a range of 5.46 mm to 8.20 mm.

In some embodiments, the housing is at least partially inserted into the inferior concha, and an area of the second pressure relief hole is smaller than an area of the first pressure relief hole.

In some embodiments, the area of the first pressure relief hole is in a range of 3.78 $mm^2$ to 22.07 $mm^2$, and the area of the second pressure relief hole is in a range of 2.78 $mm^2$ to 16.07 $mm^2$.

In some embodiments, a ratio of the area of the first pressure relief hole to an area of the upper side surface is between 0.036 and 0.093, and a ratio of the area of the second pressure relief hole to an area of the lower side surface is between 0.018 and 0.051.

In some embodiments, the transducer includes a magnetic circuit assembly, the magnetic circuit assembly is used to provide a magnetic field, and an overlapping area of projections of the first pressure relief hole and the second pressure relief hole on the long-axis center plane of the magnetic circuit assembly is not larger than 10.77 $mm^2$ In some embodiments, a length of a connection line of projection points of the center of the first pressure relief hole and the center of the second pressure relief hole on a plane where the bottom surface of the magnetic circuit assembly is located is in a range of 3.5 mm to 5.6 mm.

In some embodiments, an angle between the connection line and a short-axis direction of the housing is in a range of 12.85°-23.88°.

In some embodiments, in the wearing state, the housing at least partially covers an antihelix, and a difference between a distance from the center of the second pressure relief hole on the lower side surface to the rear side surface of the housing and a distance from the center of the first pressure relief hole on the upper side surface to the rear side surface of the housing is smaller than 10%.

In some embodiments, a distance from the center of the first pressure relief hole to the inner side surface of the housing towards the auricle is in a range of 4.43 mm to 7.96 mm, or a distance from the center of the second pressure relief hole to the inner side surface of the housing towards the auricle is in a range of 4.43 mm to 7.96 mm.

In some embodiments, a distance from the center of the first pressure relief hole to the rear side surface of the housing is in range of 8.60 mm to 12.92 mm, or a distance from the center of the second pressure relief hole to the rear side surface of the housing is in range of 8.60 mm to 12.92 mm.

In some embodiments, a ratio of a long-axis dimension of the first pressure relief hole to a short-axis dimension of the first pressure relief hole is in a range of 1 to 8, or a ratio of a long-axis dimension of the second pressure relief hole to a short-axis dimension of the second pressure relief hole is in a range of 1 to 8.

In some embodiments, a first distance is arranged between the center of the first pressure relief hole and the center of the sound outlet, a second distance is arranged between the center of the second pressure relief hole and the center of the sound outlet, and a difference between the first distance and the second distance is smaller than 10%.

In some embodiments, the first distance is in a range of 5.12 mm to 15.11 mm.

In some embodiments, a distance between a projection point of the center of the first pressure relief hole on a sagittal plane and a projection point of a midpoint of an upper boundary of the inner side surface on the sagittal plane is not larger than 2 mm.

In some embodiments, a distance between the projection point of the midpoint of the upper boundary of the inner side surface on the sagittal plane and a projection point of a center of an ear canal opening of an ear canal on the sagittal plane is in a range of 12 mm to 18 mm.

In some embodiments, a distance between the projection point of the center of the first pressure relief hole on the sagittal plane and the projection point of the center of the ear canal opening of the ear canal on the sagittal plane is in a range of 12 mm to 18 mm.

In some embodiments, a distance between the projection point of the center of the second pressure relief hole on the sagittal plane and the projection point of the center of the ear canal opening of the ear canal on the sagittal plane is in a range of 6.88 mm to 10.32 mm.

In some embodiments, a distance between the projection point of the center of the second pressure relief hole on the sagittal plane and the projection point of the midpoint of the upper boundary of the inner side surface on the sagittal plane is in a range of 14.4 mm to 21.6 mm.

In some embodiments, a distance between the projection point of the center of the first pressure relief hole on the sagittal plane and a projection point of a ⅓ point of a lower boundary of the inner side surface on the sagittal plane is in a range of 13.76 mm to 20.64 mm.

In some embodiments, a distance between the projection point of the center of the second pressure relief hole on the sagittal plane and the projection point of the ⅓ point of the lower boundary of the inner side surface on the sagittal plane is in a range of 8.16 mm to 12.24 mm.

In some embodiments, a distance between the projection point of the ⅓ point of the lower boundary of the inner side surface on the sagittal plane and the projection point of the ear canal opening of the ear canal on the sagittal plane is in a range of 1.76 mm to 2.64 mm.

In some embodiments, in the wearing state, a distance between the first pressure relief hole and any point of the second portion of the ear hook in a long-axis direction of the sound production component is in a range of 5.28 mm to 13.02 mm.

Embodiments of the present disclosure also provide an open earphone comprising: a sound production component including a transducer and a housing accommodating the transducer, wherein the transducer includes a diaphragm; an ear hook, wherein in a wearing state, a first portion of the ear hook is hung between an auricle and a head of a user, and a second portion of the ear hook extends towards a side of the auricle away from the head and connects to the sound production component to place the sound production component in a position near an ear canal but not blocking the ear canal, wherein the housing is provided with a sound outlet on an inner side surface towards the auricle for guiding a sound generated by a front side of the diaphragm out of the housing and to the ear canal, one or more other side walls of the housing are provided with at least two pressure relief holes including a first pressure relief hole and a second pressure relief hole, and a distance from a center of the sound outlet to a mid-perpendicular plane of a connection line between a center of the first pressure relief hole and a center of the second pressure relief hole is in a range of 0 mm to 2 mm.

Embodiments of the present disclosure also provide an open headphone comprising: a sound production component including a transducer and a housing accommodating the transducer, wherein the transducer includes a diaphragm; an ear hook, wherein in a wearing state, a first portion of the ear hook is hung between an auricle and a head of a user, and a second portion of the ear hook extends towards a side of the auricle away from the head and connects to the sound production component to place the sound production component in a position near an ear canal but not blocking the ear canal, the housing is provided with a sound outlet on an inner side surface towards the auricle for guiding a sound generated by a front side of the diaphragm out of the housing and to the ear canal, one or more other side walls of the housing are provided with at least two pressure relief holes including a first pressure relief hole and a second pressure relief hole, the housing is at least partially inserted into an inferior concha, and an area of the second pressure relief hole is smaller than an area of the first pressure relief hole.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein.

DETAILED DESCRIPTION

Figure 1:
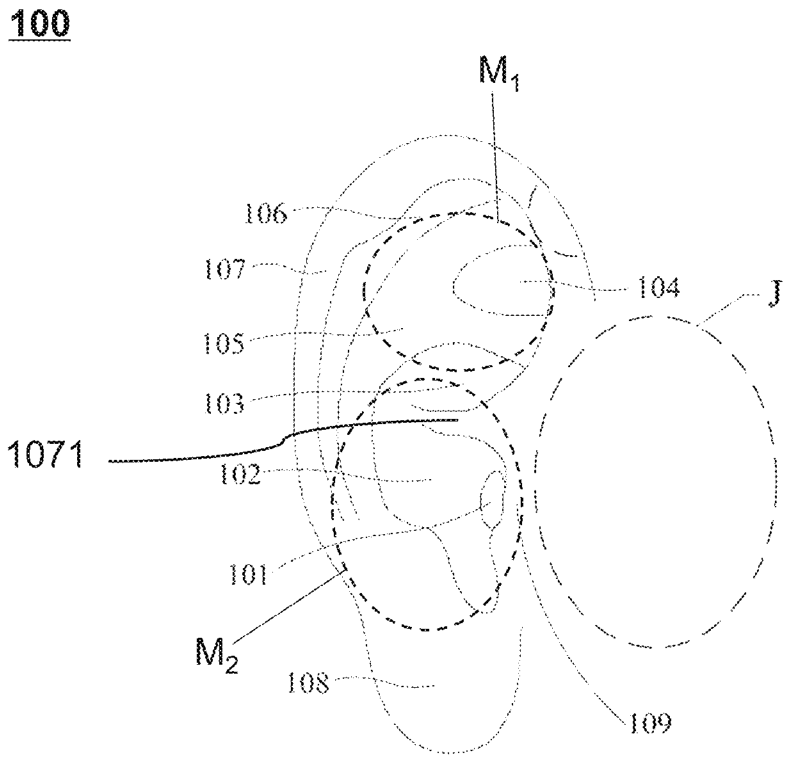
FIG. 1 is a schematic diagram illustrating an exemplary ear according to some embodiments of the present disclosure.

The technical schemes of embodiments of the present disclosure will be more clearly described below, and the accompanying drawings that need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system," "device," "unit" and/or "module" used herein is a method for distinguishing different components, elements, components, parts, or assemblies of different levels. However, if other words may achieve the same purpose, the words may be replaced by other expressions.

As shown in the present disclosure and claims, unless the context clearly prompts the exception, "a," "one," and/or "the" is not specifically singular, and the plural may be included. It will be further understood that the terms "comprise," "comprises," and/or "comprising," "include," "includes," and/or "including," when used in the present disclosure, specify the presence of stated features, integers, steps, operations, elements, and/or components, but do not preclude the presence or addition of one or more other features, integers, steps, operations, elements, components, and/or groups thereof.

In the description of the present disclosure, it should be understood that the terms "first," "second," "third," and "fourth" are used for descriptive purposes only and are not to be understood as indicating or implying relative importance or implicitly specifying the number of technical features indicated. Thus, the features qualified with "first," "second," "third," and "fourth" may expressly or implicitly include at least one such feature. In the description of the present disclosure, "multiple" means at least two, such as two, three, etc., unless otherwise expressly and specifically limited.

In the present disclosure, unless otherwise expressly specified and limited, the terms "connected," "fixed," etc., shall be understood in a broad sense. For example, the term "connection" refers to a fixed connection, a detachable connection, or an integral part; a mechanical connection, or an electrical connection; a direct connection, or an indirect connection through an intermediate medium; a connection within two components or an interaction between two components, unless otherwise expressly limited. For those skilled in the art, the specific meaning of the above terms in the present disclosure can be understood on a case-by-case basis.

FIG. 1 is a schematic diagram illustrating an exemplary ear according to some embodiments of the present disclosure. Referring to FIG. 1, the ear 100 (which may also be referred to as an auricle) may include an external ear canal 101, an inferior concha 102, a concha boat 103, a triangular fossa 104, an antihelix 105, a scapha 106, a helix 107, an earlobe 108, a tragus 109, and a helix foot 1071. In some embodiments, one or more parts of the ear 100 may be used to support an acoustic device to achieve stable wearing of the acoustic device. In some embodiments, parts of the ear 100 such as the external ear canal 101, the inferior concha 102, the concha boat 103, the triangular fossa 104, etc., have a certain depth and volume in the three-dimensional space, which may be used to achieve the wearing requirements of the acoustic device. For example, the acoustic device (e.g., an in-ear earphone) may be worn in the external ear canal 101. In some embodiments, the wearing of the acoustic device (e.g., an open earphone) may be achieved with the aid of other parts of the ear 100 other than the external ear canal 101. For example, the wearing of the acoustic device may be achieved with the aid of the concha boat 103, the triangular fossa 104, the antihelix 105, the scapha 106, the helix 107, or a combination thereof. In some embodiments, the earlobe 108 and other parts of the user's ear may also be used to improve the comfort and reliability of the acoustic device in wearing. By utilizing parts of the ear 100 other than the external ear canal 101 for the wearing of the acoustic device and the transmission of sound, the external ear canal 101 of the user may be "liberated." When the user wears the acoustic device (e.g., an open earphone), the acoustic device does not block the external ear canal 101 (or the ear canal or ear canal opening) of the user, and the user may receive both sounds from the acoustic device and sound from the environment (e.g., horn sounds, car bells, surrounding voices, traffic commands, etc.), thereby reducing the probability of traffic accidents. In some embodiments, the acoustic device may be designed to adapt to the ear 100 according to the construction of the ear 100 to enable a sound production component of the acoustic device to be worn at various positions of the ear. For example, when the acoustic device is an open earphone, the open earphone may include a suspension structure (e.g., an ear hook) and a sound production component. The sound production component is physically connected to the suspension structure, which may be adapted to the shape of the ear to place the whole or part of the structure of the sound production component at a front side of the tragus 109 (e.g., the region J enclosed by the dotted line in FIG. 1). As another example, the whole or part of the structure of the sound production component may be in contact with an upper portion of the external ear canal 101 (e.g., where one or more parts such as the concha boat 103, the triangular fossa 104, the antihelix 105, the scapha 106, the helix 107, the helix foot 1071, etc., are located) while the user is wearing the open earphone. As another example, when the user wears the open earphone, the whole or part of the structure of the sound production component may be located within a cavity formed by one or more parts of the ear 100 (e.g., the inferior concha 102, the concha boat 103, the triangular fossa 104, etc.) (e.g., the region M1 enclosed by the dotted line in FIG. 1 containing at least the concha boat 103, the triangular fossa 104 and the region M2 containing at least the inferior concha 102).

Different users may have individual differences, resulting in different shapes, dimensions, etc., of ears. For ease of description and understanding, if not otherwise specified, the present disclosure primarily uses a "standard" shape and dimension ear model as a reference and further describes the wearing manners of the acoustic device in different embodiments on the ear model. For example, a simulator (e.g., GRAS 45BC KEMAR) containing a head and (left and right) ears produced based on standards of ANSI: S3.36, S3.25 and IEC: 60318-7, may be used as a reference for wearing the acoustic device to present a scenario in which most users wear the acoustic device normally. Merely by way of example, the reference ear may have the following relevant features: a projection of an auricle on a sagittal plane in a vertical axis direction may be in a range of 49.5 mm-74.3 mm, and a projection of the auricle on the sagittal plane in a sagittal axis direction may be in a range of 36.6 mm-55 mm. Thus, in the present disclosure, the descriptions such as "worn by the user," "in the wearing state," and "in the wearing state" refer to the acoustic device described in the present disclosure being worn on the ear of the aforementioned simulator. Of course, considering the individual differences of different users, structures, shapes, dimensions, thicknesses, etc., of one or more parts of the ear 100 may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) may have different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane refers to a section perpendicular to the ground along a front and rear direction of the body, which divides the human body into left and right parts. The coronal plane refers to a section perpendicular to the ground along a left and right direction of the body, which divides the human body into front and rear parts. The horizontal plane refers to a section parallel to the ground along an up-and-down direction of the body, which divides the human body into upper and lower parts. Correspondingly, the sagittal axis refers to an axis along the front-and-rear direction of the body and perpendicular to the coronal plane. The coronal axis refers to an axis along the left-and-right direction of the body and perpendicular to the sagittal plane. The vertical axis refers to an axis along the up-and-down direction of the body and perpendicular to the horizontal plane. Further, the "front side of the ear" as described in the present disclosure is a concept relative to the "rear side of the ear," where the former refers to a side of the ear away from the head and the latter refers to a side of the ear facing the head. In this case, observing the ear of the above simulator in a direction along the coronal axis of the human body, a schematic diagram illustrating the front side of the ear as shown in FIG. 1 is obtained.

Figure 2:
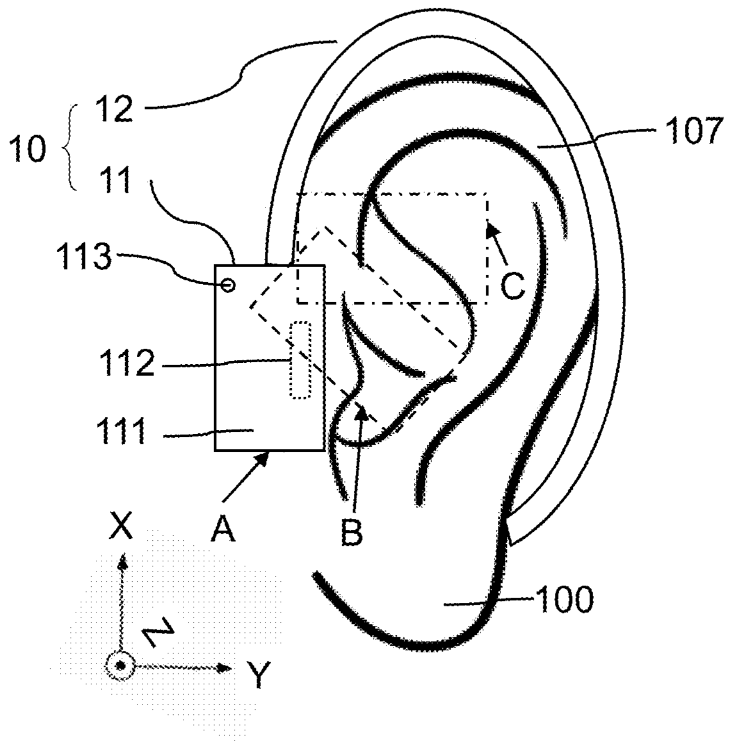
FIG. 2 is a structural diagram illustrating an exemplary open earphone according to some embodiments of the present disclosure.

FIG. 2 is a structural diagram illustrating an exemplary open earphone according to some embodiments of the present disclosure.

In some embodiments, the open earphone 10 may include, but is not limited to, an air conduction earphone, a bone air conduction earphone, etc. In some embodiments, the open earphone 10 may be combined with products such as glasses, a headset, a head-mounted display device, an AR/VR headset, etc.

As shown in FIG. 2, the open earphone 10 may include a sound production component 11 and an ear hook 12.

The sound production component 11 may be worn on the user's body, and the sound production component 11 may generate sound which is input into the ear canal of the user. In some embodiments, the sound production component 11 may include a transducer (e.g., a transducer 116 shown in FIG. 20A) and a housing 111 configured to accommodate the transducer. The housing 111 may be connected to the ear hook 12. The transducer is used to convert an electrical signal into a corresponding mechanical vibration to produce sound. In some embodiments, a sound outlet 112 is provided on a side of the housing toward the ear, and the sound outlet 112 is used to transmit the sound generated by the transducer out of the housing 111 and into the ear canal so that the user can hear the sound. In some embodiments, the transducer (e.g., a diaphragm) may divide the housing 111 to form a front cavity (e.g., a front cavity 114 shown in FIG. 20A) and a rear cavity of the earphone, and the sound outlet 112 may communicate with the front cavity and transmit the sound generated by the front cavity out of the housing 111 and into the ear canal. In some embodiments, a portion of the sound exported through the sound outlet 112 may be transmitted to the ear canal thereby allowing the user to hear the sound, and another portion thereof may be transmitted with the sound reflected by the ear canal through a gap between the sound production component 11 and the ear (e.g., a portion of the inferior concha not covered by the sound production component 11) to the outside of the open earphone 10 and the ear, thereby creating a first leakage sound in the far-field. At the same time, one or more pressure relief holes 113 are generally provided on other sides of the housing 111 (e.g., a side away from or back from the user's ear canal). The pressure relief holes 113 are further away from the ear canal than the sound outlet 112, and the sound transmitted by the pressure relief holes 113 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other so that the aforementioned first leakage sound and the aforementioned second leakage sound can cancel each other out in the far-field, which is conducive to reducing the leakage of the open earphone 10 in the far-field. In some embodiments, in addition to the side surface of the housing 111 towards the auricle, at least two pressure relief holes may be provided on other side surfaces of the housing 111. By setting the at least two pressure relief holes, not only can the sound generated by the rear cavity be transmitted out of the housing 111, but also a high-pressure region of a sound field in the rear cavity can be destroyed, so that a wavelength of a standing wave in the rear cavity becomes shorter, thereby making a resonant frequency of the sound transmitted out of the housing 111 through the pressure relief holes 113 as high as possible (e.g., greater than 4 kHz). At this time, the sound transmitted by the sound outlet 112 and the sound transmitted by the pressure relief holes 113 can maintain a relatively good consistency in a wide frequency range, and the sound transmitted by the sound outlet 112 and the sound transmitted by the pressure relief holes 113 have a better effect of destructive interference in the far-field, thereby obtaining a better leakage reduction effect. For ease of description, the present disclosure is exemplarily illustrated with the two pressure relief holes provided on the sound production component 11. Merely by way of example, the at least two pressure relief holes 113 may include a first pressure relief hole and a second pressure relief hole (e.g., a first pressure relief hole 1131 and a second pressure relief hole 1132 shown in FIG. 7). The two pressure holes 113 may be respectively located on two opposite sides of the housing 111. For example, the two pressure holes 113 may be oppositely arranged in a short-axis direction Y described below, thereby destroying the high-pressure region of the sound field in the rear cavity to the greatest extent. In short, when the user wears the open earphone 10, what the user mainly hears is the sound transmitted to the ear canal by the sound outlet 112, and the pressure relief holes 113 are mainly used to balance the pressure of the rear cavity, so that the vibration can be fully achieved at low-frequency and large-amplitude, which may make the sound as low-bass dived and treble-penetrating as possible, and reduce the sound leaked to the environment through the sound outlet 112. For more information about the sound production component 11, please refer to other places of the present disclosure, such as FIG. 7, FIG. 14, or FIG. 20A, etc., and their descriptions.

One end of the ear hook 12 may be connected to the sound production component 11 and the other end of the ear hook 12 extends along a junction between the user's ear and head. In some embodiments, the ear hook 12 may be an arc-shaped structure that is adapted to the user's auricle, so that the ear hook 12 can be hung on the user's auricle. For example, the ear hook 12 may have an arc-shaped structure adapted to the junction of the user's head and ear, so that the ear hook 12 can be hung between the user's ear and head. In some embodiments, the ear hook 12 may also be a clamping structure adapted to the user's auricle, so that the ear hook 12 can be clamped at the user's auricle. Exemplarily, the ear hook 12 may include a hook portion (e.g., the first portion 121 shown in FIG. 7) and a connection portion (e.g., the second portion 122 shown in FIG. 7) that are connected in sequence. The connection portion connects the hook portion to the sound production component 11 so that the open earphone 10 is curved in the three-dimensional space when it is in a non-wearing state (i.e., in a natural state). In other words, in the three-dimensional space, the hook portion, the connection portion, and the sound production component 11 are not co-planar. In such cases, when the open earphone 10 is in the wearing state, the hook portion may be primarily for hanging between a rear side of the user's ear and the head, and the sound production component 11 may be primarily for contacting a front side of the user's ear, thereby allowing the sound production component 11 and the hook portion to cooperate to clamp the ear. Exemplarily, the connection portion may extend from the head toward an outside of the head and cooperate with the hook portion to provide a compression force on the front side of the ear for the sound production component 11. The sound production component 11 may specifically be pressed against an area where a part such as the inferior concha 102, the concha boat 103, the triangular fossa 104, the antihelix 105, etc., is located under the compression force so that the outer ear canal 101 of the ear is not obscured when the open earphone 10 is in the wearing state.

In some embodiments, in order to improve the stability of the open earphone 10 in the wearing state, the open earphone 10 may be provided in any one of the following ways or a combination thereof. First, at least a portion of the ear hook 12 is provided as a mimic structure that fits against at least one of the rear side of the ear 100 and the head to increase a contact area of the ear hook 12 with the ear 100 and/or the head, thereby increasing the resistance of the open earphone 10 to fall off from the ear 100. Second, at least a portion of the ear hook 12 is provided with an elastic structure so that it has a certain degree of deformation in the wearing state to increase a positive pressure of the ear hook 12 on the ear and/or the head, thereby increasing the resistance of the open earphone 10 to fall off from the ear. Third, the ear hook 12 is at least partially set to lean against the head in the wearing state, so that it forms a reaction force to press the ear to enable the sound production component 11 to be pressed on the front side of the ear, thereby increasing the resistance of the open earphone 10 to fall off from the ear. Fourth, the sound production component 11 and the ear hook 12 are set to clamp a region where the helix is located, a region where the inferior concha is located, etc., from the front and rear sides of the ear in the wearing state, so as to increase the resistance of the open earphone 10 to fall off from the ear. Fifth, the sound production component 11 or an auxiliary structure connected thereto is set to extend at least partially into cavities such as the inferior concha, the concha boat, the triangular fossa, and the scapha, so as to increase the resistance of the open earphone 10 to falling off from the ear.

In some embodiments, the ear hook 12 may include, but is not limited to, an ear hook, an elastic band, etc., allowing the open earphone 10 to be better fixed to the user and prevent the user from dropping it during use. In some embodiments, the open earphone 10 may not include the ear hook 12, and the sound production component 11 may be placed in the vicinity of the user's ear 100 using a hanging or clamping manner.

In some embodiments, the sound production component 11 may be, for example, circular, elliptical, runway-shaped, polygonal, U-shaped, V-shaped, semi-circular, or other regular or irregular shapes so that the sound production component 11 may be hung directly at the user's ear 100. In some embodiments, the sound production component 11 may have a long-axis direction X and a short-axis direction Y that are perpendicular to the thickness direction Z and orthogonal to each other. The long-axis direction X may be defined as a direction having the largest extension dimension in a shape of a two-dimensional projection plane (e.g., a projection of the sound production component 11 in a plane on which its outer side surface is located, or a projection on a sagittal plane) of the sound production component 11. For example, when the projection shape is rectangular or approximately rectangular, the long-axis direction is a length direction of the rectangle or approximately rectangle. The short-axis direction Y may be defined as a direction perpendicular to the long-axis direction X in the shape of the projection of the sound production component 11 on the sagittal plane. For example, when the projection shape is rectangular or approximately rectangular, the short-axis direction is a width direction of the rectangle or approximately rectangle. The thickness direction Z may be defined as a direction perpendicular to the two-dimensional projection plane, for example, in the same direction as a coronal axis, both pointing to the left-and-right side of the body.

In some embodiments, when the user wears the open earphone 10, the sound production component 11 may be placed in a position near but not blocking the external ear canal 101 of the user. In some embodiments, the projection of the open earphone 10 on the sagittal plane may not cover the user's ear canal while in the wearing state. For example, the projection of the sound production component 11 on the sagittal plane may fall on the left and right sides of the head and be located at the front side of the helix foot in the sagittal axis of the body (e.g., at the position shown in dashed box A in FIG. 2). In this case, the sound production component 11 is located at the front side of the helix foot of the user, the long-axis of the sound production component 11 may be in a vertical or approximately vertical position, the projection of the short-axis direction Y on the sagittal plane is in the same direction as the sagittal axis, the projection of the long-axis direction X on the sagittal plane is in the same direction as a vertical axis, and the thickness direction Z is perpendicular to the sagittal plane. As another example, the projection of the sound production component 11 on the sagittal plane may fall on the antihelix 105 (e.g., at the position shown in the dashed box C in FIG. 2). In this case, the sound production component 11 is at least partially located at the antihelix 105, the long-axis of the sound production component 11 is horizontal or approximately horizontal, the projection of the long-axis direction X of the sound production component 11 on the sagittal plane is in the same direction as the sagittal axis, the projection of the short-axis direction Y on the sagittal plane is in the same direction as the vertical axis and the thickness direction Z is perpendicular to the sagittal plane. In this way, it is possible to avoid the sound production component 11 from blocking the ear canal, thereby freeing the user's ears. It is also possible to increase a contact area between the sound production component 11 and the ear 100, thus improving the wearing comfort of the open earphone 10.

In some embodiments, in the wearing state, the projection of the open earphone 10 on the sagittal plane may also cover or at least partially cover the user's ear canal, for example, the projection of the sound production component 11 on the sagittal plane may fall within the inferior concha 102 (e.g., at the position shown in the dashed box B in FIG. 2) and be in contact with the helix foot 1071 and/or the helix 107. At this point, the sound production component 11 is at least partially located in the inferior concha 102; the sound production component 11 is in an inclined state; the projection of the short-axis direction Y of the sound production component 11 on the sagittal plane may have an angle with the direction of the sagittal axis, i.e., the short-axis direction Y is also set at a corresponding inclination; the projection of the long-axis direction X on the sagittal plane may have an angle with the direction of the sagittal axis, i.e., the long-axis direction X is also set at an inclination; and the thickness direction Z is perpendicular to the sagittal plane. At this point, since the inferior concha 102 has a certain volume and depth, the open earphone 10 has a certain distance between the inner side surface IS and the inferior concha. The ear canal may be communicated with the outside world through the gap between the inner side surface IS and the inferior concha, thus freeing both ears of the user. At the same time, the sound production component 11 and the inferior concha may cooperate to form an auxiliary cavity (e.g., a cavity structure as mentioned later) that is communicated with the ear canal. In some embodiments, the sound outlet 112 may be at least partially located in the aforementioned auxiliary cavity, and the sound exported from the sound outlet 112 is limited by the aforementioned auxiliary cavity, i.e., the aforementioned auxiliary cavity is able to gather the sound, allowing the sound to propagate more into the ear canal, thereby improving the volume and quality of the sound heard by the user in the near-field, and improving the acoustic effect of the open earphone 10.

The description of the above-mentioned open earphone 10 is for the purpose of illustration only, and is not intended to limit the scope of the present disclosure. Those skilled in the art can make various changes and modifications based on the description of this present disclosure. For example, the open earphone 10 may also include a battery assembly, a Bluetooth assembly, etc., or a combination thereof. The battery assembly may be used to power the open earphone 10. The Bluetooth assembly may be used to wirelessly connect the open earphone 10 to other devices (e.g., a cell phone, a computer, etc.). These variations and modifications remain within the scope of protection of the present disclosure.

Figure 3:
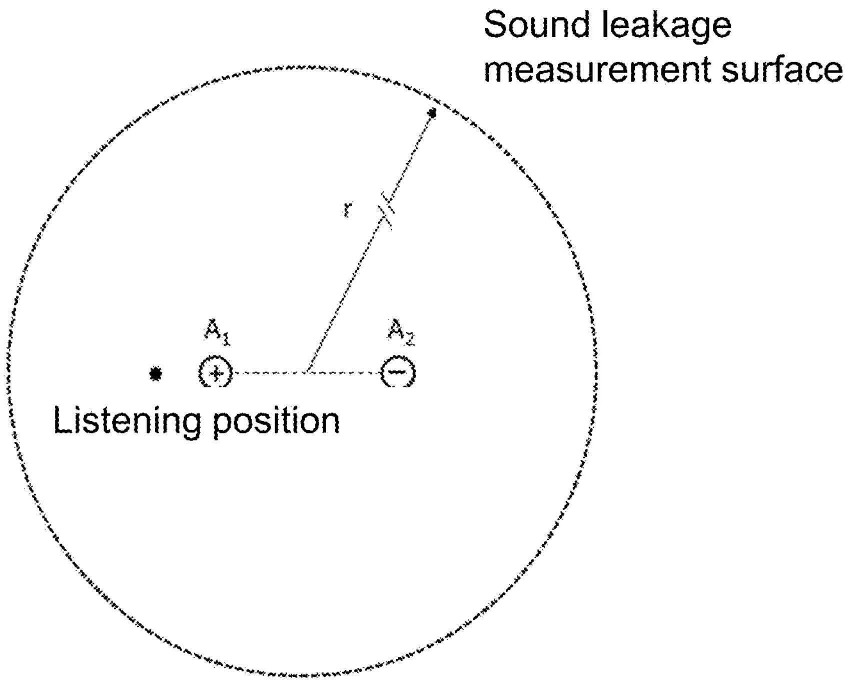
FIG. 3 is a schematic diagram illustrating two point sound sources and a listening position according to some embodiments of the present disclosure.

FIG. 3 is a schematic diagram illustrating two point sound sources and a listening position according to some embodiments of the present disclosure. In some embodiments, referring to FIG. 3, a sound may be transmitted to the outside of the open earphone 10 via the sound outlet 112, which may be treated as a monopole sound source (or a point sound source) A1, and it can produce a first sound. A sound may be transmitted to the outside of the open earphone 10 via the pressure relief hole 113, which may be treated as a monopole sound source (or a point sound source) A2, and it can produce a second sound. The second sound may be in opposite or approximately opposite phase to the first sound, so that the first sound and the second sound can cancel each other out in the far-field, i.e., forming an "acoustic dipole" to reduce sound leakage. In some embodiments, in the wearing state, a line connecting the two monopole sound sources may be pointed toward the ear canal (noted as a "listening position") so that the user can hear a sufficiently loud sound. In this case, a sound pressure level at the listening position (denoted as $P_{ear}$) may be used to characterize the intensity of the sound heard by the user (i.e., a near-field listening sound pressure). Further, the magnitude of the sound pressure (denoted as $P_{far}$) on a sphere centered at the user's listening position (or on a sphere with a center of the dipole sound source (e.g., A1 and A2 as shown in FIG. 3) and a radius of r) may be counted and may be used to characterize the intensity of sound leakage radiated to the far-field by the open earphone 10 (i.e., a far-field leakage sound pressure). $P_{far}$ may be obtained in various statistical ways, for example, by taking an average value of the sound pressure at each point of the sphere, or by taking the sound pressure distribution at each point of the sphere for area integration, etc.

It should be known that the measurement method for sound leakage in the present disclosure is only an exemplary illustration of the principle and effect, and is not limited. The method for measuring and calculating sound leakage may also be reasonably adjusted according to actual conditions. For example, a center of the dipole sound source may be used as a center of a circle, and sound pressure amplitudes of two or more points evenly sampled according to a certain spatial angle in the far-field may be averaged. In some embodiments, the measurement method for listening sound may be to select a position near the point sound source as the listening position, and the sound pressure amplitude measured at that listening position is used as a value of the listening sound. In some embodiments, the listening position may or may not be on the connection line between the two point sound sources. The measurement and calculation of the listening sound may also be reasonably adjusted according to actual conditions, for example, taking the sound pressure amplitude of other points or more than one point in the near-field for averaging. As another example, with a point sound source may be used as a center of a circle, and sound pressure amplitudes of two or more points evenly sampled according to a certain spatial angle in the near-field may be averaged. In some embodiments, a distance between the near-field listening position and a point sound source is much smaller than a distance between the point sound source and the far-field leakage measurement sphere.

Obviously, the sound pressure $P_{ear}$ transmitted by the open earphone 10 to the user's ear should be large enough to increase the listening effect; and the sound pressure $P_{far}$ in the far-field should be small enough to increase the sound leakage reduction effect. Therefore, a sound leakage index a may be taken as an index for evaluating the sound leakage reduction capability of the open earphone 10:

$$\alpha = \frac{|P_{far}|^2}{|P_{ear}|^2}. \tag{1}$$

According to equation (1), it can be seen that the smaller the leakage index is, the stronger the sound leakage reduction ability of the open earphone is, and in the case of the same near-field listening volume at the listening position, the smaller the far-field leakage is.

Figure 4:
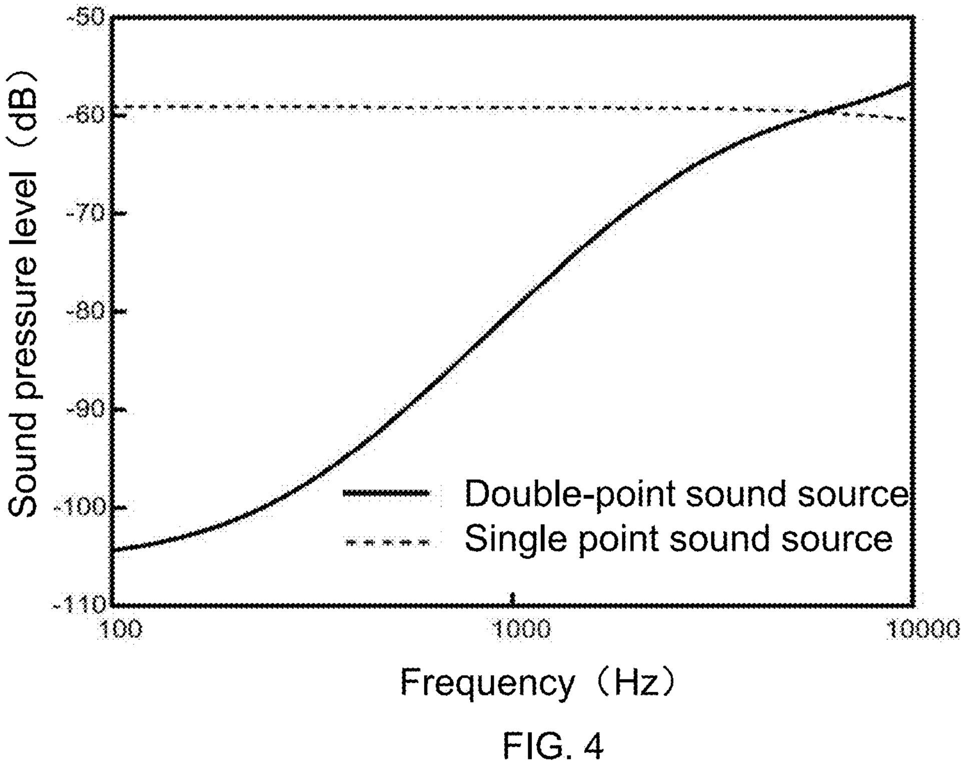
FIG. 4 is a comparison diagram of sound leakage indexes at different frequencies of a single-point sound source and a double-point sound source according to some embodiments of the present disclosure.

FIG. 4 is a comparison diagram of sound leakage indexes at different frequencies of a single-point sound source and a double-point sound source according to some embodiments of the present disclosure. The double-point sound source (also known as a dipole sound source) in FIG. 4 may be a typical double-point sound source, i.e., a distance between two point sound sources is fixed, and the two point sound sources have the same amplitude and the opposite phases. It should be understood that the typical double-point sound source is only for the principle and effect description, and parameters of each point sound source can be adjusted according to the actual needs to make it different from the typical double-point sound source. As shown in FIG. 4, when the distance is fixed, the sound leakage generated by the double-point sound source increases with the increase of frequency, and the sound leakage reduction ability decreases with the increase of frequency. When the frequency is greater than a certain frequency value (for example, about 8000 Hz as shown in FIG. 4), the sound leakage is greater than that of a single-point sound source, and this frequency (for example, 8000 Hz) is an upper frequency at which the double-point sound source can reduce the sound leakage.

In some embodiments, to improve the acoustic output of the open earphone 10, i.e., to increase the sound intensity in the near-field listening position while reducing the volume of the far-field sound leakage, a baffle may be provided between the sound outlet 112 and the pressure relief hole 113.

Figure 5:
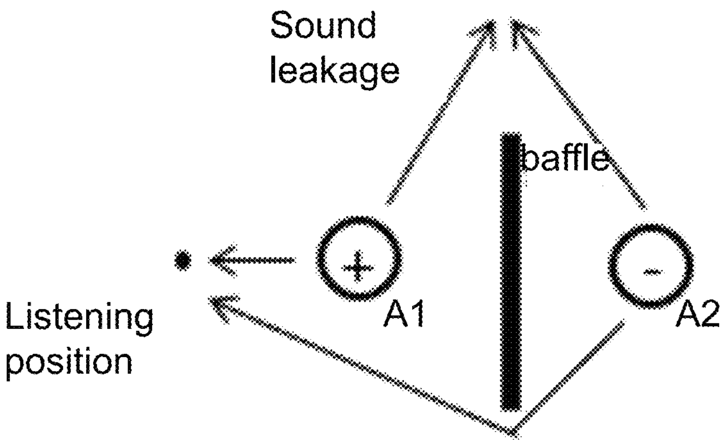
FIG. 5 is a schematic diagram illustrating an exemplary distribution of a baffle provided between two sound sources of a dipole sound source according to some embodiments of the present disclosure.

FIG. 5 is a schematic diagram illustrating an exemplary distribution of a baffle provided between two sound sources of a dipole sound source according to some embodiments of the present disclosure. As shown in FIG. 5, when a baffle is provided between a point sound source A1 and a point sound source A2, in the near-field, a sound wave of the point sound source A2 needs to bypass the baffle to interfere with a sound wave of the point sound source A1 at the listening position, which is equivalent to an increase in a sound path from the point sound source A2 to the listening position. Therefore, assuming that the point sound source A1 and the point sound source A2 have the same amplitude, the amplitude difference between the sound waves of the point sound source A1 and the point sound source A2 at the listening position increases compared to the case without the baffle, thus reducing the degree of cancellation of the two sounds at the listening position and making the volume at the listening position increase. In the far-field, since the sound waves generated by the point sound source A1 and the point sound source A2 can interfere without bypassing the baffle in a large spatial area (similar to the case without the baffle), the sound leakage in the far-field does not increase significantly compared to the case without the baffle. Therefore, a baffle structure around one of the point sound sources A1 and A2 may significantly increase the volume of the near-field listening position without significantly increasing the volume of the far-field sound leakage.

Figure 6:
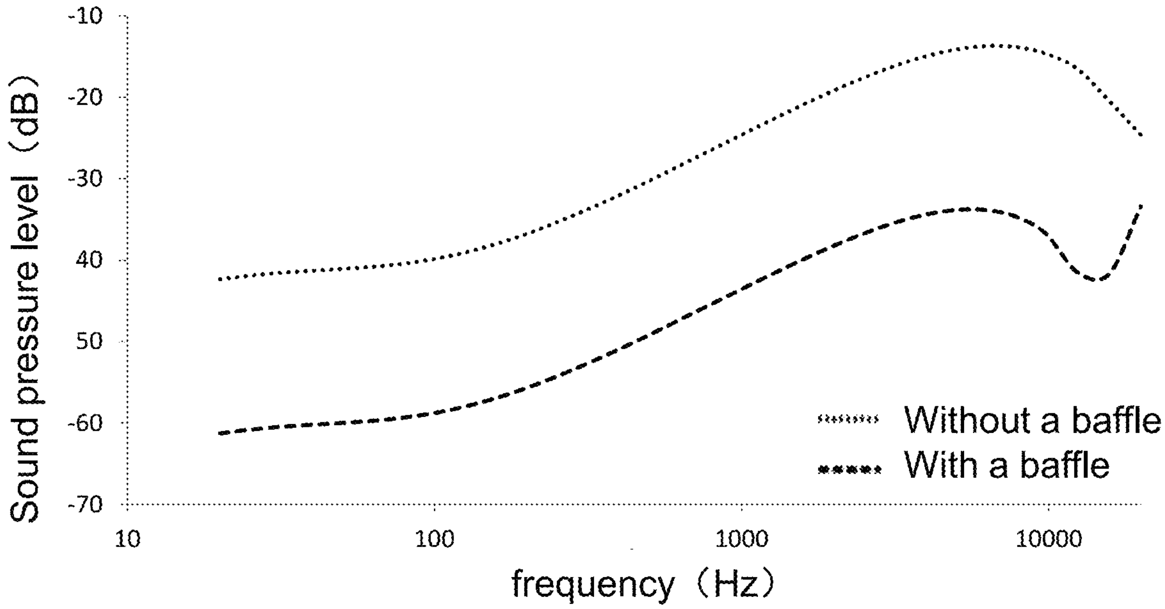
FIG. 6 is a diagram illustrating sound leakage indexes with and without a baffle between two sound sources of a dipole sound source according to some embodiments of the present disclosure.

FIG. 6 is a diagram illustrating sound leakage indexes with and without a baffle between two sound sources of a dipole sound source according to some embodiments of the present disclosure. After adding the baffle between the two point sound sources, in the near-field, it is equivalent to increasing the distance between the two point sound sources, the volume of the listening position in the near-field is equivalent to being generated by the double-point sound source at a greater distance, the listening volume in the near-field is significantly increased compared to the case without the baffle; in the far-field, a sound field of the double-point sound source is less affected by the baffle, and the resulting sound leakage is equivalent to being generated by the double-point sound source at a smaller distance. Therefore, as shown in FIG. 6, after adding the baffle, the leakage index is much smaller than that without the baffle, i.e., at the same listening volume, the sound leakage in the far-field is smaller than that in the case without the baffle, and the sound leakage reduction ability is obviously enhanced.

Figure 7:
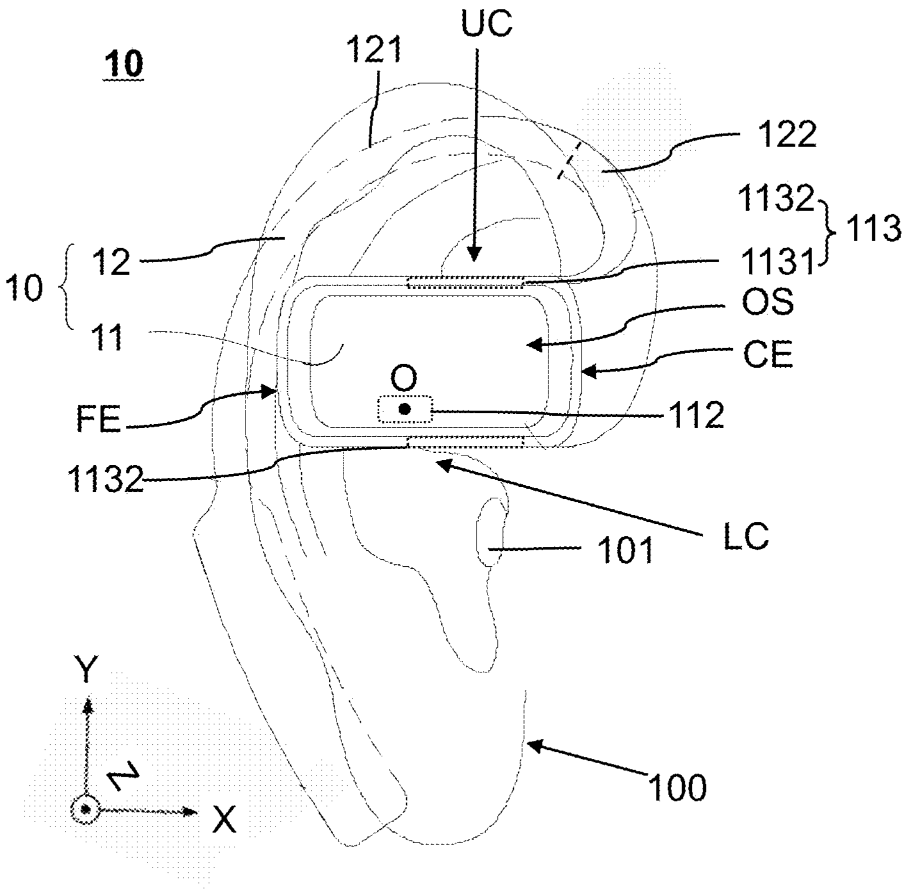
FIG. 7 is a schematic diagram illustrating an exemplary wearing state of an open earphone according to some embodiments of the present disclosure.
Figure 8:
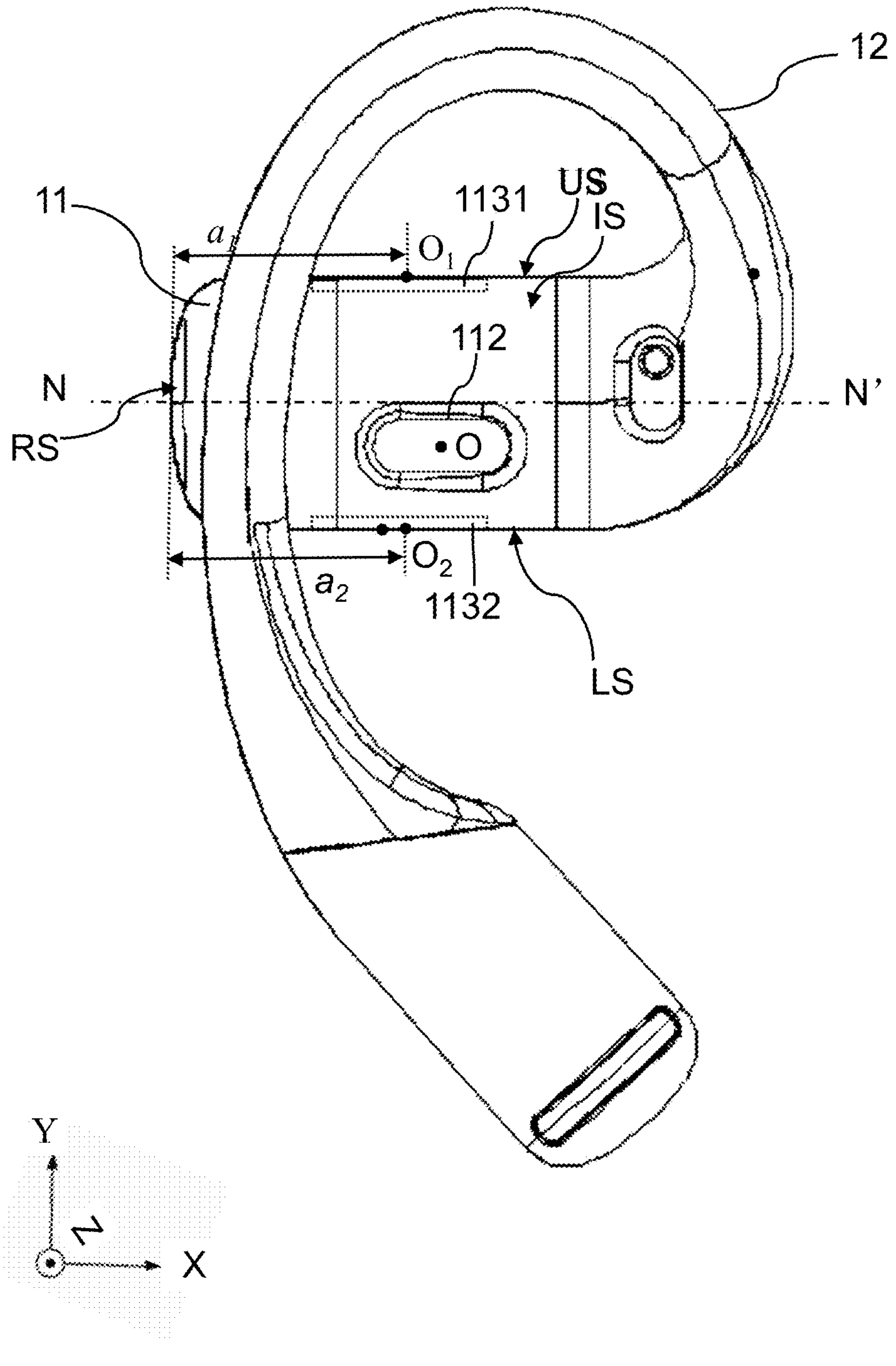
FIG. 8 is a schematic diagram illustrating a structure of a side of the open earphone shown in FIG. 7 facing the ear.
Figure 9:
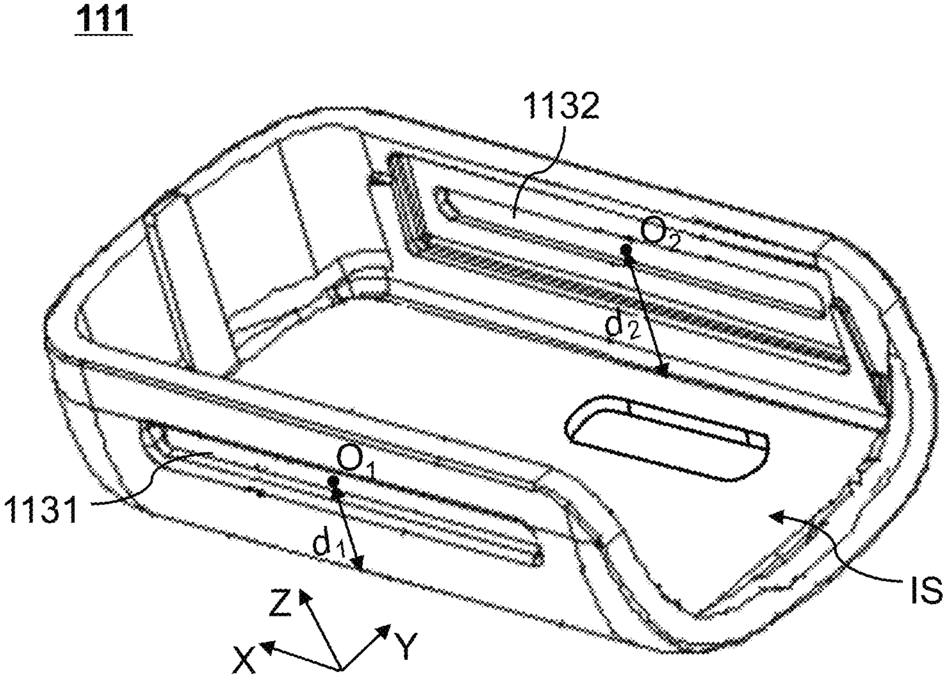
FIG. 9 is a schematic diagram illustrating a structure of a housing shown in FIG. 8.

FIG. 7 is a schematic diagram illustrating an exemplary wearing state of an open earphone according to some embodiments of the present disclosure. FIG. 8 is a schematic diagram illustrating a structure of a side of the open earphone shown in FIG. 7 facing the ear. FIG. 9 is a schematic diagram illustrating a structure of a housing of the open earphone shown in FIG. 7.

As shown in FIG. 7, the ear hook 12 is an arc-shaped structure that fits at the junction of the user's head and the ear 100. The sound production component 11 (or the housing 111 of the sound production component 11) may have a connection end CE connected to the ear hook 12 and a free end FE not connected to the ear hook 12. When the open earphone 10 is in the wearing state, a first portion 121 of the ear hook 12 (e.g., the hook portion of the ear hook 12) is positioned between the user's ear (e.g., the helix 107) and the head, and a second portion 122 of the ear hook 12 (e.g., the connection portion of the ear hook) extends toward a side of the auricle away from the head and connects to the connection end CE of the sound production component 11 to hold the sound production component 11 in a position near the ear canal but without blocking the ear canal.

Referring to FIGS. 7 and 8, the sound production component 11 may have an inner side surface IS (also called an inner side surface of the housing 111) facing the ear along the thickness direction Z in the wearing state, an outer side surface OS (also called an outer side surface of the housing 111) away from the ear, and a connection surface connecting the inner side surface IS and the outer side surface OS. It should be noted that in the wearing state, when viewed along a direction in which the coronal axis (i.e., the thickness direction Z), the sound production component 11 may be provided in a shape of a circle, an oval, a rounded square, a rounded rectangle, etc. When the sound production component 11 is provided in the shape of a circle, an ellipse, etc., the above-mentioned connection surface may refer to an arc-shaped side surface of the sound production component 11; and when the sound production component 11 is set in the shape of a rounded square, a rounded rectangle, etc., the above-mentioned connection surface may include a lower side surface LS (also referred to as a lower side surface of the housing 111), an upper side surface US (also referred to as an upper side surface of the housing 111), and a rear side surface RS (also referred to as a rear side surface of the housing 111) as mentioned later. The upper side surface US and the lower side surface LS may refer to a side of the sound production component 11 in the wearing state along the short-axis direction Y away from the external ear canal 101 and a side of the sound production component 11 in the wearing state along the short-axis direction Y facing to the external ear canal 101, respectively; and the rear side surface RS may refer to a side of the sound production component 11 in the wearing state along the length direction X toward the back of the head. For the sake of description, the present disclosure is exemplarily illustrated with the sound production component 11 set in a rounded rectangle. The length of the sound production component 11 in the long-axis direction X may be greater than the width of the sound production component 11 in the short-axis direction Y. In some embodiments, the rear side surface RS of the earphone may be curved in order to improve the aesthetics and wearing comfort of the earphone.

The sound production component 11 may be provided with a transducer that can convert an electrical signal into a corresponding mechanical vibration to produce sound. The transducer (e.g., a diaphragm) may divide the housing 111 to form a front cavity and a rear cavity of the earphone. The sound produced in the front and rear cavities is in opposite phase. The inner side surface IS is provided with a sound outlet 112 communicated with the front cavity to transmit the sound generated in the front cavity out of the housing 111 and into the ear canal so that the user can hear the sound. Other sides of the housing 111 (e.g., the outer side surface OS, the upper side surface US, or the lower side surface LS, etc.) may be provided with one or more pressure relief holes 113 communicated with the rear cavity for guiding the sound generated in the rear cavity output of the housing 111 to interfere with the sound output from the sound outlet 112 in the far-field. In some embodiments, the pressure relief holes 113 are farther away from the ear canal than the sound outlet 112 so as to weaken the inverse phase cancellation between the sound output via the pressure relief holes 113 and the sound output via the sound outlet 112 at the listening position (e.g., the ear canal), thereby increasing the sound volume at the listing position.

In some embodiments, in addition to the inner side surface IS, the other side surfaces of the housing 111 (e.g., the outer side surface OS, the upper side surface US, or the lower side surface LS, etc.) may be provided with at least two pressure relief holes 113. The at least two pressure relief holes 113 can destroy a standing wave in the rear cavity, so that a resonant frequency of the sound transmitted out of the housing 111 by the pressure relief holes 113 is as high as possible, a frequency response of the rear cavity has a relatively wide flat region (e.g., a region before a resonant peak), and a better sound leakage reduction effect in a middle and high-frequency range (e.g., 2 kHz-6 kHz) can be realized. Merely by way of example, the pressure relief holes 113 may include a first pressure relief hole 1131 and a second pressure relief hole 1132. The second pressure relief hole 1132 may be closer to the sound outlet 112 than the first pressure relief hole 1131. In some embodiments, the first pressure relief hole 1131 and the second pressure relief hole 1132 may be disposed on the same side surface of the housing 111. For example, the first pressure relief hole 1131 and the second pressure relief hole 113 may be both disposed on the outer side surface OS, the upper side surface US, or lower side surface LS. In some embodiments, the first pressure relief hole 1131 and the second pressure relief hole 1132 may be respectively disposed on two different side surfaces of the housing 111. For example, the first pressure relief hole 1131 may be disposed on the outer side surface OS, and the second pressure relief hole 1131 may be disposed on the upper side surface US, or the first pressure relief hole 1131 may be disposed on the outer side surface OS, and the second pressure relief hole 1132 may be disposed on the lower side surface LS. In some embodiments, in order to destroy the standing wave in the rear cavity to the greatest extent, the two pressure relief holes 113 may be located on two opposite sides of the housing 111, for example, the first pressure relief hole 1131 may be disposed on the upper side surface US, and the second pressure relief hole 1132 may be disposed on the lower side surface LS. For ease of description, the present disclosure is exemplarily illustrated with the first pressure relief hole 1131 disposed on the upper side surface US and the second pressure relief hole 1132 disposed on the lower side surface LS.

Figure 16:
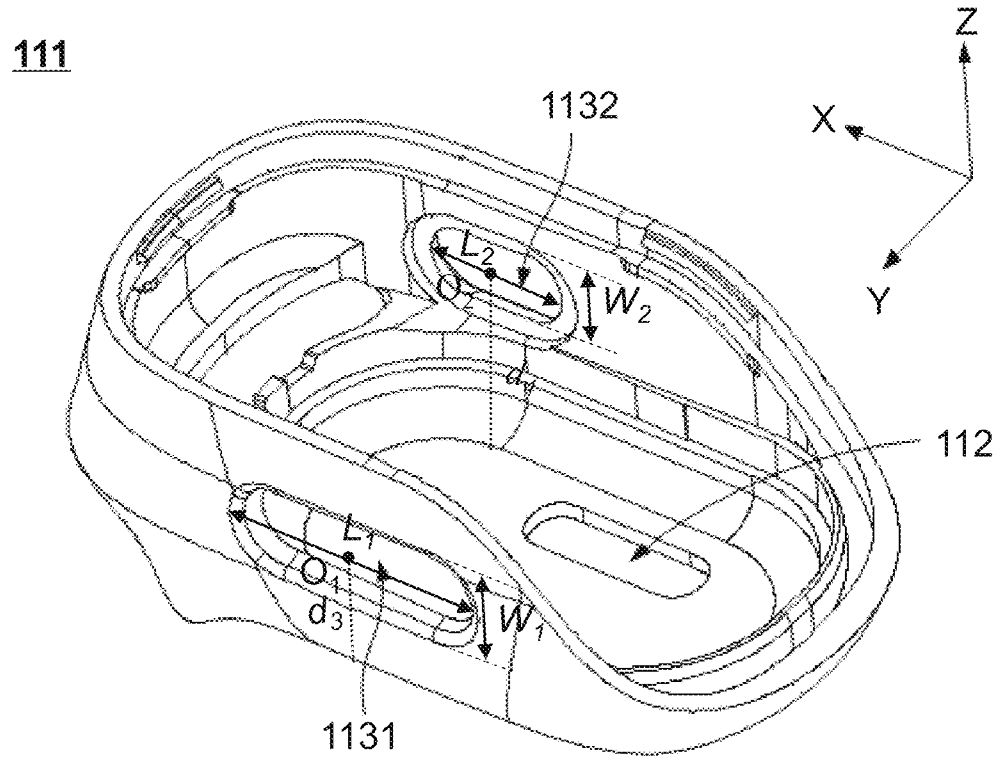
FIG. 16 is a schematic diagram illustrating a structure of a housing of an open earphone according to some embodiments of the present disclosure.

In some embodiments, in order to avoid that the sound output via the first pressure relief hole 1131 and the second pressure relief hole 1132 affecting the volume of the sound output via the sound outlet 112 at the listening position, the first pressure relief hole 1131 and the second pressure relief hole 1132 should be as far away from the sound outlet 112 as possible. For example, a center of the sound outlet 112 may be located on or near a mid-perpendicular plane of a line connecting a center of the first pressure relief hole 1131 and a center of the second pressure relief hole 1132. In some embodiments, a distance from the center of the sound outlet 112 to the mid-perpendicular plane of the line connecting the center of the first pressure relief hole 1131 and the center of the second pressure relief hole 1132 may be in a range of 0 mm to 2 mm. In some embodiments, in order to further prevent the sound generated by the second pressure relief hole 1132 from canceling the sound generated by the sound outlet 112 in the ear canal (i.e., the listening position) to reduce the listening volume, an intensity of the sound transmitted out of the second pressure relief hole 1132 and into the ear canal may be reduced by reducing an area of the second pressure relief hole 1132. At this time, the area of the second pressure relief hole 1132 may be smaller than an area of the first pressure relief hole 1131 (as shown in FIG. 16).

In some embodiments, as shown in FIG. 7, when the open earphone 10 is in the wearing state, the long-axis direction X of the sound production component 11 may be set horizontally or approximately horizontally (similar to position C shown in FIG. 2). In such cases, the sound production component 11 is located at least partially at the antihelix 105, and the free end FE of the sound production component 11 may be oriented toward the back of the head. With the sound production component 11 in a horizontal or approximately horizontal state, the projection of the long-axis direction X of the sound production component 11 on the sagittal plane may be in the same direction as the sagittal axis, the projection of the short-axis direction Y on the sagittal plane may be in the same direction as the vertical axis, and the thickness direction Z is perpendicular to the sagittal plane.

In some embodiments, in order to improve the fit between the open earphone 10 and the ear 100 and improve the stability of the open earphone 10 in the wearing state, the inner side surface IS of the housing 111 may be pressed onto the surface of the ear 100 (e.g., the antihelix 105) to increase the resistance of the open earphone 10 falling off the ear 100.

In some embodiments, referring to FIGS. 7 and 8, when the open earphone 10 is pressed onto the ear 100, in order to keep the sound outlet 112 on the inner side surface IS from being obstructed by ear tissues, the projection of the sound outlet 112 on the sagittal plane may partially or fully coincide with the projection of an inner concave structure (e.g., the concha boat 103) of the ear on the sagittal plane. In some embodiments, since the concha boat 103 is communicated with the inferior concha 102 and the ear canal is located in the inferior concha 102, when at least a portion of the projection of the sound outlet 112 on the sagittal plane is located within the concha boat 103, the sound output from the sound outlet 112 may reach the ear canal unobstructed, resulting in a higher volume received by the ear canal. In some embodiments, a long-axis dimension of the sound production component 11 may not be too long. If the long-axis dimension of the sound production component 11 is too long, the projection of the free end FE on the sagittal plane may exceed the projection of the ear on the sagittal plane, thereby affecting the fitting effect of the sound production component 11 to the ear. Therefore, the long-axis dimension of the sound production component 11 may be designed so that the projection of the free end FE on the sagittal plane does not exceed the projection of the helix 107 on the sagittal plane.

It should be known that since the sound outlet 112 and the pressure relief holes 113 (e.g., the first pressure relief hole 1131 and the second pressure relief hole 1132) are provided on the housing 111 and each side wall of the housing 111 has a certain thickness, the sound outlet 112 and the pressure relief holes 113 are holes with a certain depth. At this time, the sound outlet 112 and the pressure relief holes 113 may have an inner opening and an outer opening. For ease of description, in the present disclosure, the center O of the sound outlet 112 described above and below refers to a centroid of the outer opening of the sound outlet 112, the centers of pressure relief holes 113 described above and below refer to the centroids of the outer openings of the pressure relief holes 113 (e.g., the center O1 of the first pressure relief hole 1131 refers to the centroid of the outer opening of the first pressure relief hole 1131, the center O2 of the second pressure relief hole 1132 refers to the centroid of the outer opening of the second pressure relief hole 1132). In the present disclosure, for ease of description, areas of the sound hole 112 and the pressure relief holes 113 (e.g., the first pressure relief hole 1131 and/or the second pressure relief hole 1132) refer to areas of the outer openings of the sound outlet 112 and the pressure relief holes 113 (e.g., the area of the outer opening of the sound outlet 112 on the inner side surface IS, the area of the outer opening of the first pressure relief hole 1131 on the upper side surface US, and the area of the outer opening of the second pressure relief hole 1132 on the lower side surface LS). It should be known that in other embodiments, the areas of the sound hole 112 and the pressure relief holes 113 also refer to other cross-sectional areas of the sound hole 112 and the pressure relief holes 113, such as areas of the inner openings of the sound hole 112 and/or the pressure relief holes 113, or an average of the areas of the inner openings and the outer openings of the sound hole 112 and/or the pressure relief holes 113, etc.

In the present disclosure, the sound outlet 112 communicating with the front cavity may be regarded as the point sound source A1 shown in FIG. 5, and the pressure relief holes 113 (e.g., the first pressure relief hole 1131 and/or the second pressure relief hole 1132) communicating with the rear cavity may be regarded as the point sound source A2 shown in FIG. 5, respectively. The ear canal may be regarded as the listening position shown in FIG. 5. At least part of the housing of the sound production component 11 and/or at least part of the auricle may be regarded as the baffle shown in FIG. 5 to increase a difference between sound paths from the sound outlet 112 and the first pressure relief hole 1131 and/or the second pressure relief hole 1132 to the ear canal so as to increase the sound intensity at the ear canal while maintaining the far-field sound leakage reduction effect. When the open earphone 10 adopts the structure shown in FIG. 7, i.e., when at least a portion of the housing 111 is located at the antihelix 105, in terms of the listening effect, a sound wave of the sound outlet 112 may reach the ear canal directly. In this case, the sound outlet 112 may be provided at a position on the inner side surface IS close to the lower side surface LS, and at least one pressure relief hole may be provided at a position away from the sound outlet 112, for example, the first pressure relief hole 1131 may be provided at a position on the outer side surface OS or the upper side surface US away from the sound outlet 112. A sound wave of the first pressure relief hole 1131 needs to bypass the exterior of the sound production component 11 to interfere with the sound wave of the sound outlet 112 at the ear canal. In addition, upper convex and lower concave structures on the auricle (e.g., an antihelix, a tragus, etc., in its propagation path) increase the sound path of the sound transmitted from the first pressure relief hole 1131 to the ear canal. Thus, the sound production component 11 itself and/or at least a portion of the auricle is equivalent to a baffle between the sound outlet 112 and the first pressure relief hole 1131. The baffle increases the sound path from the first pressure relief hole 1131 to the ear canal and reduces the intensity of the sound wave from the first pressure relief hole 1131 in the ear canal, thereby reducing a cancellation degree between the sounds transmitted from the sound outlet 112 and the first pressure relief hole 1131 in the ear canal, resulting in an increase in the volume in the ear canal. In terms of the sound leakage effect, since the sound waves generated by the sound outlet 112 and the first pressure relief hole 1131 and/or the second pressure relief hole 1132 can interfere without bypassing the sound production component 11 itself in a relatively large spatial area (similar to the case without a baffle), the sound leakage is not increased significantly. Therefore, by setting the sound outlet 112, the first pressure relief hole 1131, and the second pressure relief hole 1132 at suitable positions, it is possible to significantly increase the volume in the ear canal without a significant increase in the leakage sound volume.

In some embodiments, when the projection of the free end FE on the sagittal plane does not exceed the projection of the helix 107 on the sagittal plane, in order to facilitate manufacturing, the first pressure relief hole 1131 and the second pressure relief hole 1132 may be approximately symmetrically distributed with respect to a long-axis center plane (e.g., a plane NN' perpendicular to a plane of paper facing inward shown in FIG. 8) of the sound production component 11. In some embodiments, a difference between a distance $a_2$ from the center $O_2$ of the second pressure relief hole 1132 on the lower side surface LS to the rear side surface RS and a distance $a_1$ from the center $O_1$ of the first pressure relief hole 1131 on the upper side surface US to the rear side surface RS is smaller than 10%. In some embodiments, the difference between the distance $a_2$ from the center $O_2$ of the second pressure relief hole 1132 on the lower side surface LS to the rear side surface RS and the distance $a_1$ from the center $O_1$ of the first pressure relief hole 1131 on the upper side surface US to the rear side surface RS is smaller than 5%. In some embodiments, the difference between the distance $a_2$ from the center $O_2$ of the second pressure relief hole 1132 on the lower side surface LS to the rear side surface RS and the distance $a_1$ from the center $O_1$ of the first pressure relief hole 1131 on the upper side surface US to the rear side surface RS is smaller than 2%. It should be known that, in some embodiments, in order to improve the aesthetics and wearing comfort of the earphone, the rear side surface RS of the earphone may be a curved surface. When the rear side surface RS is the curved surface, a distance from a certain position (e.g., the center $O_1$ of the first pressure relief hole 1131) to the rear side surface RS refers to a distance from the position to a tangent plane of the rear side surface RS parallel to the short-axis.

In some embodiments, since the sound hole 112 is set close to the ear canal, the second pressure relief hole 1132 on the lower side surface LS should be set as far away from the sound hole 112 as possible, so that a cancellation effect of the sound transmitted by the second pressure relief hole 1132 at the listening position (e.g., the ear canal) and the sound transmitted by the sound outlet 112 is weakened, thereby increasing the volume at the listening position. Therefore, when the sound outlet 112 is set close to the lower side surface LS and the connection end CE, the second pressure relief hole 1132 can be set close to the rear side surface RS, so that a distance between the sound outlet 112 and the second pressure relief hole 1132 can be as far as possible. In some embodiments, when a projection of the free end FE on the sagittal plane does not exceed a projection of the helix 107 on the sagittal plane, the distance $a_2$ from the center $O_2$ of the second pressure relief hole 1132 to the rear side surface RS may be in a range of 8.60 mm to 20.27 mm. In some embodiments, the distance $a_2$ from the center $O_2$ of the second pressure relief hole 1132 to the rear side surface RS may be in a range of 8.60 mm to 12.92 mm. In some embodiments, the distance $a_2$ from the center $O_2$ of the second pressure relief hole 1132 to the rear side surface RS may be in a range of 9.60 mm to 11.92 mm. In some embodiments, when the open earphone 10 is in the wearing state, the free end FE may contact with the ear (e.g., the helix 107), causing a portion of the upper side surface US and/or the lower side surface LS to be blocked by the ear. At this time, in order to prevent the second pressure relief hole 1132 on the lower side surface LS (or the first pressure relief hole 1131 on the upper side surface US) from being blocked by the ear 100 to affect the acoustic performance of the open earphone 10, the distance $a_2$ from the center $O_2$ of the second pressure relief hole 1132 to the rear side surface RS may be in a range of 10.10 mm to 11.42 mm. More preferably, the distance $a_2$ from the center $O_2$ of the second pressure relief hole 1132 to the rear side surface RS may be in a range of 10.30 mm to 11.12 mm. More preferably, the distance $a_2$ from the center $O_2$ of the second pressure relief hole 1132 to the rear side surface RS may be within a range of 10.60 mm to 11.82 mm.

In some embodiments, when the difference between the distance $a_2$ from the center $O_2$ of the second pressure relief hole 1132 to the rear side surface RS and the distance $a_1$ from the center $O_1$ of the first pressure relief hole 1131 to the rear side surface RS is smaller than 10%, the distance $a_1$ from the center $O_1$ of the first pressure relief hole 1131 to the rear side surface RS may be in a range of 8.60 mm to 15.68 mm. In some embodiments, the distance $a_1$ from the center $O_1$ of the first pressure relief hole 1131 to the rear side surface RS may be in a range of 8.60 mm to 12.92 mm. In some embodiments, in order to make the projection of the first pressure relief hole 1131 on the sagittal plane largely coincide with a projection of an inner concave structure of the ear on the sagittal plane, the distance $a_1$ from the center $O_1$ of the first pressure relief hole 1131 to the rear side surface RS may be in a range of 9.60 mm to 11.92 mm. Preferably, the distance a1 from the center $O_1$ of the first pressure relief hole 1131 to the rear side surface RS may be in a range of 10.10 mm to 11.42 mm. More preferably, the distance $a_1$ from the center $O_1$ of the first pressure relief hole 1131 to the rear side surface RS may be in a range of 10.30 mm to 11.12 mm. More preferably, the distance $a_1$ from the center $O_1$ of the first pressure relief hole 1131 to the rear side surface RS may be in a range of 10.60 mm to 11.82 mm.

In some embodiments, the first pressure relief hole 1131 may be farther away from the sound outlet 112 than the second pressure relief hole 1132, and since the gap between the ear 100 and the inner side surface IS is small, the sound generated by the first pressure relief hole 1131 is more difficult to transmit to the ear canal compared to the second pressure relief hole 1132. Therefore, in some embodiments, the distance from the center $O_1$ of the first pressure relief hole 1131 to the rear side surface RS may be smaller than the distance from the center $O_2$ of the second pressure relief hole 1132 to the rear side surface RS. For example, the distance from the center $O_1$ of the first pressure relief hole 1131 to the rear side surface RS may be in a range of 10.44 mm to 15.68 mm, and the distance from the center $O_2$ of the second pressure relief hole 1132 to the rear side surface RS may be in a range of 13.51 mm to 20.27 mm.

In some embodiments, referring to FIG. 9, in order to increase the sound path from the first pressure relief hole 1131 and/or the second pressure relief hole 1132 to the ear canal, a dimension of the open earphone 10 in the thickness direction Z may be increased, thereby improving the sound production efficiency (i.e., the listening volume at the listening position) of the open earphone 10. Further, the first pressure relief hole 1131 and/or the second pressure relief hole 1132 may be set away from the inner side surface IS, thereby further increasing the sound path from the first pressure relief hole 1131 and/or the second pressure relief hole 1132 to the ear canal, and improving the sound production efficiency of the open earphone 10. In addition, an overall dimension of the sound production component 11 may not be too large (e.g., a dimension of the sound production component 11 in the Z direction may not be too large), otherwise, an overall mass of the open earphone 10 may be increased, affecting the wearing comfort of the user. In some embodiments, a distance $d_1$ from the center $O_1$ of the first pressure relief hole 1131 to the inner side surface IS may be in a range of 4.24 mm to 7.96 mm. In some embodiments, the distance $d_1$ from the center $O_1$ of the first pressure relief hole 1131 to the inner side surface IS may be in a range of 4.43 mm to 7.96 mm. In some embodiments, the distance $d_1$ from the center $O_1$ of the first pressure relief hole 1131 to the inner side surface IS may be in a range of 5.43 mm to 6.96 mm. In some embodiments, in the wearing state, in order to make the projection of the first pressure relief hole 1131 on the horizontal plane less or not coincide with the projection of the ear 100 on the horizontal plane, and realize that the sound output by the first pressure relief hole 1131 and/or the second pressure relief hole 1132 can be more radiated to the outside, instead of being transmitted to the ear canal or transmitted to the ear canal after being reflected and refracted by some structures of the ear 100 (e.g., the auricle), the first pressure relief hole 1131 and/or the second pressure relief hole 1132 may be set away from the inner side surface IS. By setting in this way, the sound path from the first pressure relief hole 1131 and/or the second pressure relief hole 1132 to the ear canal can be further increased, and the sound production efficiency of the open earphone 10 can be improved. In some embodiments, the distance $d_1$ from the center $O_1$ of the first pressure relief hole 1131 to the inner side surface IS may be in a range of 5.63 mm to 7.96 mm. In some embodiments, the distance $d_1$ from the center $O_1$ of the first pressure relief hole 1131 to the inner side surface IS may be in a range of 6.25 mm to 7.56 mm.

In some embodiments, a distance $d_2$ from the center $O_2$ of the second pressure relief hole 1132 to the inner side surface IS may be the same as the distance $d_1$ from the center $O_1$ of the first pressure relief hole 1131 to the inner side surface IS. In some embodiments, the distance $d_2$ from the center $O_2$ of the second pressure relief hole 1132 to the inner side surface IS may be in a range of 4.43 mm to 7.96 mm. In some embodiments, the distance $d_2$ from the center $O_2$ of the second pressure relief hole 1132 to the inner side surface IS may be in a range of 5.43 mm to 6.96 mm. In some embodiments, the distance $d_2$ from the center $O_2$ of the second pressure relief hole 1132 to the inner side surface IS may be in a range of 5.63 mm to 7.96 mm. In some embodiments, the distance $d_2$ from the center $O_2$ of the second pressure relief hole 1132 to the inner side surface IS may be in a range of 6.25 mm to 7.56 mm.

In some embodiments, in order to make the sound outlet 112 close to the ear canal to increase the volume at the listening position, the sound outlet 112 should be close to the lower side surface LS. In this case, the second pressure relief hole 1132 is closer to the inner side surface IS than the first pressure relief hole 1131. In order to weaken the cancellation effect between the sound transmitted by the second pressure relief hole 1132 and the sound transmitted by the sound outlet 112 at the listening position (i.e., the ear canal) to increase the volume at the listening position, the second pressure relief hole 1132 may be farther away from the inner side surface IS than the first pressure relief hole 1131 in the Z-direction, i.e., the distance $d_2$ from the center $O_2$ of the second pressure relief hole 1132 to the inner side surface IS may be different from the distance $d_1$ from the center $O_1$ of the first pressure relief hole 1131 to the inner side surface IS. For example, the distance $d_1$ from the center $O_1$ of the first pressure relief hole 1131 to the inner side surface IS may be in a range of 5.63 mm to 6.5 mm, and the distance $d_2$ from the center $O_2$ of the second pressure relief hole 1132 to the inner side surface IS may be in a range of 6.5 mm to 7.56 mm.

The description of the above-mentioned open earphone 10 is for the purpose of illustration only, and is not intended to limit the scope of the present disclosure. Those skilled in the art can make various changes and modifications based on the description of the present disclosure. For example, when only one pressure relief hole is provided on the sound production component 11, the pressure relief hole may be any one of the above-mentioned first pressure relief hole 1131 and second pressure relief hole 1132. For example, the pressure relief hole may be the above-mentioned first pressure relief hole 1131, i.e., the pressure relief hole may be disposed on the upper side surface US. The distance from the center of the pressure relief hole to the inner side surface IS may be in a range of 4.24 mm to 7.96 mm, and the distance from the center of the pressure relief hole to the rear side surface RS may be in a range of 8.60 mm to 15.68 mm. These changes and modifications still fall within the scope of protection of the present disclosure.

Figure 10:
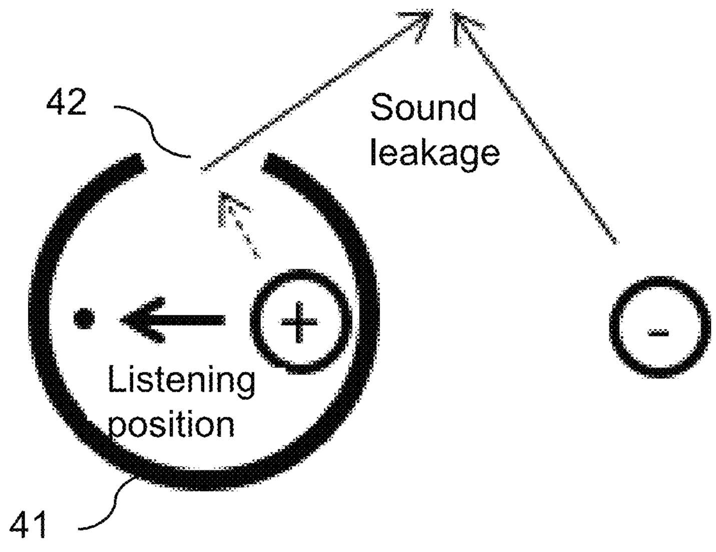
FIG. 10 is a distribution schematic diagram of a cavity structure arranged around one sound source of a dipole sound source according to some embodiments of the present disclosure.

In some embodiments, in order to increase the listening volume, particularly at low and middle frequencies, while still retaining the effect of far-field leakage cancellation, a cavity structure may be constructed around one of the sources of the double-point sound source. FIG. 10 is a distribution schematic diagram of a cavity structure arranged around one sound source of a dipole sound source according to some embodiments of the present disclosure.

As shown in FIG. 10, the cavity structure 41 is provided between the dipole sound source such that one sound source of the dipole sound source and the listening position is inside the cavity structure 41 and the other sound source is outside the cavity structure 41. A sound derived from the sound source inside the cavity structure 41 is limited by the cavity structure 41, i.e., the cavity structure 41 is able to gather the sound so that the sound can propagate more to the listening position, thereby improving the volume and quality of the sound at the listening position. In the present disclosure, the "cavity structure" can be understood as a semi-enclosed structure enclosed by a side wall of the sound production component 11 together with the inferior concha structure, which is such that the interior is not completely sealed off from the external environment, but has a leaking structure 42 (e.g., an opening, a slit, a pipe, etc.) that is acoustically communicated with the external environment. Exemplary leaking structures may include, but are not limited to, an opening, a slit, a pipe, etc., or any combination thereof.

In some embodiments, the cavity structure 41 may contain a listening position and at least one sound source. Here, "contain" may mean that at least one of the listening position and the sound source is inside the cavity, or it may mean that at least one of the listening position and the sound source is at an edge inside the cavity. In some embodiments, the listening position may be an opening of the ear canal or an acoustic reference point of the ear.

Figure 11A:
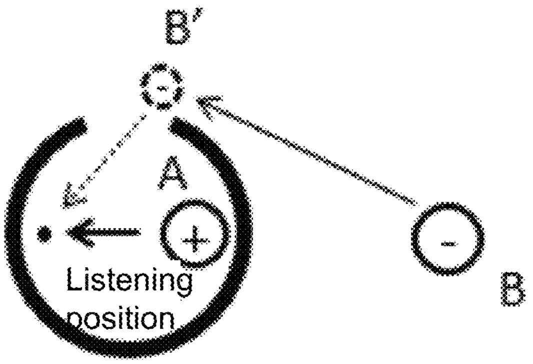
FIG. 11A is a schematic diagram illustrating a listening principle of a dipole sound source structure and a cavity structure constructed around one sound source of the dipole sound source according to some embodiments of the present disclosure.
Figure 11B:
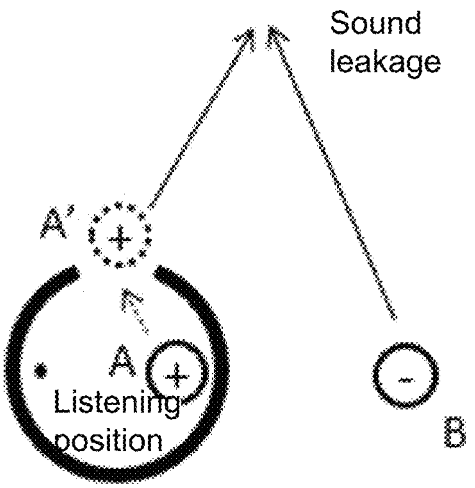
FIG. 11B is a schematic diagram illustrating a sound leakage principle of a dipole sound source structure and a cavity structure constructed around one sound source of the dipole sound source according to some embodiments of the present disclosure.

FIG. 11A is a schematic diagram illustrating a listening principle of a dipole sound source structure and a cavity structure constructed around one sound source of the dipole sound source according to some embodiments of the present disclosure. FIG. 11B is a schematic diagram illustrating a sound leakage principle of a dipole sound source structure and a cavity structure constructed around one sound source of the dipole sound source according to some embodiments of the present disclosure.

For the near-field listening sound, as a dipole with a cavity structure is constructed around one of the sound sources shown in FIG. 11A, and since one sound source A of the sound sources is wrapped by the cavity structure, most of the sound radiated from the sound source A may reach the listening position in a direct emission or reflection manner. In contrast, in the absence of the cavity structure, most of the sound radiated from the sound source does not reach the listening position. Therefore, the cavity structure makes it possible to significantly increase the volume of sound reaching the listening position. At the same time, only a small portion of an inversion sound radiated from an inversion source B outside the cavity structure enters the cavity structure through a leaking structure of the cavity structure. This is equivalent to the creation of a secondary sound source B' at the leaking structure, whose intensity is significantly smaller than that of the sound source B and also significantly smaller than that of the sound source A. The sound generated by the secondary sound source B' has a weak inversion cancellation effect on the sound source A in the cavity, so that the listening volume at the listening position is significantly increased.

For the sound leakage, as shown in FIG. 11B, the sound source A radiates a sound to the outside through the leaking structure of the cavity is equivalent to generating a secondary sound source A' at the leaking structure. Since almost all the sound radiated by the sound source A is output from the leaking structure, and a structural scale of the cavity is much smaller than a spatial scale for evaluating the sound leakage (the difference is at least one order of magnitude), therefore the intensity of the secondary sound source A' can be considered as comparable to that of the sound source A. For the external space, the cancellation effect between sounds produced by the secondary sound source A' and the sound source B is comparable to the cancellation effect between sounds produced by the sound source A and the sound source B. That is, the cavity structure still maintains a comparable sound leakage reduction effect.

It should be understood that the above leaking structure with one opening is only an example, and the leaking structure of the cavity structure may contain one or more openings, which may also achieve a superior listening index, wherein the listening index may refer to the reciprocal of the leakage index a by $1/\alpha$. Taking the structure with two openings as an example, the cases of equal opening and equal opening ratio are analyzed separately below. Taking the structure with only one opening as a comparison, the "equal opening" here means setting two openings each with the same dimension as the opening in the structure with only one opening, and the "equal opening ratio" means setting two openings, a total area of which is the same area as that of the structure with only one opening. The equal opening is equivalent to doubling the opening dimension corresponding to the structure with only one opening (i.e., a ratio of an opening area S of the leaking structure on the cavity structure to an area S0 of the cavity structure subject to a direct action of the contained sound source), and the overall listening index is reduced as described before. In the case of the equal opening ratio, even though S/S0 is the same as that of the structure with only one opening, the distances from the two openings to the external sound source are different, thus resulting in different listening indexes.

Figure 12A:
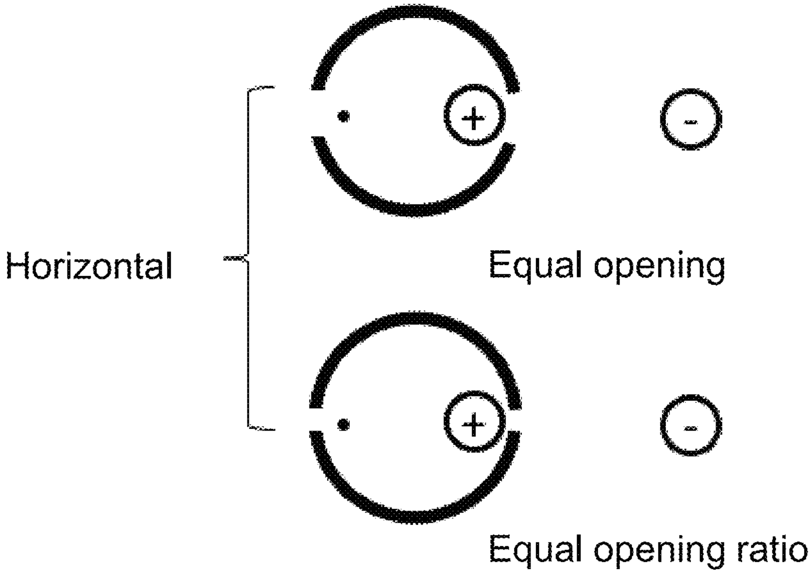
FIG. 12A is a schematic diagram illustrating a cavity structure with two horizontal openings according to some embodiments of the present disclosure.
Figure 12B:
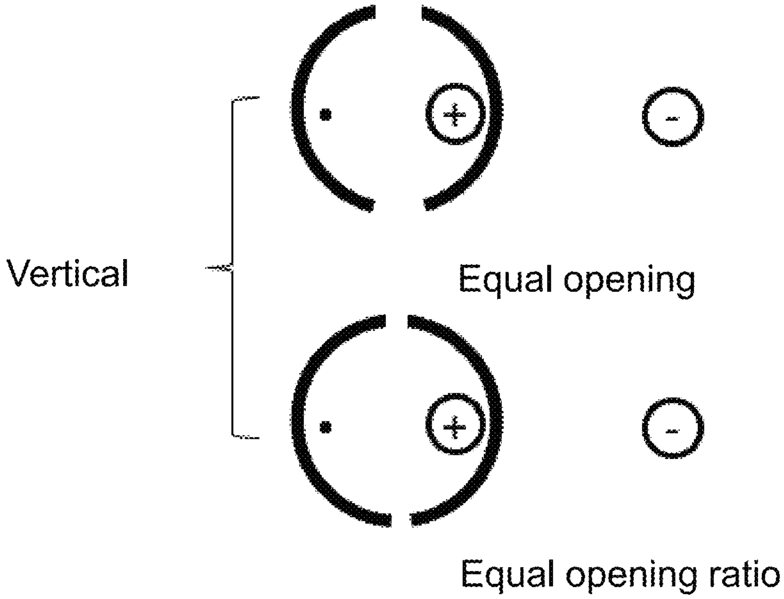
FIG. 12B is a schematic diagram illustrating a cavity structure with two vertical openings according to some embodiments of the present disclosure.

FIG. 12A is a schematic diagram illustrating a cavity structure with two horizontal openings according to some embodiments of the present disclosure. FIG. 12B is a schematic diagram illustrating a cavity structure with two vertical openings according to some embodiments of the present disclosure. As shown in FIG. 12A, when the two openings are parallel to a connection line of the two sound sources (i.e., two horizontal openings), the distances from the two openings to the external sound source are the maximum and minimum, respectively; as shown in FIG. 12B, when the connection line is perpendicular (i.e., two vertical openings), the distances from the two openings to the external sound source are equal and a middle value is obtained.

Figure 13:
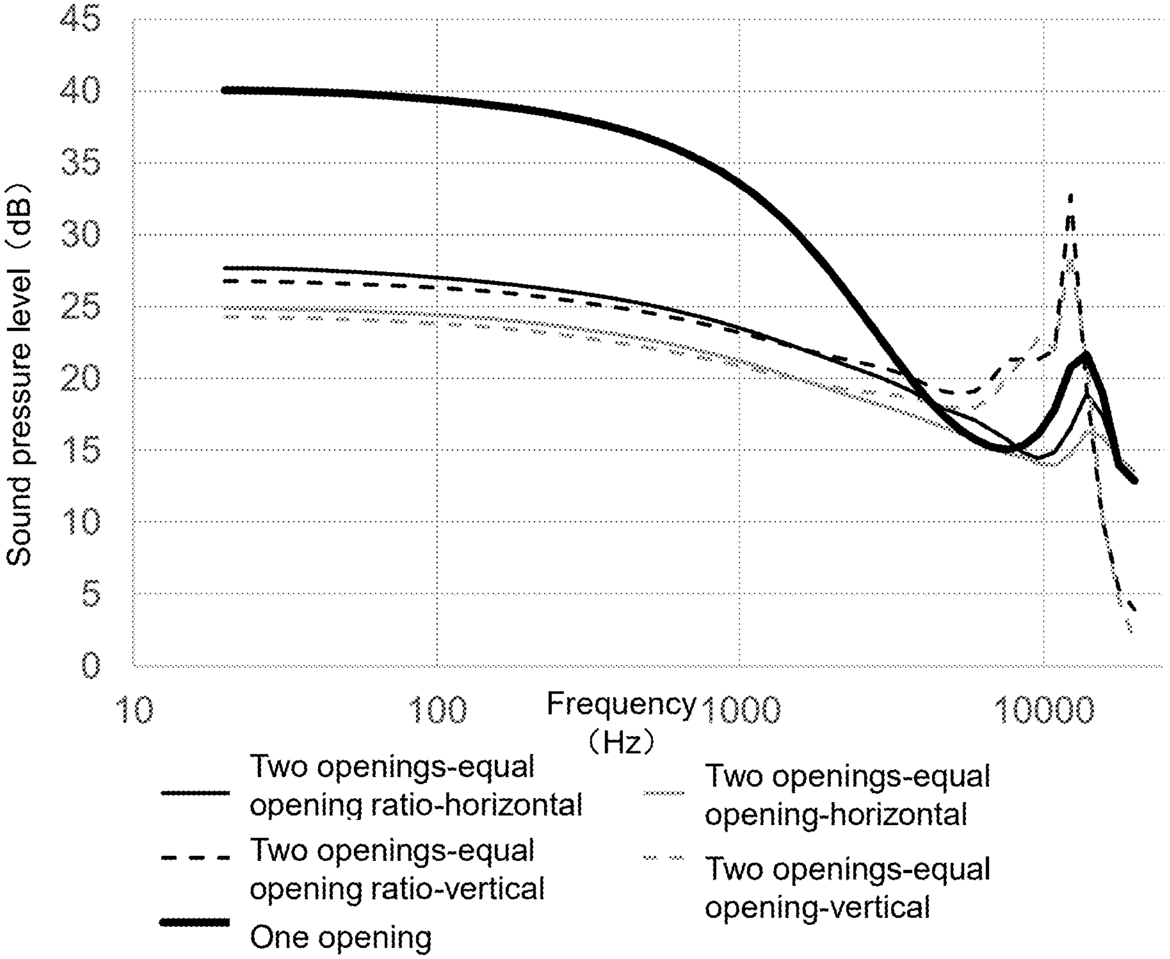
FIG. 13 is a listening index curve comparison diagram of a cavity structure with two openings and a cavity structure with one opening according to some embodiments of the present disclosure.

FIG. 13 is a listening index curve comparison diagram of a cavity structure with two openings and a cavity structure with one opening according to some embodiments of the present disclosure. As shown in FIG. 13, compared to the cavity structure with one opening, the overall listening index of the cavity structure with the equal opening decreases. For the cavity structure with the equal opening ratio, the distances from the two openings to the external sound source are different, thus also resulting in different listening indexes. Referring to FIG. 12A, FIG. 12B, and FIG. 13, it can be seen that regardless of whether the opening is horizontal or vertical, the listening index of the leaking structure with the equal opening ratio is higher than that of the leaking structure with the equal opening. This is because the relative opening dimension S/S0 of the leaking structure with the equal opening ratio is twice smaller compared to that of the leaking structure with the equal opening, so the listening index is larger. Referring to FIG. 12A, FIG. 12B, and FIG. 13, it can also be seen that regardless of the leaking structure with the equal opening or the leaking structure with the equal opening ratio, the listening index of the leaking structure with horizontal openings is larger. This is because a distance from one of the openings in the leaking structure with horizontal openings to an external sound source is smaller than a distance between the two sound sources, so that the formed secondary sound source and the external sound source are closer to each other than the original two sound sources, and therefore the listening index is higher, thereby improving the sound leakage reduction effect. Therefore, in order to improve the sound leakage reduction effect, it is possible to make a distance from at least one of the openings to the external sound source smaller than the distance between the two sound sources.

In addition, as shown in FIG. 13, the cavity structure with two openings can better increase the resonant frequency of the air sound within the cavity structure compared to the cavity structure with one opening, resulting in a better listening index for the entire device in a high frequency band (e.g., sounds with frequencies near 10,000 Hz) compared to a cavity structure with only one opening. The high frequency band is a more sensitive frequency band for the human ear and therefore has a greater need for sound leakage reduction. Therefore, in order to improve the sound leakage reduction effect in the high frequency band, a cavity structure with more than one opening may be chosen.

Figure 14:
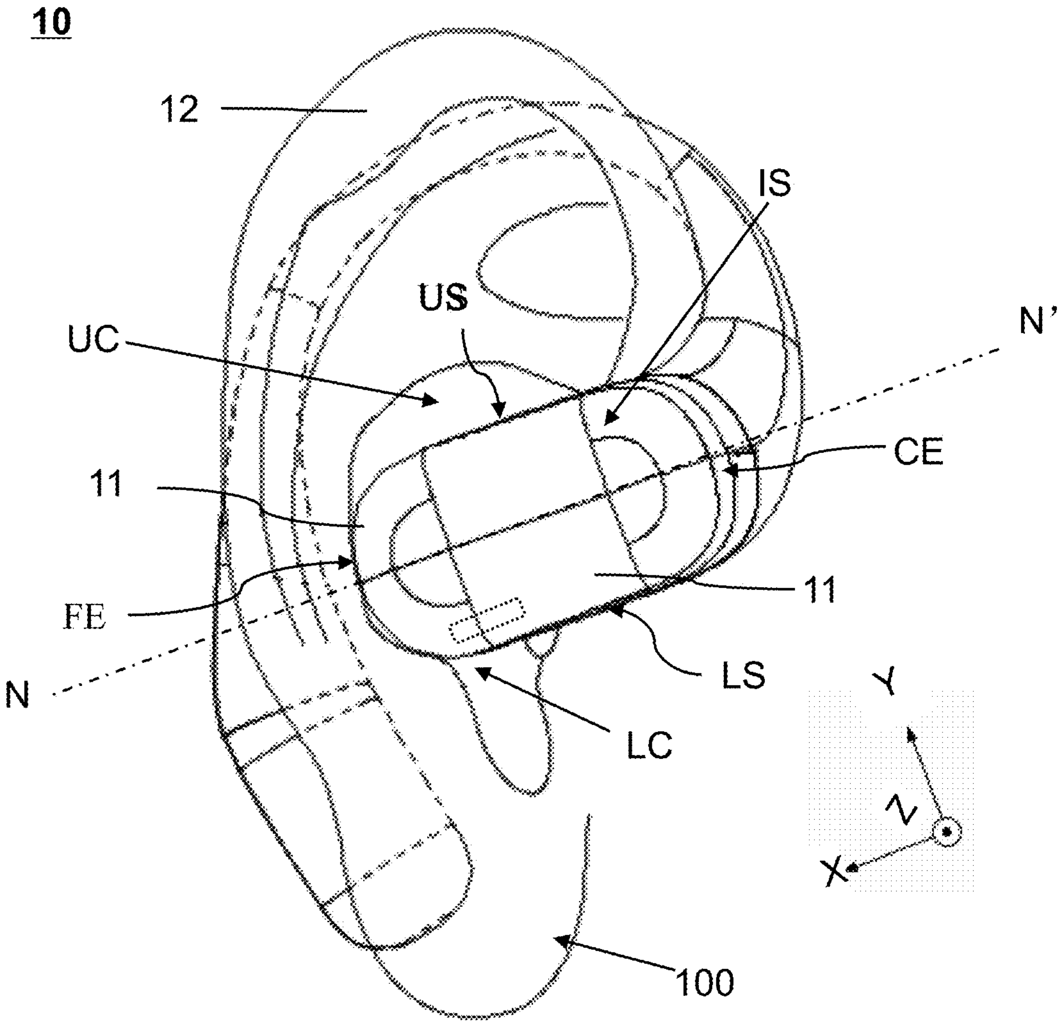
FIG. 14 is a schematic diagram illustrating an exemplary wearing state of an open earphone according to some embodiments of the present disclosure.
Figure 15:
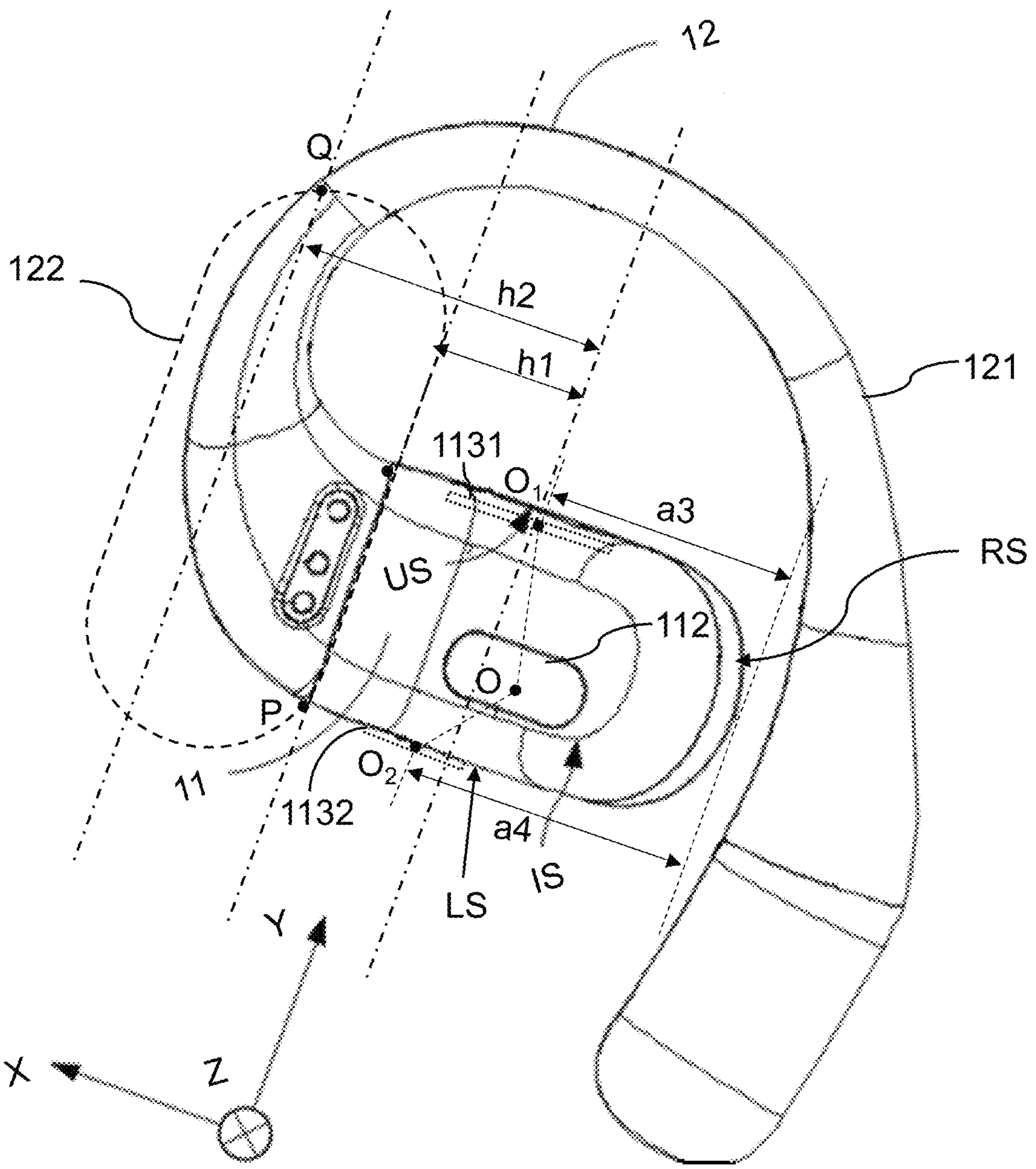
FIG. 15 is a schematic diagram illustrating a structure of a side of the open earphone shown in FIG. 13 facing the ear.

FIG. 14 is a schematic diagram illustrating an exemplary wearing state of an open earphone according to some embodiments of the present disclosure. FIG. 15 is a schematic diagram illustrating a structure of a side of the open earphone shown in FIG. 13 facing the ear.

The open earphone 10 shown in FIG. 14 has a similar structure to the open earphone 10 shown in FIG. 7. For example, the ear hook may have an arc-shaped structure adapted to the junction of the user's head and ear. The sound production component 11 (or the housing 111 of the sound production component 11) may have a connection end CE connected to the ear hook 12 and a free end FE not connected to the ear hook 12. When the open earphone 10 is in the wearing state, a first portion 121 of the ear hook 12 (e.g., the hook portion of the ear hook 12) is positioned between the user's auricle (e.g., the helix 107) and the head, and a second portion 122 of the ear hook 12 (e.g., the connection portion of the ear hook) extends toward a side of the auricle away from the head and connects to the connection end CE of the sound production component 11 to hold the sound production component 11 in a position near the ear canal but not blocking the ear canal. The open earphone 10 shown in FIG. 14 has a similar structure to the open earphone 10 shown in FIG. 7, and its main difference is that the sound production component 11 is inclined, and the housing 111 of the sound production component 11 is at least partially inserted into the inferior concha 102, for example, the free end FE of the sound production component 11 may extend into the inferior concha 102. The ear hook 12 and the sound production component 11 of such a structure are better adapted to the ear 100 of the user, and can increase the resistance of the open earphone 10 to fall off from the ear 100, thus increasing the wearing stability of the open earphone 10.

In some embodiments, in the wearing state, when viewed along the thickness direction Z, the connection end CE of the sound production component 11 is closer to the top of the head compared to the free end FE, so as to facilitate the free end FE to extend into the inferior concha. Based on this, an angle between the short-axis direction Y and a direction where the sagittal axis of the human body is located may be between 30° and 40°. If the aforementioned angle is too small, it is easy to cause the free end FE to be unable to extend into the inferior concha, and make the sound outlet 112 on the sound production component 11 too far away from the ear canal; if the aforementioned angle is too large, it is also easy to cause the sound production component 11 to fail to extend into the inferior concha, and make the ear canal be blocked by the sound production component 11. In other words, such a setting not only allows the sound production component 11 to extend into the inferior concha, but also allows the sound outlet 112 on the sound production component 11 to have a suitable distance from the ear canal, so that the user can hear more sounds produced by the sound production component 11 under the condition that the ear canal is not blocked.

In some embodiments, the sound production component 11 and the ear hook 12 may jointly clamp the aforementioned ear region from both front and rear sides of the ear region corresponding to the inferior concha, thereby increasing the resistance of the open earphone 10 to dropping from the ear and improving the stability of the open earphone 10 in the wearing state. For example, the free end FE of the sound production component 11 is pressed and held in the inferior concha in the thickness direction Z. As another example, the free end FE is pressed against the inferior concha in the long-axis direction X and in the short-axis direction Y.

In some embodiments, two ends of a second portion 122 of the ear hook 12 may be respectively connected to the first portion 121 of the ear hook 12 and the connection end CE of the sound production component 11 (as shown in FIG. 15). In some embodiments, the second portion 122 of the ear hook 12 may have a lowest point P and a highest point Q along the short-axis direction Y of the sound production component 11. When the open earphone 10 is in the wearing state, in order to prevent the first pressure relief hole 1131 from being blocked by the ear structure (e.g., the helix or the tragus), a distance $h_1$ from the center of the first pressure relief hole 1131 to the lowest point P in the long-axis direction X of the sound production component 11 may be in a range of 5.28 mm to 7.92 mm. In some embodiments, in order to make the earphone fit the user's ear when the user wears the open earphone 10, a distance $h_2$ from the center of the first pressure relief hole 1131 to the highest point Q in the long-axis direction X of the sound production component 11 may be in a range of 8.68 mm to 13.02 mm. In some embodiments, when the user wears the open earphone, a distance from the center of the first pressure relief hole 1131 to any point on the second portion 122 of the ear hook 12 in the long-axis direction X of the sound production component 11 may be in a range of 5.28 mm to 14 mm. In some embodiments, the distance from the center of the first pressure relief hole 1131 to any point on the second portion 122 of the ear hook 12 in the long-axis direction X of the sound production component 11 may be in a range of 5.28 mm to 13.02 mm. In some embodiments, the distance from the center of the first pressure relief hole 1131 to any point on the second portion 122 of the ear hook 12 in the long-axis direction X of the sound production component 11 may be in a range of 6.58 mm to 12.02 mm. In some embodiments, the distance from the center of the first pressure relief hole 1131 to any point on the second portion 122 of the ear hook 12 in the long-axis direction X of the sound production component 11 may be in a range of 7.58 mm to 10.02 mm. In some embodiments, the distance from the center of the first pressure relief hole 1131 to any point on the second portion 122 of the ear hook 12 in the long-axis direction X of the sound production component 11 may be in a range of 8.58 mm to 9.02 mm.

As shown in FIG. 14, when the user wears the open earphone 10, by setting the housing 111 of the sound production component 11 to be at least partially inserted into the inferior concha 103, a cavity enclosed by the inner side surface IS of the sound production component 11 and the inferior concha 103 together may be regarded as the cavity structure 41 as shown in FIG. 10. A gap formed between the inner side surface IS and the inferior concha (e.g., a first leaking structure UC formed between the inner side surface IS and the inferior concha close to the top of the head, and a second leaking structure LC formed between the inner side surface IS and the ear close to the ear canal) may be regarded as the leaking structure 42 as shown in FIG. 10. The sound outlet 112 provided on the inner side surface IS may be regarded as a point sound source inside the cavity structure 41 as shown in FIG. 10, and the pressure relief holes 113 (the first pressure relief hole 1131 and the second pressure relief hole 1132) provided on the other sides of the sound production component 11 (e.g., the upper side surface US and/or the lower side surface LS) may be regarded as a point sound source outside the cavity structure 41 as shown in FIG. 10. Thus, according to the relevant depictions of FIG. 10-FIG. 13, when the open earphone 10 is worn in a manner in which it is at least partially inserted into the inferior concha, i.e., when it is worn in the manner shown in FIG. 14, in terms of the listening effect, most of the sound radiated from the sound outlet 112 may reach the ear canal by the direct emission or reflection manner, which may result in a significant increase in the volume of the sound reaching the ear canal, especially the listening volume of the low and middle frequencies. At the same time, only a relatively small portion of the inversion sound radiated from the pressure relief holes 113 (the first pressure relief hole 1131 and the second pressure relief hole 1132) may enter the inferior concha through the slit (the first leaking structure UC and the second leaking structure LC), which has a weak inversion cancellation effect with the sound outlet 112, thereby making the listening volume of the ear canal significantly improved. In terms of the sound leakage effect, the sound outlet 112 may output sound to the outside through the slit and the sound may cancel out the sound generated by the pressure relief holes 113 (the first pressure relief hole 1131 and the second pressure relief hole 1132) in the far-field, thus ensuring the sound leakage reduction effect.

In some embodiments, the first pressure relief hole 1131 and the second pressure relief hole 1132 may be arranged in a staggered manner in the X direction, so that the first pressure relief hole 1131 and the second pressure relief hole 1132 are not blocked by the tragus. In some embodiments, a distance from the center $O_1$ of the first pressure relief hole 1131 to the center $O_2$ of the second pressure relief hole 1132 may be in a range of 7 mm to 15.2 mm. In some embodiments, the distance from the center $O_1$ of the first pressure relief hole 1131 to the center $O_2$ of the second pressure relief hole 1132 may be in a range of 8 mm to 13 mm. In some embodiments, the distance from the center $O_1$ of the first pressure relief hole 1131 to the center $O_2$ of the second pressure relief hole 1132 may be 12.64 mm. In some embodiments, the distance from the center $O_1$ of the first pressure relief hole 1131 to the center $O_2$ of the second pressure relief hole 1132 may be in a range of 7.5 mm to 14 mm. In some embodiments, the distance from the center $O_1$ of the first pressure relief hole 1131 to the center $O_2$ of the second pressure relief hole 1132 may be in a range of 12 mm to 13 mm. In some embodiments, the distance from the center $O_1$ of the first pressure relief hole 1131 to the center $O_2$ of the second pressure relief hole 1132 may be in a range of 13 mm to 15.2 mm.

In some embodiments, in order to avoid the sounds output by the first pressure relief hole 1131 and the second pressure relief hole 1132 affecting the volume of the sound output by the sound outlet 112 at the listening position, the first pressure relief hole 1131 and the second pressure relief hole 1132 should be as far away from the sound outlet 112 as possible, for example, the center of the sound outlet 112 may be located on or near a mid-perpendicular plane of a line connecting the center of the first pressure relief hole 1131 and the center of the second pressure relief hole 1132.

In some embodiments, a relationship between a distance from the center $O_1$ of the first pressure relief hole 1131 to the center O of the sound outlet 112 (also referred to as a first distance) and a distance from the center $O_2$ of the second pressure relief hole 1132 to the center O of the sound outlet 112 (also referred to as a second distance) may be determined such that the center O of the sound outlet 112 is approximately on the mid-perpendicular plane of a connection line $O_1O_2$. In some embodiments, a difference between the first distance and the second distance is smaller than 10%. In some embodiments, the difference between the first distance and the second distance is smaller than 8%. In some embodiments, the difference between the first distance and the second distance is smaller than 5%. In some embodiments, the difference between the first distance and the second distance is smaller than 2%.

In some embodiments, in order to prevent the sound waves emitted by the pressure relief holes (e.g., the first pressure relief hole 1131 and the second pressure relief hole 1132) from canceling the sound waves emitted by the sound outlet 112 in the near-field and affecting the user's listening quality, the distance from the first pressure relief hole 1131 and the second pressure relief hole 1132 to the sound outlet 112 should not be too close. In some embodiments, the distance from the center $O_1$ of the first pressure relief hole 1131 to the center O of the sound outlet 112 may be in a range of 4 mm to 15.11 mm. In some embodiments, the distance from the center $O_1$ of the first pressure relief hole 1131 to the center O of the sound outlet 112 may be in a range of 4 mm to 15 mm. In some embodiments, the distance from the center $O_1$ of the first pressure relief hole 1131 to the center O of the sound outlet 112 may be in a range of 5.12 mm to 15.11 mm. In some embodiments, the distance from the center $O_1$ of the first pressure relief hole 1131 to the center O of the sound outlet 112 may not be smaller than 5 mm to 14 mm. In some embodiments, the distance from the center $O_1$ of the first pressure relief hole 1131 to the center O of the sound outlet 112 may not be smaller than 6 mm to 13 mm. In some embodiments, the distance from the center $O_1$ of the first pressure relief hole 1131 to the center O of the sound outlet 112 may not be smaller than 7 mm to 12 mm. In some embodiments, the distance from the center $O_1$ of the first pressure relief hole 1131 to the center O of the sound outlet 112 may not be smaller than 8 mm to 10 mm. In some embodiments, the distance from the center $O_1$ of the first pressure relief hole 1131 to the center O of the sound outlet 112 may be 9.55 mm. In some embodiments, the distance from the center $O_2$ of the second pressure relief hole 1132 to the center O of the sound outlet 112 may be in a range of 4 mm to 16.1 mm. In some embodiments, the distance from the center $O_2$ of the first pressure relief hole 1132 to the center O of the sound outlet 112 may be in a range of 4 mm to 15 mm. In some embodiments, the distance between the center $O_2$ of the second pressure relief hole 1132 and the center O of the sound outlet 112 may be in a range of 5 mm to 14 mm. In some embodiments, the distance from the center $O_2$ of the second pressure relief hole 1132 to the center O of the sound outlet 112 may be in a range of 5.12 mm-16.1 mm. In some embodiments, the distance from the center $O_2$ of the second pressure relief hole 1132 to the center O of the sound outlet 112 may be in a range of 6 mm-13 mm. In some embodiments, the distance from the center $O_2$ of the second pressure relief hole 1132 to the center O of the sound outlet 112 may be in a range of 7 mm-12 mm. In some embodiments, the distance from the center $O_2$ of the second pressure relief hole 1132 to the center O of the sound outlet 112 may be in a range of 8 mm-10 mm. In some embodiments, the distance from the center $O_2$ of the second pressure relief hole 1132 to the center O of the sound outlet 112 may be 9.15 mm.

In some embodiments, in order to increase the distance between the first pressure relief hole 1131 or the second pressure relief hole 1132 and the sound hole 112 as much as possible, an angle between a connection line $O_1O$ between the center $O_1$ of the first pressure relief hole 1131 and the center O of the sound outlet 112 and a connection line $O_2O$ between the center $O_2$ of the second pressure relief hole 1132 and the center O of the sound outlet 112 may be reduced. In some embodiments, the angle between the connection line $O_1O$ and the connection line $O_2O$ may be in a range of 46.40° to 114.04°. In some embodiments, the angle between the connection line $O_1O$ and the connection line $O_2O$ may be in a range of 46.40°-90.40°. In some embodiments, the angle between the connection line $O_1O$ and the connection line $O_2O$ may be in a range of 46.40°-70.04°. In some embodiments, the angle between the connection line $O_1O$ and the connection line $O_2O$ may be in a range of 46.40°-60.04°. In some embodiments, the angle between the connection line $O_1O_2$ of the center $O_1$ of the first pressure relief hole 1131 and the center $O_2$ of the second pressure relief hole 1132 and the connection line $O_2O$ may be in a range of 19.72°-101.16°. In some embodiments, the angle between the connection line $O_1O_2$ and the connection line $O_2O$ may be in a range of 19.71°-97.75°.

In some embodiments, the first pressure relief hole 1131 is farther away from the connection end CE than the second pressure relief hole 1132. Since the center of the sound outlet 112 is located on or near the mid-perpendicular plane of the line connecting the center of the first pressure relief hole 1131 and the center of the second pressure relief hole 1132, the sound outlet 112 is located on a side of the housing 111 close to the second pressure relief hole 1132 in the Y direction instead of a middle position (as shown in FIG. 16). Since the sound outlet 112 is disposed close to the ear canal, the second pressure relief hole 1132 is closer to the ear canal, and the first pressure relief hole 1131 is farther away from the ear canal. The sound wave emitted from the second pressure relief hole 1132 is more likely to cancel the sound wave emitted from the sound outlet 112 in the near-field compared to the first pressure relief hole 1131. Therefore, a dimension of the second pressure relief hole 1132 may be smaller compared to that of the first pressure relief hole 1131, thereby reducing the sound leakage of the second pressure relief hole 1132, that is, an area of the second pressure relief hole 1132 may be smaller than an area of the first pressure relief hole 1131. In some embodiments, in order to ensure that frequency response curves of the first pressure relief hole 1131 and the second pressure relief hole 1132 are as close as possible to achieve a better noise reduction effect, an area difference between the first pressure relief hole 1131 and the second pressure relief hole 1132 should not be too large. In some embodiments, a ratio of an area of an inner opening of the second pressure relief hole 1132 to an area of an inner opening of the first pressure relief hole 1131 may not be greater than 0.9. In some embodiments, the ratio of the area of the inner opening of the second pressure relief hole 1132 to the area of the inner opening of the first pressure relief hole 1131 may not be greater than 0.8. In some embodiments, the ratio of the area of the inner opening of the second pressure relief hole 1132 to the area of the inner opening of the first pressure relief hole 1131 may not be greater than 0.7. In some embodiments, the ratio of the area of the inner opening of the second pressure relief hole 1132 to the area of the inner opening of the first pressure relief hole 1131 may not be greater than 0.6. In some embodiments, the ratio of the area of the inner opening of the second pressure relief hole 1132 to the area of the inner opening of the first pressure relief hole 1131 may be 0.55.

In some embodiments, for example, under the configuration of FIG. 14, in order to make the sound outlet 112 closer to the user's ear canal, the sound outlet 112 may be closer to a lower end of the sound production component 11 in the Y direction, i.e., the lower side surface LS where the second pressure relief hole 1132 is located (as shown in FIG. 16). At this time, a distance from the sound outlet 112 to the first pressure relief hole 1131 in the Y direction is greater than a distance from the sound outlet 112 to the second pressure relief hole 1132 in the Y direction, so as to avoid the sound waves propagating via the sound outlet 112 and the pressure relief hole 1131 canceling in the near-field, which is conducive to increasing the volume of the sound propagating via the sound hole 112 heard by the user. Correspondingly, the second pressure relief hole 1132 is closer to the connection end CE than the sound outlet 112, so as to increase a distance from the second pressure relief hole 1132 to the sound outlet 112 in the X direction, and avoid the sound waves propagating via the sound outlet 112 and the second pressure relief hole 1132 canceling in the near-field, which is conducive to increasing the volume of the sound propagating via the sound outlet 112 heard by the user. In some embodiments, a difference between the distance from the center O of the sound outlet 112 to the center $O_1$ of the first pressure relief hole 1131 in the Y direction and the distance from the center O of the sound outlet 112 to the center $O_2$ of the second pressure relief hole 1132 in the Y direction may be in a range of 2 mm to 10 mm, and a difference between the distance from the center $O_2$ of the second pressure relief hole 1132 to the connection end CE in the X direction and the distance from the center O of the sound outlet 112 to the connection end CE in the X direction may be in a range of 2 mm to 15 mm. In some embodiments, the difference between the distance from the center O of the sound outlet 112 to the center $O_1$ of the first pressure relief hole 1131 in the Y direction and the distance from the center O of the sound outlet 112 to the center $O_2$ of the second pressure relief hole 1132 in the Y direction may be in a range of 3 mm to 9 mm, and the difference between the distance from the center $O_2$ of the second pressure relief hole 1132 to the connection end CE in the X direction and the distance from the center O of the sound outlet 112 to the connection end CE in the X direction may be in a range of 4 mm to 12 mm. In some embodiments, the difference between the distance from the center O of the sound outlet 112 to the center O1 of the first pressure relief hole 1131 in the Y direction and the distance from the center O of the sound outlet 112 to the center $O_2$ of the second pressure relief hole 1132 in the Y direction may be in a range of 5 mm to 7 mm, and the difference between the distance from the center $O_2$ of the second pressure relief hole 1132 to the connection end CE in the X direction and the distance from the center O of the sound outlet 112 to the connection end CE in the X direction may be in a range of 6 mm to 8 mm. It should be known that when the side surface of the housing 111 corresponding to the connection end CE is an arc surface, a distance from a certain position (e.g., the center $O_1$ of the first pressure relief hole 1131 or the center $O_2$ of the second pressure relief hole 1132) to the connection end CE (or the side surface) refers to a distance from the position to a tangent plane of the connection end CE parallel to the short-axis.

In some embodiments, referring to FIGS. 14 and 15, in order to enable the sound production component 11 to be at least partially inserted into the inferior concha, a long-axis dimension of the sound production component 11 should not be too long. On the premise of ensuring that the sound production component 11 is at least partially inserted into the inferior concha, a distance from the first pressure relief hole 1131 or the second pressure relief hole 1132 to the rear side surface RS of the sound production component 11 should not be too short, otherwise full or partial area of the first pressure relief hole 1131 and/or the second pressure relief hole 1132 is blocked in the X direction due to the abutting of the free end FE to a wall surface of the inferior concha, thus reducing an effective area of the first pressure relief hole 1131 and/or the second pressure relief hole 1132. Therefore, in some embodiments, a distance $a_3$ from the center $O_1$ of the first pressure relief hole 1131 to the rear side surface RS may be in a range of 8.60 mm to 15.68 mm. In some embodiments, the distance $a_3$ from the center $O_1$ of the first pressure relief hole 1131 to the rear side surface RS may be in a range of 10.44 mm to 15.68 mm. In some embodiments, the distance $a_3$ from the center $O_1$ of the first pressure relief hole 1131 to the rear side surface RS may be in a range of 11.00 mm to 14.55 mm. In some embodiments, the distance $a_3$ from the center $O_1$ of the first pressure relief hole 1131 to the rear side surface RS may be in a range of 12.15 mm to 13.25 mm.

Further, referring to FIG. 16, in order to avoid the full or partial area of the first pressure relief hole 1131 and/or the second pressure relief hole 1132 being blocked in the Z direction, thus reducing the effective area of the first pressure relief hole 1131 and/or the second pressure relief hole 1132, a distance from the center $O_1$ of the first pressure relief hole 1131 along the Z-direction to the inner side surface IS of the sound production component 11 should not be too small. In some embodiments, the distance $d_3$ from the center $O_1$ of the first pressure relief hole 1131 along the Z-direction to the inner side surface IS of the sound production component 11 is in a range of 4.24 mm to 6.38 mm. In some embodiments, the distance $d_3$ from the center $O_1$ of the first pressure relief hole 1131 along the Z-direction to the inner side surface IS of the sound production component 11 is in a range of 4.50 mm to 5.85 mm. In some embodiments, the distance $d_3$ from the center $O_1$ of the first pressure relief hole 1131 along the Z-direction to the inner side surface IS of the sound production component 11 is in a range of 4.80 mm to 5.50 mm. In some embodiments, the distance $d_3$ from the center $O_1$ of the first pressure relief hole 1131 along the Z-direction to the inner side surface IS of the sound production component 11 is in a range of 5.20 mm to 5.55 mm.

In some embodiments, in order to make the sound outlet 112 closer to the ear canal to increase listening efficiency, the sound outlet 112 should be close to the free end FE. In this case, in order to prevent the sound emitted by the second pressure relief hole 1132 from canceling the sound emitted by the sound outlet 112 at the ear canal (i.e., the listening position), resulting in a reduction in the listening volume, the second pressure relief hole 1132 may be set away from the rear side surface RS (or the free end FE). Furthermore, for the first pressure relief hole 1131, since it is arranged on the upper side surface US, and the distance from the first pressure relief hole 1131 to the sound outlet 112 is farther than that of the second pressure relief hole 1132, and a gap between the ear 100 and the inner side surface IS is small, the sound generated by the first pressure relief hole 1131 is more difficult to transmit to the ear canal compared to the second pressure relief hole 1132. Therefore, in some embodiments, the distance from the center of the first pressure relief hole 1131 to the rear side surface RS may be smaller than the distance from the center of the second pressure relief hole 1132 to the rear side surface RS. In some embodiments, the distance from the center of the first pressure relief hole 1131 to the rear side surface RS may also be greater than or equal to the distance from the center of the second pressure relief hole 1132 to the rear side surface RS. In some embodiments, a distance $a_4$ from the center $O_2$ of the second pressure relief hole 1132 to the rear side surface RS may be in a range of 13.51 mm to 20.27 mm. In some embodiments, the distance $a_4$ from the center $O_2$ of the second pressure relief hole 1132 to the rear side surface RS may be in a range of 15.00 mm to 19.55 mm. In some embodiments, the distance $a_4$ from the center $O_2$ of the second pressure relief hole 1132 to the rear side surface RS may be in a range of 17.15 mm to 18.25 mm.

Further, in some embodiments, a distance from the center $O_1$ of the first pressure relief hole 1131 to the inner side surface IS of the sound production component 11 along the Z-direction and a distance from the center $O_2$ of the second pressure relief hole 1132 to the inner side surface IS of the sound production component 11 along the Z-direction may be the same. In some embodiments, the distance $d_4$ from the center $O_2$ of the second pressure relief hole 1132 to the inner side surface IS of the sound production component 11 along the Z-direction may be in a range of 4.24 mm to 6.38 mm. In some embodiments, the distance $d_4$ from the center $O_2$ of the second pressure relief hole 1132 to the inner side surface IS of the sound production component 11 along the Z-direction may be in a range of 4.50 mm to 5.85 mm. In some embodiments, the distance $d_4$ from the center $O_2$ of the second pressure relief hole 1132 to the inner side surface IS of the sound production component 11 along the Z-direction may be in a range of 4.80 mm to 5.50 mm. In some embodiments, the distance $d_4$ from the center $O_2$ of the second pressure relief hole 1132 to the inner side surface IS of the sound production component 11 along the Z-direction may be in a range of 5.20 mm to 5.55 mm. In some embodiments, in order to make the sound outlet 112 closer to the ear canal to increase listening efficiency, the sound outlet 112 should be close to the lower side surface LS. In this case, in order to prevent the sound emitted by the second pressure relief hole 1132 from canceling the sound emitted by the sound outlet 112 at the ear canal (i.e., the listening position), resulting in a reduction in the listening volume, the second pressure relief hole 1132 may be farther away from the inner side surface IS than the first pressure relief hole 1131 in the Z-direction, i.e., the distance from the center $O_2$ of the second pressure relief hole 1132 to the inner side surface IS may be different from the distance from the center $O_1$ of the first pressure relief hole 1131 to the inner side surface IS. For example, the distance from the center $O_1$ of the first pressure relief hole 1131 to the inner side surface IS may be in a range of 2.24 mm to 5.57 mm, and the distance from the center $O_2$ of the second pressure relief hole 1132 to the inner side surface IS may be in a range of 5.57 mm to 6.36 mm.

In some embodiments, shapes of the first pressure relief hole 1131 and the second pressure relief hole 1132 may also affect their sound qualities. The long and narrow first pressure relief hole 1131 and the second pressure relief hole 1132 have higher acoustic resistance, thereby reducing the sound intensity of the rear cavity. Therefore, in order to ensure the output sound intensities of the first pressure relief hole 1131 and the second pressure relief hole 1132, a ratio (also referred to as a length-width ratio of the pressure relief holes 113) of a long-axis dimension to a short-axis dimension of the first pressure relief hole 1131 or the second pressure relief hole 1132 should not be too large. At the same time, due to a dimension limitation of the sound production component 11 in the thickness direction Z, the maximum dimensions of the first pressure relief hole 1131 and the second pressure relief hole 1132 in the thickness direction Z should not be too large. Therefore, when the areas of the pressure relief holes 113 are constant, the ratio of the long-axis dimension to the short-axis dimension of the first pressure relief hole 1131 and the second pressure relief hole 1132 should not be too small. In some embodiments, the shapes of the first pressure relief hole 1131 and the second pressure relief hole 1132 may include, but are not limited to, a circle, an oval, a runway shape, etc. For ease of description, the following exemplary illustration is provided with the first pressure relief hole 1131 and the second pressure relief hole 1132 in a runway shape as an example.

FIG. 16 is a schematic diagram illustrating a structure of a housing of an open earphone according to some embodiments of the present disclosure. As shown in FIG. 16, the first pressure relief hole 1131 and the second pressure relief hole 1132 may adopt a runway shape. Both ends of the runway shape may be inferior arcs or semicircles. At this time, maximum dimensions of the first pressure relief hole 1131 and the second pressure relief hole 1132 in the thickness direction Z are defined as corresponding short-axis dimensions, wherein the short-axis dimension of the first pressure relief hole 1131 is $W_1$, and the short-axis dimension of the second pressure relief hole 1132 is $W_2$; maximum dimensions of the first pressure relief hole 1131 and the second pressure relief hole 1132 in the long-axis direction X are defined as corresponding long-axis dimensions, wherein the long-axis dimension of the first pressure relief hole 1131 is $L_1$, and the long-axis dimension of the second pressure relief hole 1132 is $L_2$. Based on the above principle, a ratio of the long-axis dimension to the short-axis dimension of the first pressure relief hole 1131 or the second pressure relief hole 1132 should not be too large or too small. In some embodiments, a ratio of the long-axis dimension $L_1$ of the first pressure relief hole 1131 to the short-axis dimension $W_1$ of the first pressure relief hole 1131 may be in a range of 1 to 8. In some embodiments, the ratio of the long-axis dimension $L_1$ of the first pressure relief hole 1131 to the short-axis dimension $W_1$ of the first pressure relief hole 1131 may be in a range of 1.33 to 8. In some embodiments, the ratio of the long-axis dimension $L_1$ of the first pressure relief hole 1131 to the short-axis dimension $W_1$ of the first pressure relief hole 1131 may be in a range of 3 to 7. In some embodiments, the ratio of the long-axis dimension $L_1$ of the first pressure relief hole 1131 to the short-axis dimension $W_1$ of the first pressure relief hole 1131 may be in a range of 4 to 6. In some embodiments, a ratio of the long-axis dimension $L_2$ of the second pressure relief hole 1132 to the short-axis dimension $W_2$ of the second pressure relief hole 1132 may be in a range of 1 to 8. In some embodiments, the ratio of the long-axis dimension $L_2$ of the second pressure relief hole 1132 to the short-axis dimension $W_2$ of the second pressure relief hole 1132 may be in a range of 3 to 7. In some embodiments, the ratio of the long-axis dimension $L_2$ of the second pressure relief hole 1132 to the short-axis dimension $W_2$ of the second pressure relief hole 1132 may be in a range of 4 to 6. In some embodiments, the ratio of the long-axis dimension $L_2$ of the second pressure relief hole 1132 to the short-axis dimension $W_2$ of the second pressure relief hole 1132 may be in a range of 1-6.

In some embodiments, when the first pressure relief hole 1131 and the second pressure relief hole 1132 both adopt a straight cylindrical structure, i.e., corresponding inner openings and corresponding outer openings thereof have the same dimension, respectively. At this time, the long-axis dimension $L_1$ of the first pressure relief hole 1131 may be in a range of 1.43 mm to 16.38 mm, and the short-axis dimension $W_1$ of the first pressure relief hole 1131 may be in a range of 1.43 mm to 5.7 mm. In some embodiments, the long-axis dimension $L_1$ of the first pressure relief hole 1131 may be in a range of 4.10 mm to 16.38 mm, and the short-axis dimension $W_1$ of the first pressure relief hole 1131 may be in a range of 1.43 mm to 5.7 mm. In some embodiments, the long-axis dimension $L_1$ of the first pressure relief hole 1131 may be in a range of 6.14 mm to 10.92 mm, and the short-axis dimension $W_1$ of the first pressure relief hole 1131 may be in a range of 2.14 mm to 3.80 mm. In some embodiments, the long-axis dimension $L_2$ of the second pressure relief hole 1132 may be in a range of 1.00 mm to 10.38 mm, and the short-axis dimension $W_2$ of the second pressure relief hole 1132 may be in a range of 1.00 mm to 4.05 mm. In some embodiments, the long-axis dimension $L_2$ of the second pressure relief hole 1132 may be in a range of 2.59 mm to 10.38 mm, and the short-axis dimension $W_2$ of the second pressure relief hole 1132 may be in a range of 1.52 mm to 4.05 mm. In some embodiments, the long-axis dimension $L_2$ of the second pressure relief hole 1132 may be in a range of 3.89 mm to 6.92 mm, and the short-axis dimension $W_2$ of the second pressure relief hole 1132 may be in a range of 2.28 mm to 4.05 mm.

In some embodiments, in order to facilitate manufacturing and reduce the difficulty of the process, both the first pressure relief hole 1131 and the second pressure relief hole 1132 may adopt a trumpet-shaped structure, for example, the area of the inner opening is smaller than the area of the corresponding outer opening, or the area of the outer opening is smaller than the area of the corresponding inner opening.

In some embodiments, when both the first pressure relief hole 1131 and the second pressure relief hole 1132 adopt the trumpet-shaped structure, the long-axis dimension of the outer opening of the first pressure relief hole 1131 along the X-direction may be in a range of 4.10 mm to 16.38 mm, the short-axis dimension of the outer opening of the first pressure relief hole 1131 along the Z-direction may be in a range of 1.43 mm to 5.7 mm, and the area of the outer opening of the first pressure relief hole 1131 may be in a range of 5.39 $mm^2$ to 86.21 $mm^2$; the long-axis dimension of the inner opening of the first pressure relief hole 1131 along the X-direction may be in a range of 3.92 mm to 15.68 mm, the short-axis dimension of the outer opening of the first pressure relief hole 1131 along the Z-direction may be in a range of 1.29 mm-5.14 mm, and the area of the inner opening of the first pressure relief hole 1131 may be in a range of 4.58 mm$^2$ to 73.32 mm$^2$; the short-axis dimension of the second pressure relief hole 1132 along the X-direction may be in a range of 2.59 mm-10.38 mm, the short-axis dimension of the outer opening of the second pressure relief hole 1132 along the Z-direction may be in a range of 1.52 mm-4.05 mm, and the area of the outer opening of the second pressure relief hole 1132 may be in a range of 3.42 mm$^2$ to 54.68 mm$^2$; and the long-axis dimension of the inner opening of the second pressure relief hole 1132 along the X-direction may be in a range of 2.28 mm to 9.1 mm, the short-axis dimension of the inner opening of the second pressure relief hole 1132 along the Z-direction may be in a range of 1.26 mm to 5.04 mm, and the area of the inner opening of the second pressure relief hole 1132 may be in a range of 2.56 mm$^2$ to 40.90 mm$^2$. In some embodiments, when both the first pressure relief hole 1131 and the second pressure relief hole 1132 adopt the trumpet-shaped structure, the long-axis dimension of the outer opening of the first pressure relief hole 1131 along the X-direction may be in a range of 6.14 mm to 10.92 mm, the short-axis dimension of the outer opening of the first pressure relief hole 1131 along the Z-direction may be in a range of 2.14 mm to 3.80 mm, and the area of the outer opening of the first pressure relief hole 1131 may be in a range of 12.12 mm$^2$ to 38.32 mm$^2$; the long-axis dimension of the inner opening of the first pressure relief hole 1131 along the X-direction may be in a range of 5.88 mm to 10.45 mm, the short-axis dimension of the inner opening of the first pressure relief hole 1131 along the Z-direction may be in a range of 1.93 mm to 3.43 mm, and the area of the inner opening of the first pressure relief hole 1131 may be in a range of 10.31 mm$^2$ to 32.59 mm$^2$; the long-axis dimension of the outer opening of the second pressure relief hole 1132 along the X-direction may be in a range of 3.89 mm to 6.92 mm, the short-axis dimension of the outer opening of the second pressure relief hole 1132 along the Z-direction may be in a range of 2.28 mm to 4.05 mm, and the area of the outer opening of the second pressure relief hole 1132 may be in a range of 7.69 mm$^2$ to 24.30 mm$^2$; and the long-axis dimension of the inner opening of the second pressure relief hole 1132 along the X-direction may be in a range of 3.41 mm to 6.61 mm, the short-axis dimension of the inner opening of the second pressure relief hole 1132 along the Z-direction may be in a range of 1.89 mm to 3.36 mm, and the area of the inner opening of the second pressure relief hole 1132 may be in a range of 5.75 mm$^2$ to 18.18 mm$^2$. In some embodiments, when both the first pressure relief hole 1131 and the second pressure relief hole 1132 adopt the trumpet-shaped structure, the long-axis dimension of the outer opening of the first pressure relief hole 1131 along the X-direction may be 8.19 mm, the short-axis dimension of the outer opening of the first pressure relief hole 1131 along the Z-direction may be 2.85 mm, and the area of the outer opening of the first pressure relief hole 1131 may be 21.55 mm$^2$; the long-axis dimension of the inner opening of the first pressure relief hole 1131 along the X-direction may be 7.84 mm, the short-axis dimension of the inner opening of the first pressure relief hole 1131 along the Z-direction may be 2.57 mm, and the area of the inner opening of the first pressure relief hole 1131 may be 18.33 mm$^2$; the long-axis dimension of the outer opening of the second pressure relief hole 1132 along the X-direction may be 5.19 mm, the short-axis dimension of the outer opening of the second pressure relief hole 1132 along the Z-direction may be 3.04 mm, and the area of the outer opening of the second pressure relief hole 1132 may be 13.67 mm$^2$; and the long-axis dimension of the inner opening of the second pressure relief hole 1132 along the X-direction may be 4.55 mm, the short-axis dimension of the inner opening of the second pressure relief hole 1132 along the Z-direction may be 2.52 mm, and the area of the inner opening of the second pressure relief hole 1132 may be 10.23 mm$^2$.

In some embodiments, a ratio of the area of the inner opening of the first pressure relief hole 1131 to an area of the sound outlet 112 may be in a range of 0.1 to 15. In some embodiments, a ratio of the area of the inner opening of the second pressure relief hole 1132 to the area of the sound outlet 112 may be in a range of 0.1 to 3. In some embodiments, the ratio of the area of the inner opening of the first pressure relief hole 1131 to the area of the sound outlet 112 may be in a range of 0.2 to 10. In some embodiments, the ratio of the area of the inner opening of the second pressure relief hole 1132 to the area of the sound outlet 112 may be in a range of 0.1 to 2. In some embodiments, the ratio of the area of the inner opening of the first pressure relief hole 1131 to the area of the sound outlet 112 may be in a range of 0.3 to 5. In some embodiments, the ratio of the area of the inner opening of the second pressure relief hole 1132 to the area of the sound outlet 112 may be in a range of 0.2 to 1.

In some embodiments, when the first pressure relief hole 1131 or the second pressure relief hole 1132 is used as an acoustic hole and forms a Helmholtz resonator model with the rear cavity 116, it can be known from the equation (2) described later that the larger the area of the first pressure relief hole 1131 or the area of the second pressure relief hole 1132, the greater a resonant frequency of the rear cavity 116, so that a resonant frequency of the corresponding leakage sound can shift to a higher frequency range as much as possible (e.g., greater than 4 kHz), which is conducive to enhancing a flat region of the frequency response curve, and further preventing the sound leakage from being heard.

Figure 17:
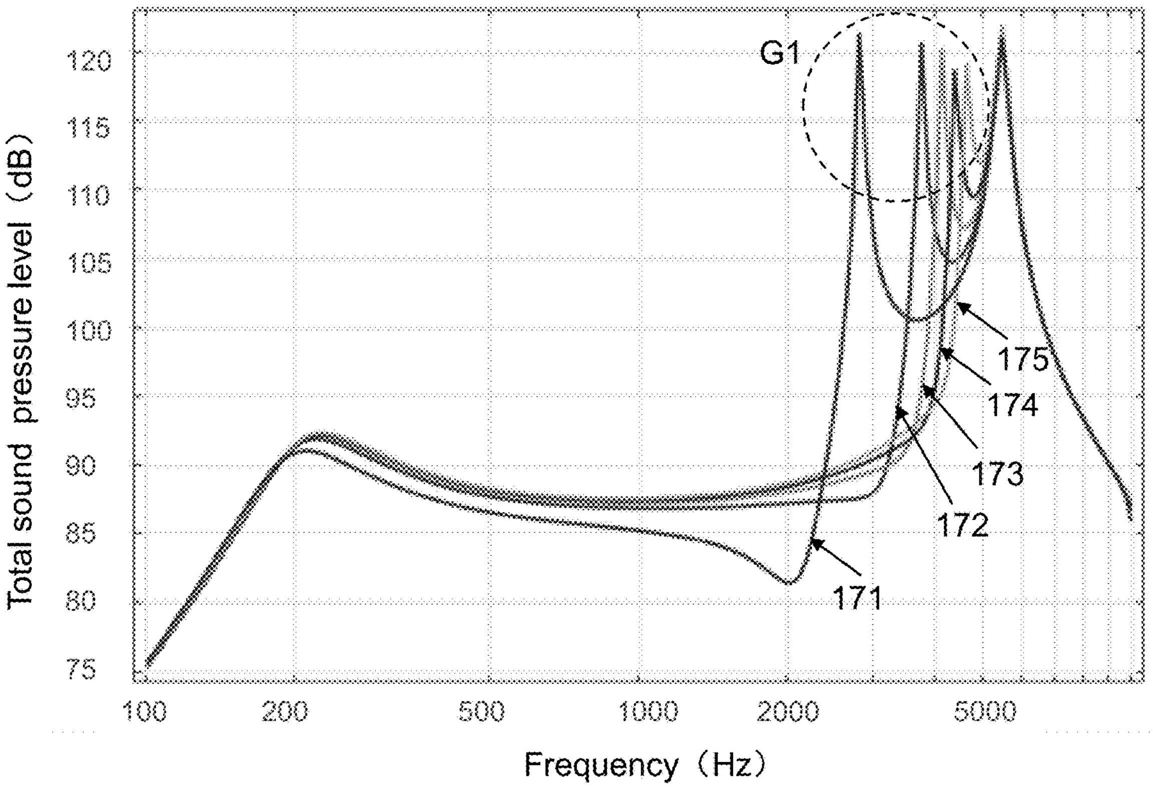
FIG. 17 is a diagram illustrating frequency response curves corresponding to different areas of first pressure relief holes of an open earphone according to some embodiments of the present disclosure.
Figure 18:
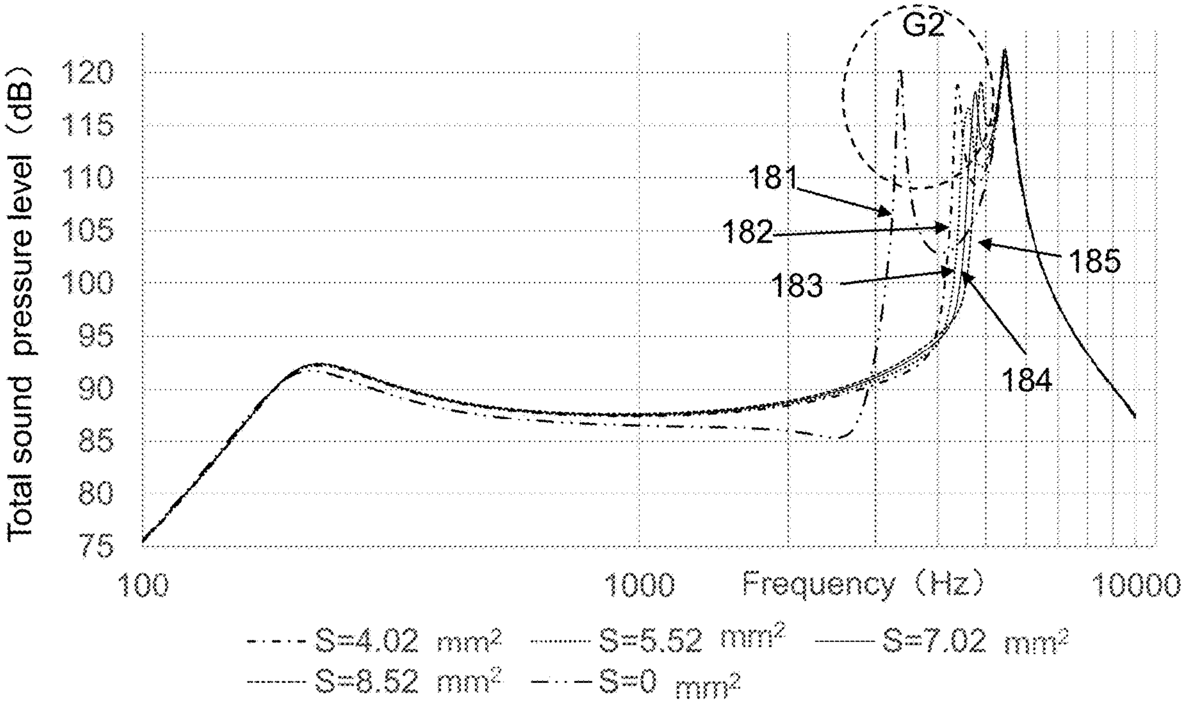
FIG. 18 is a diagram illustrating frequency response curves corresponding to different areas of second pressure relief holes of an open earphone according to some embodiments of the present disclosure.

FIG. 17 is a diagram illustrating frequency response curves corresponding to different areas of first pressure relief holes of an open earphone according to some embodiments of the present disclosure. FIG. 18 is a diagram illustrating frequency response curves corresponding to different areas of second pressure relief holes of an open earphone according to some embodiments of the present disclosure.

As shown in FIG. 17, curves 171, 172, 173, 174, and 175 respectively represent frequency response curves corresponding to difference areas of first pressure relief holes 1131, such as 0, 2.52 mm$^2$, 5.52 mm$^2$, 8.52 mm$^2$, and 11.52 mm$^2$. As shown in FIG. 18, curves 181, 182, 183, 184, and 185 respectively represent frequency response curves corresponding to difference areas of second pressure relief holes 1132, such as 0, 4.02 mm$^2$, 5.52 mm$^2$, 7.02 mm$^2$, and 8.52 mm$^2$.

It can be seen from FIG. 17 that when other structures (e.g., the sound outlet 112, the second pressure relief hole 1132, etc.) are fixed, as the area of the first pressure relief hole 1131 gradually increases, the resonant frequency corresponding to the rear cavity (i.e., frequencies corresponding to resonant peaks in a dashed box G1) gradually moves to a high frequency, and the flat region of the frequency response curve become wider. When the area of the first pressure relief hole increases to 11.52 mm$^2$, the resonant frequency corresponding to the rear cavity changes slowly to the high frequency. It should be noted that the frequency response curves in FIG. 17 are frequency response curves obtained through simulation at 15 mm directly in front of the center O of the sound outlet under the condition that the position and the dimension of the second pressure relief hole 1132 remain constant. Similarly, it can be seen from FIG. 18 that when other structures (e.g., the sound hole 112, the first pressure relief hole 1131, etc.) are fixed, as the area of the second pressure relief hole 1132 gradually increases, the resonant frequency corresponding to the rear cavity (i.e., frequencies corresponding to resonant peaks in a dashed box G2) gradually moves to the high frequency, and the flat region of the frequency response curve becomes wider. It should be noted that the frequency response curves in FIG. 18 are frequency response curves obtained by simulation at 15 mm directly in front of the center O of the sound outlet under the condition that the position and the dimension of the first pressure relief hole 1131 remain constant.

In some embodiments, in order to make the frequency response curve of the open earphone have a wide flat region (e.g., the region before the resonant peak), and obtain a better sound leakage reduction effect, and make the sound generated by the rear cavity have sufficient intensity in the far-field while ensuring destroying a high-pressure region of a sound field in the rear cavity, the area of the first pressure relief hole 1131 and/or the area of the second pressure relief hole 1132 should not be too small. In addition, in practical application, if the area of the first pressure relief hole 1131 and/or the area of the second pressure relief hole 1132 is too large, it may have certain influence on an appearance, a structural strength, waterproof and dustproof performance, or the like of the open earphone 10. Therefore, the area of the first pressure relief hole 1131 and/or the area of the second pressure relief hole 1132 should not be too large. In some embodiments, the area of the first pressure relief hole 1131 may be in a range of 3.78 $mm^2$ to 86.21 $mm^2$, and the area of the second pressure relief hole 1132 may be in a range of 2.78 $mm^2$ to 54.68 $mm^2$. In some embodiments, the area of the first pressure relief hole 1131 may be in a range of 3.78 $mm^2$ to 22.07 $mm^2$, and the area of the second pressure relief hole 1132 may be in a range of 2.78 $mm^2$ to 16.07 $mm^2$. In some embodiments, the area of the first pressure relief hole 1131 may be in a range of 6.78 $mm^2$ to 20.07 $mm^2$, and the area of the second pressure relief hole 1132 may be in a range of 4.78 $mm^2$ to 13.07 $mm^2$.

In some embodiments, since the pressure relief holes 113 (including the first pressure relief hole 1131 and the second pressure relief hole 1132) and the rear cavity provided on the housing 111 can be regarded as the Helmholtz resonator model, opening dimensions of the first pressure relief hole 1131 and the second pressure relief hole 1132 may influence the resonant frequency of the rear cavity. In order to ensure that the resonant frequency of the rear cavity is at a relatively high frequency, for example, the resonant frequency of the rear cavity may be in a range of 2000 Hz to 6000 Hz, it can be realized by designing a ratio of the opening dimension of the first pressure relief hole 1131 or the second pressure relief hole 1132 to a volume of the rear cavity. In some embodiments, in order to enable the sound production component 11 to form a first leaking structure and/or a second leaking structure with the inferior concha when being at least partially inserted into the inferior concha, a dimension of the sound production component 11 along the Y-direction may be determined based on a dimension of the inferior concha. At this time, when a distance from the sound outlet 112 to a bottom surface of the transducer (e.g., a bottom surface of a magnetic circuit assembly 1164 of the transducer 116 in FIG. 20A) is constant, the volume of the rear cavity may be related to the area of the upper side surface US and/or the area of the lower side surface LS of the sound production component 11. In order to make the resonant frequency of the rear cavity sufficiently high, the ratio of the area of the pressure relief holes 113 to the volume of the rear cavity should not be too small, in other words, a ratio of the area of the pressure relief holes 113 to the area of the upper side surface US and/or the area of the lower side surface LS should not be too small. In addition, in order to ensure the stability of the physical structure of the housing 111, thereby ensuring the service life of the open earphone 10, the ratio of the area of the pressure relief holes 113 to the area of the upper side surface US and/or the area of the lower side surface LS should not be too large. In some embodiments, the ratio of the area of the first pressure relief hole 1131 to the area of the upper side surface US may be between 0.036 and 0.093, and the ratio of the area of the second pressure relief hole 1132 to the area of the lower side surface LS may be between 0.018 and 0.051. In some embodiments, the ratio of the area of the first pressure relief hole 1131 to the area of the upper side surface US may be between 0.046 and 0.083, and the ratio of the area of the second pressure relief hole 1132 to the area of the lower side surface LS may be between 0.028 and 0.041. In some embodiments, the ratio of the area of the first pressure relief hole 1131 to the area of the upper side surface US may be between 0.056 and 0.073, and the ratio of the area of the second pressure relief hole 1132 to the area of the lower side surface LS may be between 0.031 and 0.038. In some embodiments, the ratio of the area of the first pressure relief hole 1131 to the area of the upper side surface US may be between 0.061 and 0.068, and the ratio of the area of the second pressure relief hole 1132 to the area of the lower side surface LS may be between 0.033 and 0.036.

Figure 19:
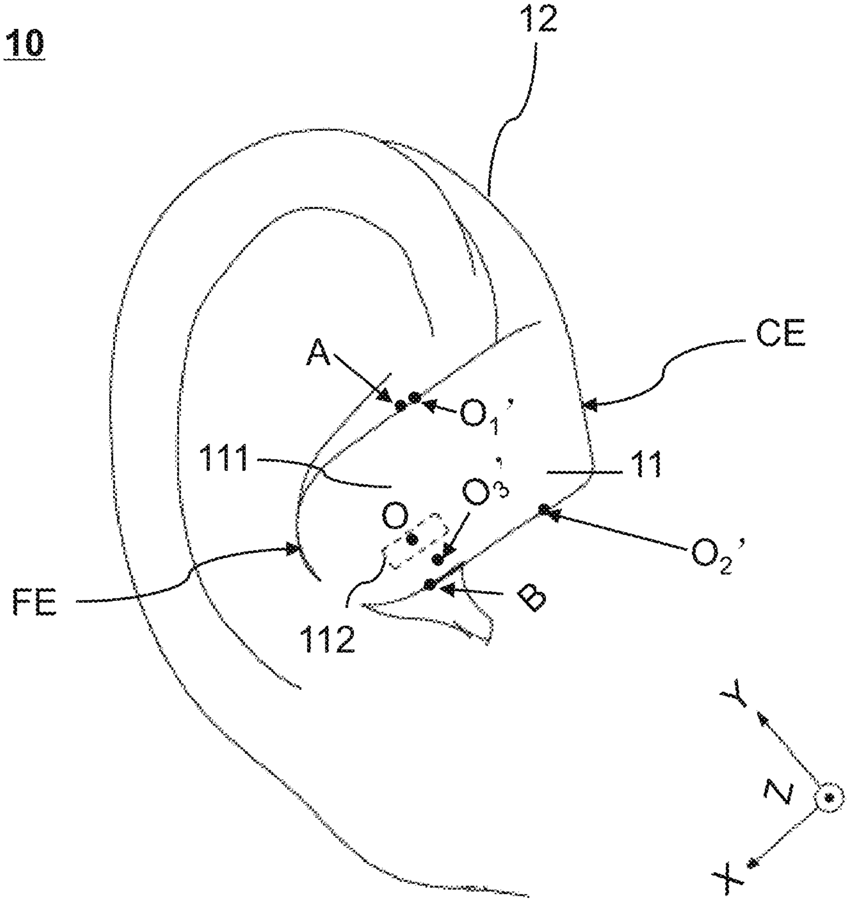
FIG. 19 is a schematic diagram illustrating a projection of an open earphone on a sagittal plane when the open earphone is in a wearing state according to some embodiments of the present disclosure.

FIG. 19 is a schematic diagram illustrating a projection of an open earphone on a sagittal plane when the open earphone is in a wearing state according to some embodiments of the present disclosure.

In some embodiments, referring to FIG. 14 and FIG. 19, in order to make the sound production component 11 stably worn on the user's ear, and to facilitate the construction of the cavity structure as shown in FIG. 10, and to make the cavity structure have at least two leaking structures, the free end FE may be pressed against the inferior concha in the long-axis direction X and the short-axis direction Y. At this time, the inner side surface IS of the sound production component 11 is inclined with respect to the sagittal plane, and at this time at least a first leaking structure UC close to the top of the head (i.e., a gap formed between the inferior concha and the upper boundary of the inner side surface IS) and a second leaking structure LC close to the ear canal (i.e., a gap formed between the inferior concha and the lower boundary of the inner side surface IS) exist between the inner side surface IS of the sound production component and the inferior concha. As a result, the listening volume, especially in the low and middle frequencies, can be increased, while still retaining the far-field sound leakage cancellation effect, thus enhancing the acoustic output performance of the open earphone 10.

In some embodiments, when the open earphone 10 is worn in the manner shown in FIG. 14, the first leaking structure UC and the second leaking structure LC formed between the inner side surface IS of the sound production component and the inferior concha have a certain scale in the long-axis direction X and in the thickness direction Z. In some embodiments, in order to facilitate understanding of the position of the first leaking structure UC and the second leaking structure LC, when the open earphone 10 is in the wearing state, a midpoint of two points formed by intersecting the upper/lower boundary of the inner side surface IS with the ear (e.g., a side wall of the inferior concha, a helix foot), respectively, may be taken as a position reference point of the first leaking structure UC/the second leaking structure LC, and a center of the ear canal opening of the ear canal may be taken as a position reference point of the ear canal. In some embodiments, in order to facilitate understanding of the position of the first leaking structure UC and the second leaking structure LC, when the open earphone 10 is in the wearing state, the midpoint of the upper boundary of the inner side surface IS may be taken as a position reference point of the first leaking structure UC, and a trisection point of the lower boundary of the inner side surface IS close to the free end FE (hereinafter referred to as a ⅓ point of the lower boundary of the inner side surface IS) as a position reference point of the second leaking structure LC. In the present disclosure, when a junction between the inner side surface IS and the upper side surface US and/or the lower side surface LS is curved, the upper boundary of the inner side surface IS may refer to an intersection line between the inner side surface IS and the upper side surface US, and the lower boundary of the inner side surface IS may refer to an intersection line between the inner side surface IS and the lower side surface LS. In some embodiments, when one or more side surfaces of the sound production component 11 (e.g., the inner side surface IS, the upper side surface US, and/or the lower side surface LS) are curved, the intersection line of the two side surfaces may refer to an intersection line between tangent planes of the two side surfaces farthest from the center of the sound production component and parallel to the long or short-axis of the sound production component.

Merely by way of example, the present disclosure uses the midpoint of the upper boundary of the inner side surface IS and the ⅓ point of the lower boundary of the inner side surface IS as position reference points of the first leaking structure UC and the second leaking structure LC, respectively. It should be known that the selected midpoint of the upper boundary of the inner side surface IS and the ⅓ point of the lower boundary of the inner side surface IS are only used as exemplary reference points to describe the positions of the first leaking structure UC and the second leaking structure LC. In some embodiments, other reference points may also be selected to describe the positions of the first leaking structure UC and the second leaking structure LC. For example, due to the variability of different users' ears, the first leaking structure UC/the second leaking structure LC formed when the open earphone 10 is worn is a gap with a gradually changing width, in this case, the reference position of the first leaking structure UC/the second leaking structure LC may be a position on the upper boundary/the lower boundary of the inner side surface IS near a region with the largest gap width. For example, the ⅓ point of the upper boundary of the inner side surface IS near the free end FE may be used as the position of the first leaking structure UC, and the midpoint of the lower boundary of the inner side surface IS may be used as the position of the second leaking structure LC.

In some embodiments, as shown in FIG. 19, the projection of the upper boundary of the inner side surface IS on the sagittal plane may coincide with the projection of the upper side surface US on the sagittal plane, and the projection of the lower boundary of the inner side surface IS on the sagittal plane may coincide with the projection of the lower side surface LS on the sagittal plane. The projection of the position reference point of the first leaking structure UC (i.e., the midpoint of the upper boundary of the inner side surface IS) on the sagittal plane is point A. The projection of the position reference point of the second leaking structure LC (i.e., the ⅓ point of the lower boundary of the inner side surface IS) on the sagittal plane is point C. The "projection point A of the midpoint of the upper boundary of the inner side surface IS on the sagittal plane" may be a projection point on the sagittal plane of an intersection point between the upper boundary of the inner side surface IS and a short-axis center plane of the magnetic circuit assembly of the transducer (e.g., the magnetic circuit assembly 1144 described below). The short-axis center plane of the magnetic circuit assembly is a plane parallel to the short-axis direction of the sound production component 11 and passing through a geometric center of the magnetic circuit assembly. The "projection point C of the ⅓ point of the lower boundary of the inner side surface IS on the sagittal plane" may be a projection point on the sagittal plane of a trisection point of the lower boundary of the inner side surface IS near the free end FE.

As shown in FIG. 19, in some embodiments, in the wearing state, the projection of the sound production component 11 of the open earphone 10 on the sagittal plane may at least partially cover the ear canal of the user, but the ear canal can communicate with the outside through the inferior concha to achieve the liberation of both ears of the user. In some embodiments, since the sound from the pressure relief hole 113 can be transmitted into the cavity structure through the leaking structure (e.g., the first leaking structure UC or the second leaking structure LC) and cancel each other out with the sound from the sound outlet 11, the first pressure relief hole 1131 and the second pressure relief hole 1132 cannot be too close to the leaking structures of the upper and lower sides.

In some embodiments, a projection point $O_{1'}$ of the center $O_1$ of the first pressure relief hole 1131 on the sagittal plane may substantially coincide with the projection point A of the midpoint of the upper boundary of the inner side surface IS on the sagittal plane. In some embodiments, a distance from the projection point $O_{1'}$ of the center $O_1$ of the first pressure relief hole 1131 on the sagittal plane to the projection point A of the midpoint of the upper boundary of the inner side surface IS on the sagittal plane may not be greater than 2 mm. In some embodiments, the distance from the projection point $O_{1'}$ of the center $O_1$ of the first pressure relief hole 1131 on the sagittal plane to the projection point A of the midpoint of the upper boundary of the inner side surface IS on the sagittal plane may not be greater than 1 mm. In some embodiments, the distance from the projection point $O_{1'}$ of the center $O_1$ of the first pressure relief hole 1131 on the sagittal plane to the projection point A of the midpoint of the upper boundary of the inner side surface IS on the sagittal plane may not be greater than 0.5 mm.

When the relative positions of the sound outlet 112 and the first pressure relief hole 1131 remain constant (i.e., a distance between the center O of the sound outlet 112 and the center $O_1$ of the first pressure relief hole 113 remains constant), the larger the volume V of the cavity structure, the smaller the overall (full frequency range) listening index of the open earphone 10. This is because of the influence of the air-acoustic resonance in the cavity structure, at the resonant frequency of the cavity structure, the air-acoustic resonance can occur within the cavity structure and the sound radiated outward is much larger than the sound of the pressure relief hole 113, resulting in a great increase in the sound leakage, and further making the listening index significantly smaller near the resonant frequency.

In some embodiments, the greater the distance between the projection point $O_{2'}$ of the center $O_2$ of the second pressure relief hole 1132 on the sagittal plane and the projection point A of the midpoint of the upper boundary of the inner side surface IS on the sagittal plane, the greater the volume V of the cavity structure. Thus, in some embodiments, on the premise that the sound production component 11 is at least partially inserted into the inferior concha, in order to make the cavity structure have a suitable volume V, so that the sound collection effect in the ear canal is relatively good, the distance between the projection point $O_{2'}$ and the projection point A may be in a range of 14.4 mm to 21.6 mm. In some embodiments, the distance between the projection point $O_{2'}$ and the projection point A may be in a range of 16.4 mm to 19.6 mm. In some embodiments, the distance between the projection point $O_{2'}$ and the projection point A may be in a range of 17.4 mm to 18.6 mm. In some embodiments, the distance between the projection point $O_{2'}$ and the projection point A may be in a range of 17.8 mm to 18.2 mm.

In some embodiments, in order to ensure that the sound production component 11 extends into the inferior concha and that there is a proper gap (forming an opening of the cavity structure) between the upper boundary of the inner side surface IS and the inferior concha, a distance between the projection point A of the midpoint of the upper boundary of the inner side surface IS on the sagittal plane and the projection point $O_{3'}$ of the center $O_3$ of the ear canal opening on the sagittal plane may be in a range of 12 mm to 18 mm, and a distance between the projection point $O_{2'}$ of the center $O_2$ of the second pressure relief hole on the sagittal plane and the projection point $O_{3'}$ of the center $O_3$ of the ear canal opening on the sagittal plane may be in a range of 6.88 mm to 10.32 mm. In some embodiments, the distance between the projection point A of the midpoint of the upper boundary of the inner side surface IS on the sagittal plane and the projection point $O_{3'}$ of the center $O_3$ of the ear canal opening on the sagittal plane may be in a range of 14 mm to 16 mm, and the distance between the projection point $O_{2'}$ of the center $O_2$ of the second pressure relief hole on the sagittal plane and the projection point $O_{3'}$ of the center $O_3$ of the ear canal opening on the sagittal plane may be in a range of 7.88 mm to 9.32 mm. In some embodiments, the distance between the projection point A of the midpoint of the upper boundary of the inner side surface IS on the sagittal plane and the projection point $O_{3'}$ of the center $O_3$ of the ear canal opening on the sagittal plane may be in a range of 14.5 mm to 15.5 mm, and the distance between the projection point $O_{2'}$ of the center $O_2$ of the second pressure relief hole on the sagittal plane and the projection point $O_{3'}$ of the center $O_3$ of the ear canal opening on the sagittal plane may be in a range of 7.88 mm to 8.32 mm.

In some embodiments, in order to ensure that the sound production component 11 extends into the inferior concha and that there is a proper gap (forming an opening of the cavity structure) between the upper boundary of the inner side surface IS and the inferior concha, a distance between the projection point $O_{1'}$ of the center $O_1$ of the first pressure relief hole 1131 on the sagittal plane and the projection point $O_{3'}$ of the center $O_3$ of the ear canal opening on the sagittal plane may be in a range of 12 mm to 18 mm. In some embodiments, the distance between the projection point $O_{1'}$ of the center $O_1$ of the first pressure relief hole 1131 on the sagittal plane and the projection point $O_{3'}$ of the center $O_3$ of the ear canal opening on the sagittal plane may be in a range of 14 mm to 16 mm. In some embodiments, the distance between the projection point $O_{1'}$ of the center $O_1$ of the first pressure relief hole 1131 on the sagittal plane and the projection point $O_{3'}$ of the center $O_3$ of the ear canal opening on the sagittal plane may be in a range of 14.5 mm to 15.5 mm.

In some embodiments, the greater the distance between the projection point $O_{1'}$ of the center $O_1$ of the first pressure relief hole 1131 on the sagittal plane and the projection point B of the ⅓ point of the lower boundary of the inner side surface IS on the sagittal plane, the larger the volume V of the cavity structure. Therefore, in some embodiments, on the premise that the sound production component 11 is at least partially inserted into the inferior concha, in order to make the cavity structure have a suitable volume V, so that the sound collection effect in the ear canal is relatively good, the distance between the projection point $O_{1'}$ of the center $O_1$ of the first pressure relief hole 1131 on the sagittal plane and the projection point B of the ⅓ point of the lower boundary of the inner side surface IS on the sagittal plane is in a range of 13.76 mm to 20.4 mm. In some embodiments, the distance between the projection point $O_{1'}$ of the center $O_1$ of the first pressure relief hole 1131 on the sagittal plane and the projection point B of the ⅓ point of the lower boundary of the inner side surface IS on the sagittal plane is in a range of 15.76 mm to 18.64 mm. In some embodiments, the distance between the projection point $O_1'$ of the center $O_1$ of the first pressure relief hole 1131 on the sagittal plane and the projection point B of the ⅓ point of the lower boundary of the inner side surface IS on the sagittal plane is in a range of 16.16 mm to 18.24 mm.

In some embodiments, in order to reduce the cancellation of the sound of the second pressure relief hole 1132 transmitted into the cavity structure via the second leaking structure LC with the sound of the sound outlet 112, a distance between the projection point $O_2'$ of the center $O_2$ of the second pressure relief hole 1132 on the sagittal plane and the projection point B of the ⅓ point of the lower boundary of the inner side surface IS on the sagittal plane is in a range of 8.16 mm to 12.24 mm. In some embodiments, the distance between the projection point $O_{2'}$ of the center $O_2$ of the second pressure relief hole 1132 on the sagittal plane and the projection point B of the ⅓ point of the lower boundary of the inner side surface IS on the sagittal plane is in a range of 9.16 mm to 11.24 mm. In some embodiments, the distance between the projection point $O_{2'}$ of the center $O_2$ of the second pressure relief hole 1132 on the sagittal plane and the projection point B of the ⅓ point of the lower boundary of the inner side surface IS on the sagittal plane is in a range of 9.66 mm to 10.74 mm.

In some embodiments, in order to ensure that the sound production component 11 extends into the inferior concha and that there is a proper gap (forming an opening of the cavity structure) between the upper boundary of the inner side surface IS and the inferior concha, a distance between the projection B of the ⅓ point of the lower boundary of the inner side surface on the sagittal plane and the projection point $O_{3'}$ of the center $O_3$ of the ear canal opening on the sagittal plane is in a range of 1.76 mm to 2.64 mm. In some embodiments, the distance between the projection B of the ⅓ point of the lower boundary of the inner side surface on the sagittal plane and the projection point $O_{3'}$ of the center $O_3$ of the ear canal opening on the sagittal plane is in a range of 1.96 mm to 2.44 mm. In some embodiments, the distance between the projection B of the ⅓ point of the lower boundary of the inner side surface on the sagittal plane and the projection point $O_{3'}$ of the center $O_3$ of the ear canal opening on the sagittal plane is in a range of 2.16 mm to 2.24 mm.

Figure 20A:
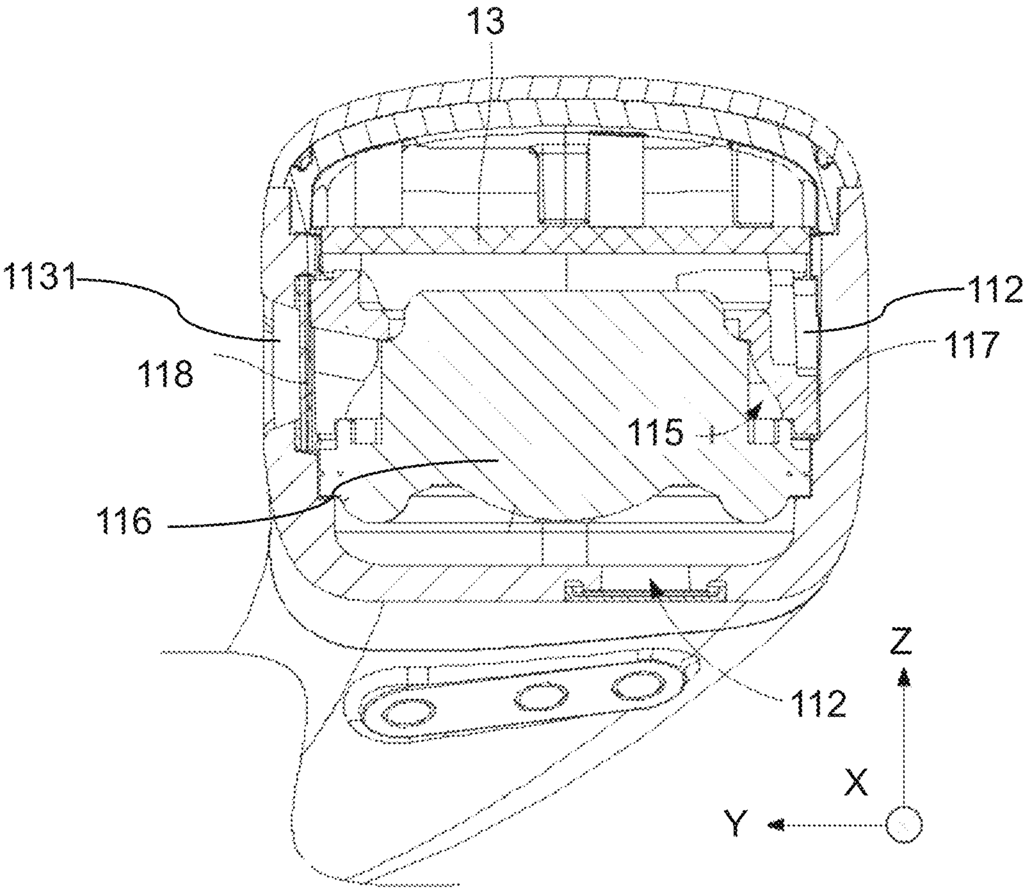
FIG. 20A is a diagram illustrating an exemplary internal structure of a sound production component according to some embodiments of the present disclosure.

FIG. 20A is a diagram illustrating an exemplary internal structure of a sound production component according to some embodiments of the present disclosure.

As shown in FIG. 20A, the sound production component 11 may include a housing 111 connected to an ear hook 12 and a transducer 116 inside the housing 111. In some embodiments, the sound production component 11 may further include a master control circuit board 13 provided within the housing 111 and a battery (not shown) provided at one end of the ear hook 12 away from the sound production component 11. The battery and the transducer 116 are electrically connected to the master control circuit board 13, respectively, to allow the battery to power the transducer 116 under the control of the master control circuit board 13. Of course, both the battery and the transducer 116 may also be provided within the sound production component 11, and the battery may be closer to the connection end CE while the transducer 116 may be closer to the free end FE.

In some embodiments, the open earphone 10 may include an adjustment mechanism connecting the sound production component 11 and the ear hook 12. Different users are able to adjust the relative position of the sound production component 11 on the ear through the adjustment mechanism in the wearing state so that the sound production component 11 is located at a suitable position, thus making the sound production component 11 form a cavity structure with the inferior concha. In addition, due to the presence of the adjustment mechanism, the user is also able to adjust the earphone 10 to wear to a more stable and comfortable position.

Since the inferior concha has a certain volume and depth, after the free end FE is inserted into the inferior concha, there may be a certain distance between the inner side surface IS and the inferior concha of the sound production component 11. In other words, the sound production component 11 and the inferior concha may cooperate to form a cavity structure communicated with the external ear canal in the wearing state. A sound outlet 112 is provided on the sound production component 11 (e.g., the inner side surface IS), and the sound outlet 112 may be at least partially located in the aforementioned cavity structure. In this way, in the wearing state, the sound waves transmitted by the sound outlet 112 are limited by the aforementioned cavity structure, i.e., the aforementioned cavity structure can gather sound waves, so that the sound waves can be better transmitted to the external ear canal, thus improving the volume and sound quality of the sound heard by the user in the near-field, which is conducive to improving the acoustic effect of the earphone 10. Further, since the sound production component 11 may be set so as not to block the external ear canal in the wearing state, the aforementioned cavity structure may be in a semi-open setting. In this way, a portion of the sound waves transmitted by the sound outlet 112 may be transmitted to the ear canal thereby allowing the user to hear the sound, and another portion thereof may be transmitted with the sound reflected by the ear canal through a gap between the sound production component 11 and the ear (e.g., a portion of the inferior concha not covered by the sound production component 11) to the outside of the open earphone 10 and the ear, thereby creating a first leakage in the far-field. At the same time, the sound waves transmitted through the pressure relief holes 113 (the first pressure relief hole 1131 and the second pressure relief hole 1132) opened on the sound production component 11 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other, so that the aforementioned first leakage sound and the aforementioned second leakage sound can cancel each other out in the far-field, which is conducive to reducing the leakage of the open earphone 10 in the far-field.

In some embodiments, a front cavity 114 may be formed between the transducer 116 and the housing 111. The sound outlet 112 is provided in a region on the housing 111 that forms the front cavity 114, and the front cavity 114 is communicated with the outside world through the sound outlet 112.

In some embodiments, the front cavity 114 is set between a diaphragm of the transducer 116 and the housing 111. In order to ensure that the diaphragm has a sufficient vibration space, the front cavity 114 may have a large depth dimension (i.e., a distance dimension between the diaphragm of the transducer 116 and the housing 111 directly opposite to it). In some embodiments, as shown in FIG. 20A, the sound outlet 112 is set on the inner side surface IS in the thickness direction Z. At this point, the depth of the front cavity 114 may refer to a dimension of the front cavity 114 in the Z-direction. However, too large the depth of the front cavity 114 may lead to an increase in the dimension of the sound production component 11 and affect the wearing comfort of the open earphone 10. In some embodiments, the depth of the front cavity 114 may be in a range of 0.55 mm-1.00 mm. In some embodiments, the depth of the front cavity 114 may be in a range of 0.66 mm-0.99 mm. In some embodiments, the depth of the front cavity 114 may be in a range of 0.76 mm-0.99 mm. In some embodiments, the depth of the front cavity 114 may be in a range of 0.96 mm-0.99 mm. In some embodiments, the depth of the front cavity 114 may be 0.97 mm.

In order to improve the sound production effect of the open earphone 10, a resonant frequency of a structure similar to a Helmholtz resonator formed by the front cavity 114 and the sound outlet 112 should be as high as possible, so that the overall frequency response curve of the sound production component has a wide flat region. In some embodiments, a resonant frequency $f_1$ of the front cavity 114 may be no less than 3 kHz. In some embodiments, the resonant frequency $f_1$ of the front cavity 114 may be no less than 4 kHz. In some embodiments, the resonant frequency $f_1$ of the front cavity 114 may be no less than 6 kHz. In some embodiments, the resonant frequency $f_1$ of the front cavity 114 may be no less than 7 kHz. In some embodiments, the resonant frequency $f_1$ of the front cavity 114 may be no less than 8 kHz.

Referring to FIG. 20A, in some embodiments, a position corresponding to the first pressure relief hole 1131 and/or the second pressure relief hole 1132 may be provided with an acoustic resistance mesh 118. The acoustic resistance mesh 118 may adjust an amplitude at the resonant frequency of the rear cavity, and may also realize dustproof and waterproof functions. When other parameters of the acoustic resistance mesh 118 are constant, the magnitude of its acoustic resistance is related to its thickness, and different thicknesses of acoustic resistance meshes may have a certain influence on the acoustic output performance of corresponding acoustic holes. Therefore, the thickness of the acoustic resistance mesh 118 is limited in a certain range. In some embodiments, the thicknesses of the acoustic resistance meshes 118 disposed at the first pressure relief hole 1131 and the second pressure relief hole 1132 may be in a range of 35 μm to 300 μm. In some embodiments, the thicknesses of the acoustic resistance meshes 118 disposed at the first pressure relief hole 1131 and the second pressure relief hole 1132 may be in a range of 40 μm to 150 μm. In some embodiments, the thicknesses of the acoustic resistance meshes 118 disposed at the first pressure relief hole 1131 and the second pressure relief hole 1132 may be in a range of 50 μm to 65 μm. In some embodiments, the thicknesses of the acoustic resistance meshes 118 disposed at the first pressure relief hole 1131 and the second pressure relief hole 1132 may be in a range of 55 μm to 62 μm. On the other hand, the greater a distance between an end of the acoustic resistance mesh 118 facing the outside of the housing 111 (i.e., an upper surface of the acoustic resistance mesh 118) and an outer surface of the housing 111, the closer the position of the acoustic resistance mesh 118 to the rear cavity, and the smaller the volume of the rear cavity. In some embodiments, a distance between the upper surface of the acoustic resistance mesh 118 disposed at the first pressure relief hole 1131 and the outer surface of the housing 111 is in a range of 0.8 mm to 0.9 mm, and a distance between the upper surface of the acoustic resistance mesh 118 disposed at the second pressure relief hole 1132 and the outer surface of the housing 111 is in a range of 0.7 mm to 0.8 mm. In some embodiments, the distance between the upper surface of the acoustic resistance mesh 118 disposed at the first pressure relief hole 1131 and the outer surface of the housing 111 is in a range of 0.82 mm to 0.88 mm, and the distance between the upper surface of the acoustic resistance mesh 118 disposed at the second pressure relief hole 1132 and the outer surface of the housing 111 is in a range of 0.72 mm-0.76 mm. In some embodiments, the distance between the upper surface of the acoustic resistance mesh 118 disposed at the first pressure relief hole 1131 and the outer surface of the housing 111 may be 0.86 mm, and the distance between the upper surface of the acoustic resistance mesh 118 disposed at the second pressure relief hole 1132 and the outer surface of the housing 111 may be 0.73 mm.

Figure 20B:
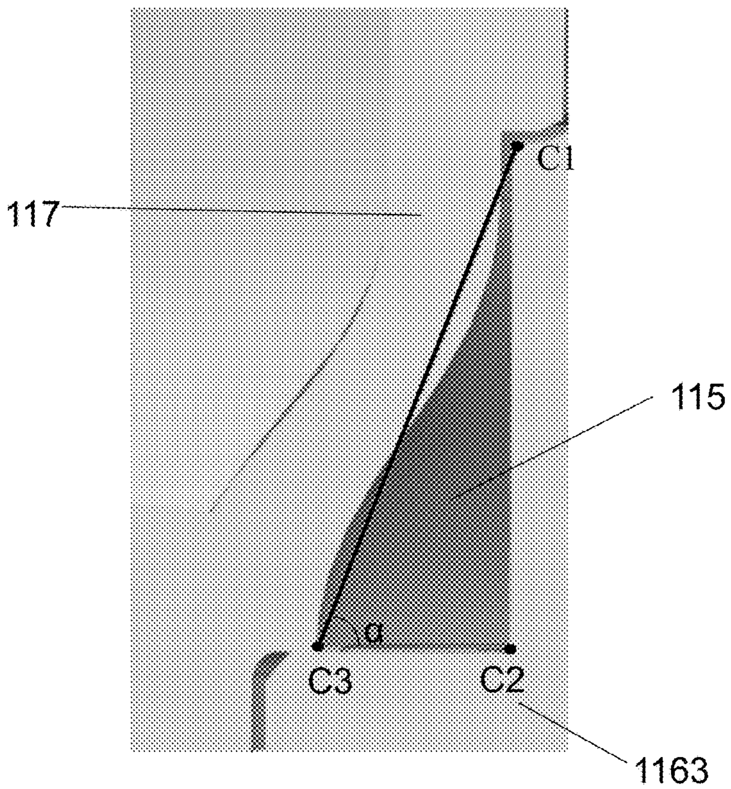
FIG. 20B is a diagram illustrating an exemplary structure of a second acoustic cavity according to some embodiments of the present disclosure.

FIG. 20B is a diagram illustrating an exemplary structure of a second acoustic cavity according to some embodiments of the present disclosure.

Referring to FIG. 20A and FIG. 20B, in some embodiments, the housing 111 may be provided with a bracket 117 capable of enclosing a cavity 115 with the transducer 116, so that the cavity 115 and other structures in the housing 111 (e.g., a master control circuit board 13) can be separated, which is beneficial for improving the acoustic performance of the sound production component 11. It should be known that the rear cavity described elsewhere in the present disclosure may not only include the cavity 115, but may also include another region (e.g., a space between the diaphragm and the magnetic circuit assembly) located on a rear side of the diaphragm and communicated with the cavity 115. The housing 111 is provided with the pressure relief holes 113 (e.g., the first pressure relief hole 1131 and/or the second pressure relief hole 1132), and the bracket 117 is provided with an acoustic channel connecting the pressure relief holes 113 and the cavity 115, so that the cavity 115 can be communicated with the external environment, i.e., air can freely enter and exit the rear cavity, which is conducive to reducing the resistance of the diaphragm of the transducer 116 during a vibration process.

In some embodiments, for the acoustic output performance of the open earphone 10, the frequency response curve of the rear cavity needs to have a wide flat region, so the resonant frequency of the rear cavity can be set relatively large. Further, in order to make the second leakage sound and the first leakage sound formed by the pressure relief holes 113 better cancel each other out, in some embodiments, the resonant frequency of the rear cavity may be equal to the resonant frequency of the front cavity 114. In some embodiments, a difference between the resonant frequency of the rear cavity and the resonant frequency of the front cavity 114 may not be greater than 1 kHz. In some embodiments, the difference between the resonant frequency of the rear cavity and the resonant frequency of the front cavity 114 may not be greater than 500 Hz. In some embodiments, the difference between the resonant frequency of the rear cavity and the resonant frequency of the front cavity 114 may not be greater than 200 Hz. In some embodiments, the resonant frequency of the rear cavity may not be lower than 4.5 kHz. In some embodiments, the resonant frequency of the rear cavity may not be lower than 6 kHz. In some embodiments, the resonant frequency of the rear cavity may be 8 kHz.

In some embodiments, a combination of the rear cavity 114 and a pressure relief hole 113 set on the housing 112 may be approximately regarded as a Helmholtz resonator model. The rear cavity may be the cavity of the Helmholtz resonator model and the pressure relief hole may be the neck of the Helmholtz resonator model. At this time, the resonant frequency of the Helmholtz resonator model is the resonant frequency of the rear cavity. In the Helmholtz resonator model, a dimension of the neck (e.g., the first pressure relief hole 1131 or the second pressure relief hole 1132) may affect the resonant frequency of the cavity (e.g., the rear cavity), and the specific relationship is shown in equation (2):

$$f = \frac{c}{2\pi}\sqrt{\frac{S}{VL}}, \tag{2}$$

where c represents the speed of sound, S represents an area of the neck (e.g., the first pressure relief hole 1131 or the second pressure relief hole 1132), V represents the volume of the cavity (e.g., the rear cavity), and L represents the depth of the neck (e.g., the first pressure relief hole 1131 or the second pressure relief hole 1132).

From equation (2), it can be seen that when the volume V of the rear cavity is reduced, the resonant frequency $f_2$ of the rear cavity increases. Therefore, in order to make the rear cavity have a sufficiently large resonant frequency, the volume of the rear cavity should be small enough.

However, the volume of the rear cavity may also affect an acoustic capacitance Ca of the rear cavity, and the change of the acoustic capacitance Ca of the rear cavity may cause a change in capacitive reactance characteristics of the rear cavity, thereby affecting vibration characteristics of the rear cavity. The specific relationship between the volume of the rear cavity and the capacitive reactance Ca of the rear cavity is shown in equation (3):

$$C_a = \frac{V}{\rho c^2}, \tag{3}$$

where ρ represents an air density, c represents the speed of sound, and V represents the volume of the rear cavity.

Combining equation (2) and equation (3), it can be seen that when the volume V of the rear cavity increases, the acoustic capacitance Ca of the rear cavity increases, but the corresponding resonant frequency of the rear cavity decreases. In order to increase the acoustic capacitance Ca of the rear cavity while increasing the resonant frequency of the rear cavity, the volume V of the rear cavity should be in an appropriate range.

As shown in FIG. 20B, in some embodiments, a section of the cavity 115 may be composed of two vertical sides and a curved side, and the section (e.g., a section C1C2C3) may be approximated as a triangle by connecting two endpoints of the curved side. The hypotenuse C1C3 is formed by a connecting line of two endpoints formed by the contact of a curved surface formed on the bracket 115 and two straight sides. The two straight lines C1C2 and C2C3 are formed by a cone holder of the transducer 116. There is an angle α between the hypotenuse C1C3 and the straight side C2C3. In some embodiments, the cone holder of the sound production component 11 needs to be provided with acoustic holes (e.g., sound transmission holes) in a region where the straight side C2C3 is located, so that the sound generated by the vibration of the diaphragm 1161 can be radiated to the cavity 115, and a good channel for radiating the sound can be provided between the rear side of the diaphragm 1161 and the cavity 115. In order to ensure the acoustic performance, the magnitude of the angle α may be adjusted by adjusting a length of the straight side C1C2, and then the volume of the cavity 115 can be adjusted by changing an area of the triangle C1C2C3, thereby changing the volume of the rear cavity. In some embodiments, the length of the straight side C2C3 is not less than 0.67 mm due to the limitation of the sound transmission holes. In some embodiments, the length of the straight side C2C3 may be of 0.7 mm. In some embodiments, since the value of the angle α has a limited range, the volume V of the cavity 115 also has a limited range.

Figure 20C:
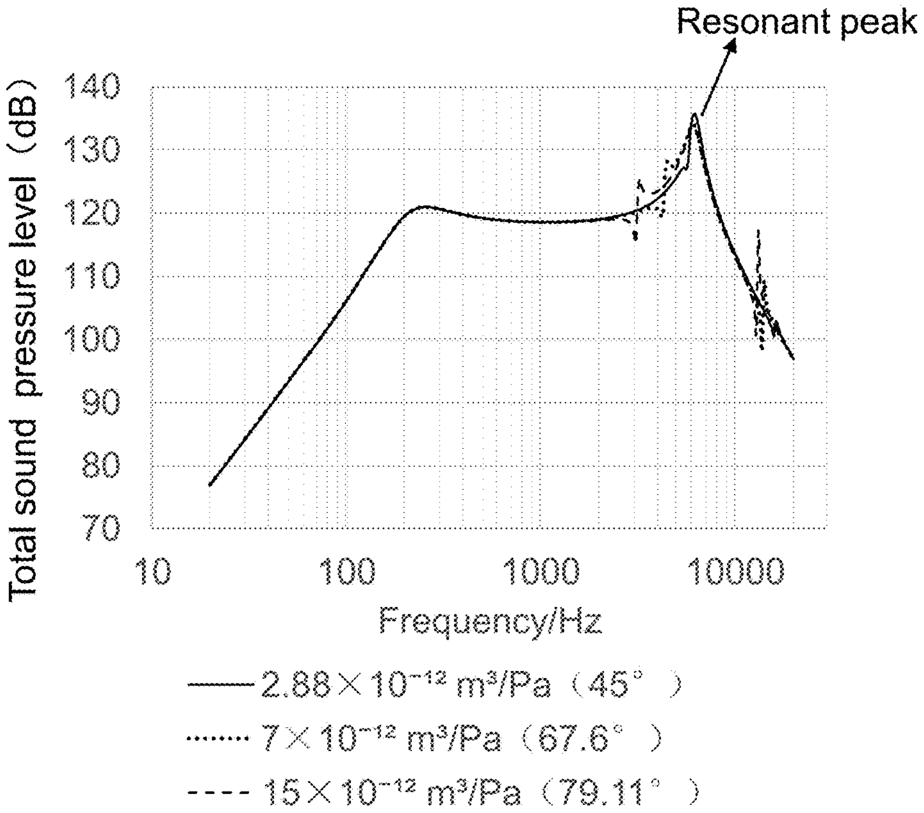
FIG. 20C is diagram illustrating frequency response curves corresponding to different angles $\alpha$ of a rear cavity according to some embodiments of the present disclosure.

FIG. 20C is diagram illustrating frequency response curves corresponding to different angles α of a rear cavity according to some embodiments of the present disclosure. As shown in FIG. 20C, when the length of the straight side C2C3 is reduced to reduce the angle α from 67.6° to 45°, the volume V of the rear cavity decreases, and the corresponding acoustic capacitance Ca of the rear cavity decreases from $7\times10^{-12}$ $m^3/Pa$ to $2.88\times10^{-12}$ $m^3/Pa$, but the resonant frequency of the rear cavity increases from about 4.5 kHz to about 6 kHz. When the length of the straight side C2C3 is increased to increase the angle α from 67.6° to 79.11°, the volume V of the rear cavity increases, and the corresponding acoustic capacitance Ca of the rear cavity increases from $7\times10^{-12}$ $m^3/Pa$ to $15\times10^{-12}$ $m^3/Pa$, but the resonant frequency of the rear cavity decreases from about 4.5 kHz to about 3 kHz. It should be noted that the parameters such as $7\times10^{-12}$ $m^3/Pa$ and $15\times10^{-12}$ $m^3/Pa$ shown in FIG. 20C only represent the theoretical acoustic capacitance corresponding to the volume of the rear cavity, which may differ from the actual data.

In some embodiments, the angle α of the cavity 115 may be in a range of 45° to 79.11°. In some embodiments, the angle α of the cavity 115 may be in a range of 60° to 70°. In some embodiments, the angle α of the cavity 115 may be 67.6°. In some embodiments, the angle α of the cavity 115 may be in a range of 67° to 68°.

Figure 21:
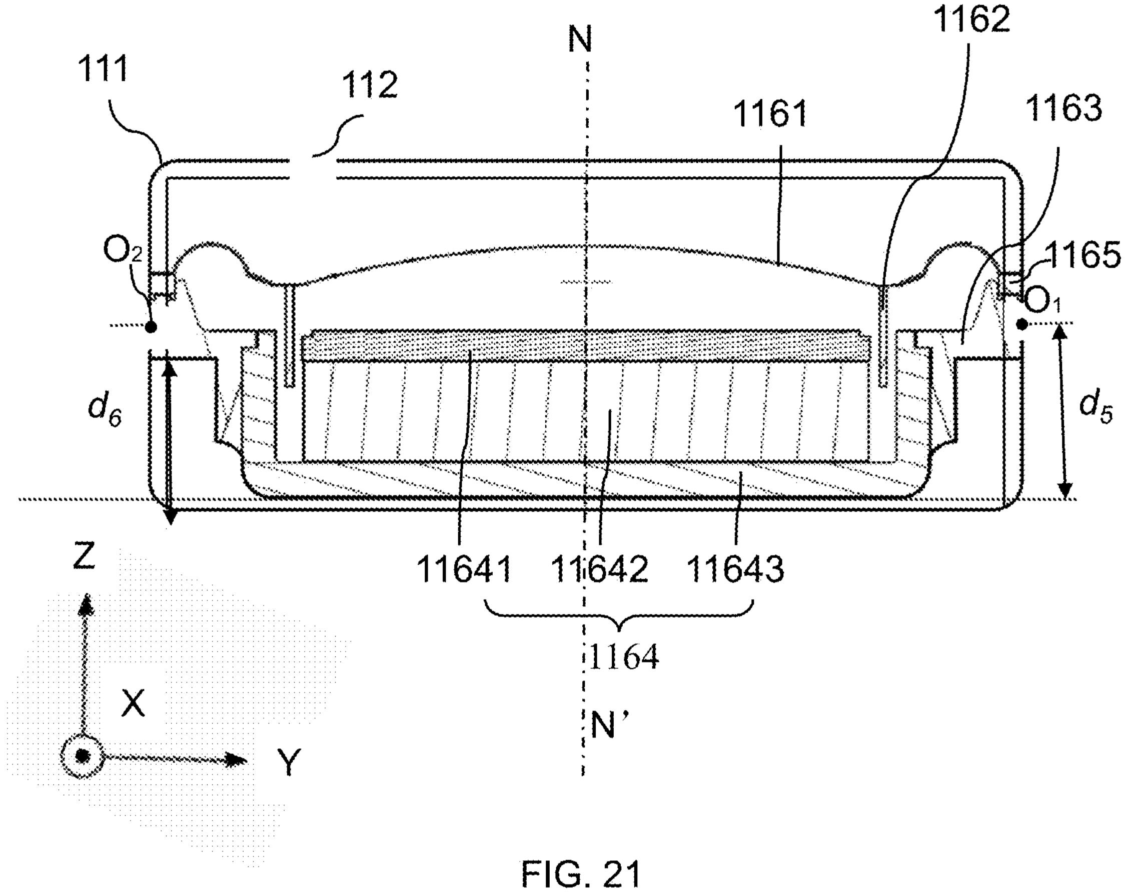
FIG. 21 is a diagram illustrating an exemplary internal structure of a transducer according to some embodiments of the present disclosure.

FIG. 21 is a diagram illustrating an exemplary internal structure of a transducer according to some embodiments of the present disclosure.

As shown in FIG. 21, the housing 111 accommodates the transducer 116. The transducer 116 includes a diaphragm 1161, a voice coil 1162, a cone holder 1163, and a magnetic circuit assembly 1164. The cone holder 1163 is provided around the diaphragm 1161, the voice coil 1162, and the magnetic circuit assembly 1164 to provide a fixing platform for mounting. The transducer 116 may be connected to the housing 111 through the cone holder 1163. The diaphragm 1161 covers the voice coil 1162 and the magnetic circuit assembly 1164 in the Z-direction, and the voice coil 1162 extends into the magnetic circuit assembly 1164 and is connected to the diaphragm 1161. A magnetic field generated after the voice coil 1162 is energized interacts with a magnetic field formed by the magnetic circuit assembly 1164, thereby driving the diaphragm 1161 to produce a mechanical vibration, which in turn produces sound through the transmission of media such as air, and the sound is output through the sound outlet 112.

In some embodiments, the magnetic circuit assembly 1164 includes a magnetic conduction plate 11641, a magnet 11642, and an accommodation member 11643. The magnetic conduction plate 11641 and the magnet 11642 are interconnected. The magnet 11642 is mounted on a bottom wall of the accommodation member 11643 on a side away from the magnetic conduction plate 11641, and the magnet 11642 has a gap between a peripheral side of the magnet 11642 and an inner side wall of the accommodation member 11643. In some embodiments, an outer side wall of the accommodation member 11643 is connected and fixed to the cone holder 1163. In some embodiments, both the accommodation member 11643 and the magnetic conduction plate 11641 may be made of a magnetically conductive material (e.g., iron, etc.).

In some embodiments, a peripheral side of the diaphragm 1161 may be connected to the cone holder 1163 by a fixing ring 1165. In some embodiments, a material of the fixing ring 1165 may include a stainless-steel material or any other metal material to adapt to the processing and manufacturing process of the diaphragm 1161.

Referring to FIG. 20A and FIG. 21, in some embodiments, in order to improve the acoustic output (especially low frequency output) effect of the sound production component 11 and improve the ability of the diaphragm 1161 to push the air, a projection area of the diaphragm 1161 along the Z direction is as large as possible. However, too large the area of the diaphragm 1161 leads to too large a dimension of the transducer 116, which in turn causes too large the housing 111, thus easily causing the housing 111 to collide and rub against the ear, thereby affecting the wearing comfort of the sound production component 11. Therefore, the dimension of the housing 111 needs to be designed. Exemplarily, a short-axis dimension (also referred to as a width dimension) of the housing 111 in the Y-direction may be determined according to a dimension (e.g. 17 mm) of the inferior concha along the Y-direction, and then a suitable length-to-short ratio (i.e. a ratio of the dimension of the housing 111 in the X-direction to a dimension of the housing 111 in the Y-direction) is selected according to the wearing comfort, so as to determine a long-axis dimension (also referred to as a length dimension, e.g. 21.49 mm) of the housing 111 in the X-direction to match the dimension of the inferior concha along the X-direction.

In some embodiments, in order to enable most users to wear the open earphone 10 (e.g., when most users wear the open earphone, the sound production component 11 is at least partially inserted into the inferior concha or abuts against the antihelix region) to form a cavity structure with better acoustics, for example, such that the open earphone 10 forms the first leaking structure UC and the second leaking structure LC between the open earphone 10 and the user's ear when the open earphone 10 is worn to improve the acoustic performance of the earphone, the dimension of the housing 111 may take a value in a preset range. In some embodiments, depending on a width dimension range of the inferior concha along the Y-direction, the width dimension of the housing 111 along the Y-direction may be in a range of 11 mm-16 mm. In some embodiments, the width dimension of the housing 111 along the Y-direction may be in a range of 11 mm to 15 mm. In some embodiments, the width dimension of the housing 111 along the Y-direction may be in a range of 14 mm to 15 mm. In some embodiments, a ratio of the dimension of the housing 111 along the X-direction to the dimension of the housing 111 along the Y-direction may be in a range of 1.2 to 5. In some embodiments, the ratio of the dimension of the housing 111 along the X-direction to the dimension of the housing 111 along the Y-direction may be in a range of 1.4 to 4. In some embodiments, the ratio of the dimension of the housing 111 along the X-direction to the dimension of the housing 111 along the Y-direction may be in a range of 1.5 to 2. In some embodiments, the length dimension of the housing 111 along the X-direction may be in a range of 15 mm to 30 mm. In some embodiments, the length dimension of the housing 111 along the X-direction may be in a range of 16 mm to 28 mm. In some embodiments, the length dimension of the housing 111 along the X-direction may be in a range of 19 mm to 24 mm. In some embodiments, in order to avoid the large volume of the housing 111 affecting the wearing comfort of the open earphone 10, a thickness dimension of the housing 111 along the Z-direction may be in a range of 5 mm to 20 mm. In some embodiments, the thickness dimension of the housing 111 along the Z-direction may be in a range of 5.1 mm to 18 mm. In some embodiments, the thickness dimension of the housing 111 along the Z-direction may be in a range of 6 mm to 15 mm. In some embodiments, the thickness dimension of the housing 111 along the Z-direction may be in a range of 7 mm to 10 mm. In some embodiments, an area of the inner side surface IS of the housing 111 (in the case where the inner side surface IS is rectangular, the area is equal to a product of the length dimension and the width dimension of the housing 111) may be 90 $mm^2$-560 $mm^2$. In some embodiments, the area of the inner side surface IS may be approximately regarded as the projection area of the diaphragm 1161 along the Z-direction. For example, the area of the inner side surface IS may differ by 10% from the projection area of the diaphragm 1161 along the Z-direction. In some embodiments, the area of the inner side surface IS may be in a range of 150 $mm^2$ to 360 $mm^2$. In some embodiments, the area of the inner side surface IS may be in a range of 160 $mm^2$ to 240 $mm^2$. In some embodiments, the area of the inner side surface IS may be in a range of 180 $mm^2$ to 200 $mm^2$. Based on the principles described in FIG. 10 to FIG. 13, when the open earphone 10 is worn in the manner shown in FIG. 14, on the basis that the dimension of the open earphone 10 satisfies the wearing comfort, the acoustic performance of the open earphone 10 is superior to the existing open earphones, i.e., the dimension of the open earphone 10 can be smaller than the existing open earphones while achieving the same excellent acoustic performance.

In some embodiments, in order to make the rear cavity both have a large resonant frequency and a large acoustic capacitance Ca, the volume V of the rear cavity needs to be in an appropriate range. In some embodiments, in order to make the volume V of the rear cavity be in the appropriate range, a distance from the center $O_1$ of the first pressure relief hole 1131 to a bottom surface of the magnetic circuit assembly 1164 may be reasonably designed. Referring to FIG. 20A and FIG. 21, when the thickness of the sound production component 11 in the Z-direction is constant, the smaller the distance from the center $O_1$ of the first pressure relief hole 1131 along the Z-direction to the bottom surface of the magnetic circuit assembly 1164, the larger the volume of the rear cavity may be. At this time, according to the aforementioned equation (3), it is known that the acoustic capacitance Ca of the rear cavity increases, but the corresponding resonant frequency of the rear cavity decreases. In order to ensure that the sound production efficiency of the sound production component 11 is sufficiently high, that the resonant frequency of the rear cavity is in a suitable frequency range (e.g., 2000 Hz-6000 Hz), and that the user is comfortable enough to wear, considering the structural strength, the difficulty of process implementation, and the overall thickness of the housing 111, the distance $d_5$ from the center $O_1$ of the first pressure relief hole 1131 along the Z-direction to the bottom surface of the magnetic circuit assembly 1164 (i.e., a side surface of the accommodation member 11643 along the Z-direction away from the sound outlet 112) is in a range of 1.31 mm to 1.98 mm. In some embodiments, the distance $d_5$ from the center $O_1$ of the first pressure relief hole 1131 along the Z-direction to the bottom surface of the magnetic circuit assembly 1164 is in a range of 1.31 mm to 1.98 mm. In some embodiments, the distance $d_5$ from the center $O_1$ of the first pressure relief hole 1131 along the Z-direction to the bottom surface of the magnetic circuit assembly 1164 is in a range of 1.41 mm to 1.88 mm. In some embodiments, the distance $d_5$ from the center $O_1$ of the first pressure relief hole 1131 along the Z-direction to the bottom surface of the magnetic circuit assembly 1164 is in a range of 1.51 mm to 1.78 mm. In some embodiments, the distance $d_5$ from the center $O_1$ of the first pressure relief hole 1131 along the Z-direction to the bottom surface of the magnetic circuit assembly 1164 is in a range of 1.56 mm to 1.72 mm. Similarly, in some embodiments, a distance $d_6$ from the center $O_2$ of the second pressure relief hole 1132 along the Z-direction to the bottom surface of the magnetic circuit assembly 1164 is in a range of 1.31 mm to 1.98 mm. In some embodiments, the distance $d_6$ from the center $O_2$ of the second pressure relief hole 1132 along the Z-direction to the bottom surface of the magnetic circuit assembly 1164 is in a range of 1.41 mm to 1.88 mm. In some embodiments, the distance $d_6$ from the center $O_2$ of the second pressure relief hole 1132 along the Z-direction to the bottom surface of the magnetic circuit assembly 1164 is in a range of 1.51 mm to 1.78 mm. In some embodiments, the distance $d_6$ from the center $O_2$ of the second pressure relief hole 1132 along the Z-direction to the bottom surface of the magnetic circuit assembly 1164 is in a range of 1.56 mm to 1.72 mm.

In some embodiments, in order to make the dimension of the sound production component 11 adapt to the dimension of the inferior concha, the dimension of the sound production component 11 along the Y-direction can be limited. In some embodiments, the dimension of the sound production component 11 along the Y-direction may be determined by the distance between the center $O_1$ of the first pressure relief hole 1131 and the long-axis center plane of the magnetic circuit assembly 1164 (e.g., the plane NN' perpendicular to a plane of paper facing inward shown in FIG. 21). In some embodiments, for ease of design, the distance between the center $O_1$ of the first pressure relief hole 1131 and the long-axis center plane of the magnetic circuit assembly 1164 (e.g., the plane NN' perpendicular to a plane of paper facing inward shown in FIG. 21) may be limited. In some embodiments, the distance between the center $O_1$ of the first pressure relief hole 1131 and the long-axis center plane of the magnetic circuit assembly 1164 is in a range of 5.45 mm to 8.19 mm. In the present disclosure, the long-axis center plane of the magnetic circuit assembly 1164 refers to a plane parallel to the lower side surface LS of the sound production component 11 and passing through the centroid of the magnetic circuit assembly 1164. That is to say, the long-axis center plane of the magnetic circuit assembly 1164 may divide the magnetic circuit assembly 1164 into two identical parts along the X-direction. The distance between the center $O_1$ of the first pressure relief hole 1131 and the long-axis center plane of the magnetic circuit assembly 1164 is a distance from the center $O_1$ of the first pressure relief hole 1131 to the long-axis center plane along the short-axis Y-direction. In some embodiments, the distance between the center $O_1$ of the first pressure relief hole 1131 and the long-axis center plane of the magnetic circuit assembly 1164 is in a range of 5.95 mm to 8.69 mm. In some embodiments, the distance between the center $O_1$ of the first pressure relief hole 1131 and the long-axis center plane of the magnetic circuit assembly 1164 is in a range of 6.45 mm to 7.19 mm. In some embodiments, the distance between the center $O_1$ of the first pressure relief hole 1131 and the long-axis center plane of the magnetic circuit assembly 1164 is in a range of 6.65 mm to 6.99 mm. Similarly, in some embodiments, a distance between the center $O_2$ of the second pressure relief hole 1132 and the long-axis center plane of the magnetic circuit assembly 1164 is in a range of 5.46 mm to 8.20 mm. In some embodiments, the distance between the center $O_2$ of the second pressure relief hole 1132 and the long-axis center plane of the magnetic circuit assembly 1164 is in a range of 5.96 mm to 8.70 mm. In some embodiments, the distance between the center $O_2$ of the second pressure relief hole 1132 and the long-axis center plane of the magnetic circuit assembly 1164 is in a range of 6.46 mm to 7.20 mm. In some embodiments, the distance between the center $O_2$ of the second pressure relief hole 1132 and the long-axis center plane of the magnetic circuit assembly 1164 is in the range of 6.66 mm to 7.00 mm.

In some embodiments, due to the existence of the pressure relief hole(s) 113 (e.g., the first pressure relief hole 1131 and the second pressure relief hole 1132), in the rear cavity 115, the air pressure of a position near the pressure relief holes 113 is similar to the outside air pressure, and the air pressure of a position away from the pressure relief hole(s) 113 is higher than the outside air pressure. Since the cone holder 1163 is provided with sound transmission holes (not shown) connecting the rear side of the diaphragm 1161 and the cavity 115, in order to balance the air pressure between the rear side of the diaphragm 1161 and the cavity 115, the sound transmission holes on the cone holder may be placed asymmetrically to better balance the airflow. Specifically, at a position relatively far away from the first pressure relief hole 1131 and/or the second pressure relief hole 1132, since the air pressure is relatively high, dimensions of the sound transmission holes may be large; at a position closer to the first pressure relief hole 1131 and/or the second pressure relief hole 1132, since the air pressure is relatively low, the dimensions of the sound transmission holes may be small. In some embodiments, by adjusting the dimensions (e.g., cross-sectional areas) of the first pressure relief hole 1131, the second pressure relief hole 1132, and/or the sound transmission holes, the low frequency vibration of the open earphone 10 can be more stable. In some embodiments, in order to make the air pressure in the rear cavity more stable, thereby making the vibration of the diaphragm more stable, the first pressure relief hole 1131 and the second pressure relief hole 1132 may be arranged in a staggered manner in the X-direction. At this time, the projections of the first pressure relief hole 1131 and the second pressure relief hole 1132 on the long-axis center plane partially overlap or do not overlap. In some embodiments, an overlapping area of the projections of the first pressure relief hole 1131 and the second pressure relief hole 1132 on the long-axis center plane is not greater than 10.77 $mm^2$. In some embodiments, the overlapping area of the projections of the first pressure relief hole 1131 and the second pressure relief hole 1132 on the long-axis center plane is not greater than 6.77 $mm^2$. In some embodiments, the overlapping area of the projections of the first pressure relief hole 1131 and the second pressure relief hole 1132 on the long-axis center plane is not greater than 4.77 $mm^2$. In some embodiments, the overlapping area of the projections of the first pressure relief hole 1131 and the second pressure relief hole 1132 on the long-axis center plane is not greater than 2.77 $mm^2$.

Figure 22:
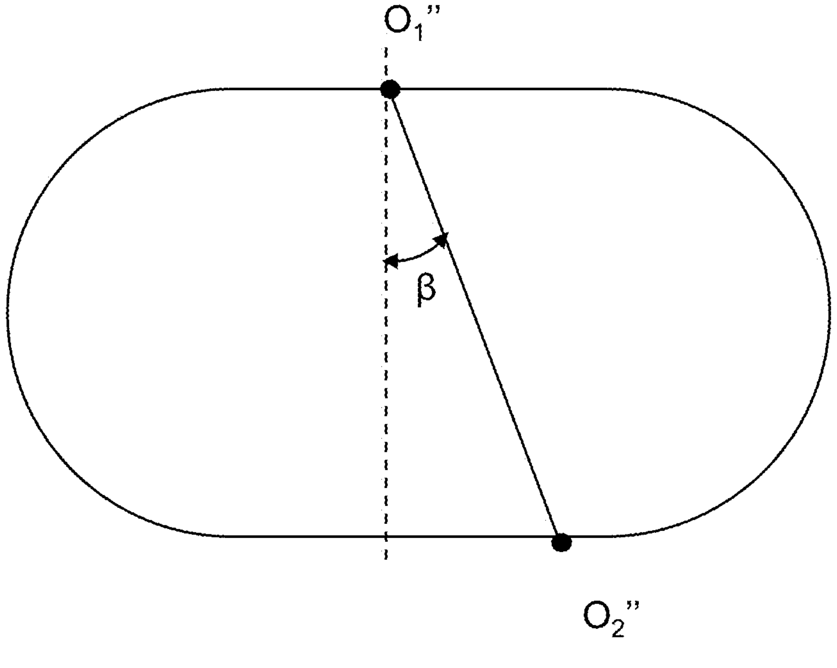
FIG. 22 is a schematic diaphragm illustrating a housing of an open earphone along a Z-direction on a plane where a bottom surface of a magnetic circuit assembly is located according to some embodiments of the present disclosure.

FIG. 22 is a schematic diaphragm illustrating a housing of an open earphone along a Z-direction on a plane where a bottom surface of a magnetic circuit assembly is located according to some embodiments of the present disclosure.

In some embodiments, a projection point of the center $O_1$ of the first pressure relief hole 1131 along the Z-direction on the plane where the bottom surface of the magnetic circuit assembly 1164 is located is $O_1$", and a projection point of the center $O_2$ of the second pressure relief hole 1132 along the Z-direction on the plane where the bottom surface of the magnetic circuit assembly 1164 is located is $O_2$". In order to make the first pressure relief hole 1131 and the second pressure relief hole 1132 staggered in the X-direction, a length of a connection line $O_1$"$O_2$" may be larger than the short-axis dimension of the sound production component 11. In some embodiments, the length of the connection line $O_1$"$O_2$" is in a range of 11 mm to 16 mm. In some embodiments, the length of the connection line $O_1$"$O_2$" is in a range of 8.51 mm to 15.81 mm. In some embodiments, the length of the connection line $O_1$"$O_2$" is in a range of 10.51 mm to 15.81 mm. In some embodiments, the length of the connection line $O_1$"$O_2$" is in a range of 11.51 mm to 14.81 mm. In some embodiments, the length of the connection line $O_1$"$O_2$" is in a range of 12.51 mm to 13.81 mm. In some embodiments, a ratio of the length of the connection line $O_1$"$O_2$" to a width of the sound production component 11 may be between 1 and 1.88.

In some embodiments, a degree of staggering between the first pressure relief hole 1131 and the second pressure relief hole 1132 in the X-direction cannot be too large. If the degree of staggering is too large, it is easy to make the first pressure relief hole 1131 and the second pressure relief hole 1132 close to the free end FE or the connection end CE in the X-direction, thus causing the first pressure relief hole 1131 and/or the second pressure relief hole 1132 to be blocked by the ear (e.g., a side wall of the inferior concha, tragus, etc.) when the open earphone 10 is worn. In some embodiments, the degree of staggering between the first pressure relief hole 1131 and the second pressure relief hole 1132 in the X-direction may be related to an angle β between the connection line $O_1$"$O_2$" and the short-axis direction Y. In some embodiments, the angle β may be in a range of 12.85° to 23.88°. In some embodiments, the angle β may be in a range of 14.85° to 21.88°. In some embodiments, the angle β may be in a range of 16.85° to 19.88°. In some embodiments, the angle β may be in a range of 18.85° to 29.88°.

The description of the open earphone 10 described above is for illustration purposes only and is not intended to limit the scope of the present disclosure. Those skilled in the art can make various changes and modifications based on the description of the present disclosure. For example, when only one pressure relief hole is provided on the sound production component 11, the pressure relief hole may be any one of the above-mentioned first pressure relief hole 1131 and second pressure relief hole 1132. For example, the pressure relief hole may be the above-mentioned first pressure relief hole 1131, i.e., the pressure relief hole may be disposed on the upper side surface US. The distance between the center of the pressure relief hole and the inner side surface IS may be in a range of 4.24 mm to 6.38 mm, and the distance between the center of the pressure relief hole and the rear side surface RS may be in a range of 10.44 mm to 15.68 mm. These changes and modifications are still within the scope of protection of the present disclosure.

The basic concepts have been described above, apparently, in detail, as will be described above, and do not constitute limitations of the disclosure for those skilled in the art. Although there is no clear explanation here, those skilled in the art may make various modifications, improvements, and modifications to the present disclosure. This type of modification, improvement, and corrections are recommended in the present disclosure, so the modification, improvement, and the amendment remain in the spirit and scope of the exemplary embodiments of the present disclosure.

What is claimed is:

1. An open earphone, comprising:

a sound production component including a transducer and a housing accommodating the transducer, the transducer including a diaphragm;

an ear hook, wherein in a wearing state, a first portion of the ear hook is hung between an auricle and a head of a user, and a second portion of the ear hook extends towards a side of the auricle away from the head and connects to the sound production component to place the sound production component in a position near an ear canal but not blocking the ear canal, wherein an inner side surface of the housing facing the auricle is provided with a sound outlet for guiding a sound generated at a front side of the diaphragm out and to the ear canal, one or more other side walls of the housing are provided with at least two pressure relief holes for guiding a sound generated at a rear side of the diaphragm out, the at least two pressure relief holes includes a first pressure relief hole and a second pressure relief hole, and a distance between a center of the first pressure relief hole and a center of the second pressure relief hole is in a range of 13.0 mm to 15.2 mm; and wherein a distance from a center of the sound outlet to a mid-perpendicular plane of a connection line between the center of the first pressure relief hole and the center of the second pressure relief hole is in a range of 0 mm to 2 mm.

2. The open earphone of claim 1, wherein the first pressure relief hole is provided on an upper side surface of the housing, and the second pressure relief hole is provided on a lower side surface of the housing.

3. The open earphone of claim 2, wherein in the wearing state, the housing is at least partially inserted into an inferior concha, a distance from the center of the second pressure relief hole to a rear side surface of the housing is greater than a distance from the center of the first pressure relief hole to the rear side surface of the housing.

4. The open earphone of claim 3, wherein a distance from the center of the first pressure relief hole to the inner side surface of the housing towards the auricle is in a range of 4.24 mm to 6.38 mm, or a distance from the center of the first pressure relief hole to the rear side surface is in a range of 10.44 mm to 15.68 mm.

5. The open earphone of claim 3, wherein a distance from the center of the second pressure relief hole to the inner side surface of the housing towards the auricle is in a range of 4.24 mm to 6.36 mm, or a distance from the center of the second pressure relief hole to the rear side surface is in a range of 13.51 mm to 20.27 mm.

6. The open earphone of claim 2, wherein in the wearing state, the housing is at least partially inserted into an inferior concha, and an area of the second pressure relief hole is smaller than an area of the first pressure relief hole.

7. The open earphone of claim 6, wherein the area of the first pressure relief hole is in a range of 3.78 $mm^2$ to 22.07 $mm^2$, and the area of the second pressure relief hole is in a range of 2.78 $mm^2$ to 16.07 $mm^2$.

8. The open earphone of claim 6, wherein the transducer includes a magnetic circuit assembly, the magnetic circuit assembly is used to provide a magnetic field, and an overlapping area of projections of the first pressure relief hole and the second pressure relief hole on a long-axis center plane of the magnetic circuit assembly is not larger than 10.77 $mm^2$.

9. The open earphone of claim 8, wherein a length of a connection line of projection points of the center of the first pressure relief hole and the center of the second pressure relief hole on a plane where a bottom surface of the magnetic circuit assembly is located is in a range of 8.51 mm to 15.81 mm.

10. The open earphone of claim 2, wherein a distance between a projection point of the center of the first pressure relief hole on a sagittal plane and a projection point of a midpoint of an upper boundary of the inner side surface on the sagittal plane is not larger than 2 mm.

11. The open earphone of claim 10, wherein a distance between the projection point of the midpoint of the upper boundary of the inner side surface on the sagittal plane and a projection point of a center of an ear canal opening of the ear canal on the sagittal plane is in a range of 12 mm to 18 mm.

12. The open earphone of claim 10, wherein a distance between the projection point of the center of the first pressure relief hole on the sagittal plane and a projection point of a center of an ear canal opening of the ear canal on the sagittal plane is in a range of 12 mm to 18 mm.

13. The open earphone of claim 10, wherein a distance between a projection point of the center of the second pressure relief hole on the sagittal plane and a projection point of a center of an ear canal opening of the ear canal on the sagittal plane is in a range of 6.88 mm to 10.32 mm.

14. The open earphone of claim 10, wherein a distance between a projection point of the center of the second pressure relief hole on the sagittal plane and the projection point of the midpoint of the upper boundary of the inner side surface on the sagittal plane is in a range of 14.4 mm to 21.6 mm.

15. The open earphone of claim 2, wherein a distance between a projection point of the center of the first pressure relief hole on a sagittal plane and a projection point of a ⅓ point of a lower boundary of the inner side surface on the sagittal plane is in a range of 13.76 mm to 20.64 mm.

16. The open earphone of claim 15, wherein a distance between a projection point of the center of the second pressure relief hole on the sagittal plane and the projection point of the ⅓ point of the lower boundary of the inner side surface on the sagittal plane is in a range of 8.16 mm to 12.24 mm.

17. The open earphone of claim 16, wherein a distance between the projection point of the ⅓ point of the lower boundary of the inner side surface on the sagittal plane and a projection point of a center of an ear canal opening of the ear canal on the sagittal plane is in a range of 1.76 mm to 2.64 mm.

* * * * *